United States Patent
Adesokan et al.

(10) Patent No.: US 12,550,924 B2
(45) Date of Patent: Feb. 17, 2026

(54) COMPOSITIONS DERIVED FROM GASTROINTESTINAL TRACT MUCINS

(71) Applicant: Gnubiotics Sciences SA, Epalings (CH)

(72) Inventors: Adeyemi Adesokan, Lausanne (CH); Sara Vidal López, Spiez (CH); Yong Miao, Lausanne (CH)

(73) Assignee: Gnubiotics Sciences SA, Epalings (CH)

( * ) Notice: Subject to any disclaimer, the term of this patent is extended or adjusted under 35 U.S.C. 154(b) by 831 days.

(21) Appl. No.: 17/427,911

(22) PCT Filed: Jan. 31, 2020

(86) PCT No.: PCT/EP2020/052514
§ 371 (c)(1),
(2) Date: Aug. 2, 2021

(87) PCT Pub. No.: WO2020/157321
PCT Pub. Date: Aug. 6, 2020

(65) Prior Publication Data
US 2022/0104528 A1    Apr. 7, 2022

Related U.S. Application Data

(60) Provisional application No. 62/968,039, filed on Jan. 30, 2020, provisional application No. 62/799,691, filed on Jan. 31, 2019.

(51) Int. Cl.
| | |
|---|---|
| *A23L 33/18* | (2016.01) |
| *A23L 33/175* | (2016.01) |
| *A23L 33/21* | (2016.01) |
| *A61K 31/702* | (2006.01) |
| *C07H 1/08* | (2006.01) |
| *C07H 3/06* | (2006.01) |
| *C07K 14/47* | (2006.01) |
| *C13K 13/00* | (2006.01) |

(52) U.S. Cl.
CPC ............ *A23L 33/18* (2016.08); *A23L 33/175* (2016.08); *A23L 33/21* (2016.08); *A61K 31/702* (2013.01); *C07H 1/08* (2013.01); *C07H 3/06* (2013.01); *C13K 13/00* (2013.01); *C07K 14/4727* (2013.01)

(58) Field of Classification Search
CPC . C07K 14/4727; A61K 38/1735; A23L 33/18; A23L 33/175; A23L 33/21; C07H 1/08; C07H 3/06; C13K 13/00; A61P 1/00
See application file for complete search history.

(56) References Cited

U.S. PATENT DOCUMENTS

| | | | |
|---|---|---|---|
| 2011/0085981 A1 | 4/2011 | Wang | |
| 2014/0187474 A1* | 7/2014 | Sonnenburg | C07K 14/4727 435/68.1 |
| 2017/0151268 A1 | 6/2017 | Von Maltzahn et al. | |
| 2017/0299530 A1 | 10/2017 | Yang | |
| 2017/0322219 A1 | 11/2017 | Wandall et al. | |

FOREIGN PATENT DOCUMENTS

| | | | | |
|---|---|---|---|---|
| CA | 2646021 A1 | 10/2007 | | |
| CN | 104497122 A | 4/2015 | | |
| EP | 3 530 281 A1 | 8/2019 | | |
| JP | H08256788 A | * 10/1996 | ............. | A61K 38/00 |
| WO | WO-2008/147405 A1 | 12/2008 | | |
| WO | WO-2016/122889 A1 | 8/2016 | | |
| WO | WO-2019/162425 A1 | 8/2019 | | |
| WO | WO-2020/104486 A1 | 5/2020 | | |
| WO | WO-2020/157321 A1 | 8/2020 | | |

OTHER PUBLICATIONS

English language machine translation of JPH08256788A; translated Jan. 30, 2025. (Year: 2025).*
Llatser, R.; et al. "Alimentary allergy to pork. Crossreactivity among pork kidney and pork and lamb gut" 1998, Clinical and Experimental Allergy, vol. 28, p. 1021-1025. (Year: 1998).*
Oxford English Dictionary—definition of "prevent"; accessed Aug. 8, 2025. (Year: 2025).*
Qin, J.; et al. "A metagenome-wide association study of gut microbiota in type 2 diabetes", Nature 2012, vol. 490, pp. 55-60. (Year: 2012).*
Ahmed Lshfaq et al: "Abstract 3297: Altered mucus composition and bacterial dysbiosis promote development of colitis following chronic Notch inhibition", Cancer Research, vol. 76, No. Suppl. 14, Jul. 2016.
Bennett R et al: "Proteolysis of insoluble porcine gastric mucus", Comparative Iochemistry and Physiology. B. Comparative Biochemistry, Pergamon Press, London, GB, vol. 78, No. 4, Jan. 1, 1984 (Jan. 1, 1984), pp. 797-803.
C G Monferran et al: "Inhibition of cholera toxin binding to membrane receptors by pig gastric mucin-derived glycopeptides: differential effect depending on the ABO blood group antigenic determinants." Infection and Immunity, vol. 58, No. 12, Jan. 1, 1990, pp. 3966-3972.
Catherine Robbe et al: "Structural diversity and specific distribution of O-glycans in normal human mucins along the intestinal tract", Biochemical Journal, vol. 384, No. 2, Dec. 1, 2004, pp. 307-316.
Chia Loo Wee et al: "Deciphering the trophic interaction between Akkermansia muciniphila and the butyrogenic gut commensal Anaerostipes caccaeusing a metatranscriptomic approach", Antonie Van Leeuwenhoek, Springer, Dordrecht; NL, vol. 111, No. 6, Feb. 19, 2018, pp. 859-873.
Communication Pursuant to Article 94(3) EPC on EP 19705369.7 dtd Oct. 25, 2022.
European Search Report dated Sep. 11, 2018, for European Patent Application No. 18158116.6.

(Continued)

*Primary Examiner* — Eric Olson
*Assistant Examiner* — Benjamin M Brandsen
(74) *Attorney, Agent, or Firm* — Foley & Lardner LLP

(57) ABSTRACT

Disclosed are methods and compositions comprising glycopeptides obtained from gastrointestinal sources that have superior microbiota effects. Such compositions are advantageous for food stuff, including infant formulations.

20 Claims, 56 Drawing Sheets

(56) References Cited

OTHER PUBLICATIONS

Florence Van Herreweghen et al: "Mucin degradation niche as a driver of microbiome composition and Akkermansia muciniphila abundance in a dynamic gut model is donor independent", FEMS Microbiology Ecology, vol. 94, No. 12, Sep. 18, 2018.
Fred Downs: "Preparation of Glycopeptides from Bovine Submaxillary Mucin by Chemical Degradation", Biochemistry, vol. 8, No. 4, Apr. 1, 1969, pp. 1760-1766.
Horowitz M I et al:"Blood-group-substance activity of bovine submaxillary mucin I.J activity of bovine submaxillary mucin and properties of bovine submaxillary mucin glycopeptides", BBA—Specialized Section on Mucoproteins and Mucopolysaccharides vol. 83, No. 2, Jul. 7, 1964, pp. 209-217.
International Preliminary Report on Patentability on PCT/IB2022/000520, dated Mar. 21, 2024.
International Search Authority, "International Search Report" and "Written Opinion" issued in PCT Application No. PCT/IB2021/00050, mailing date Jun. 21, 2021.
International Search Authority, "International Search Report," issued in connection with PCT Application No. PCT/EP2020/052514, mailing date Jul. 7, 2020.

\* cited by examiner

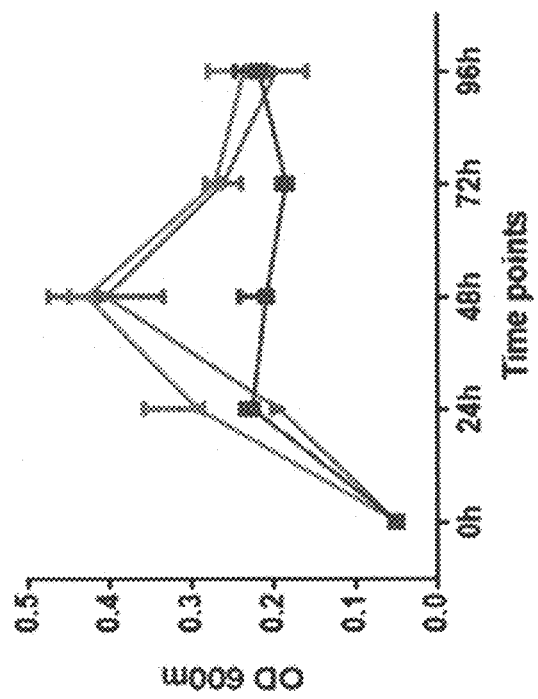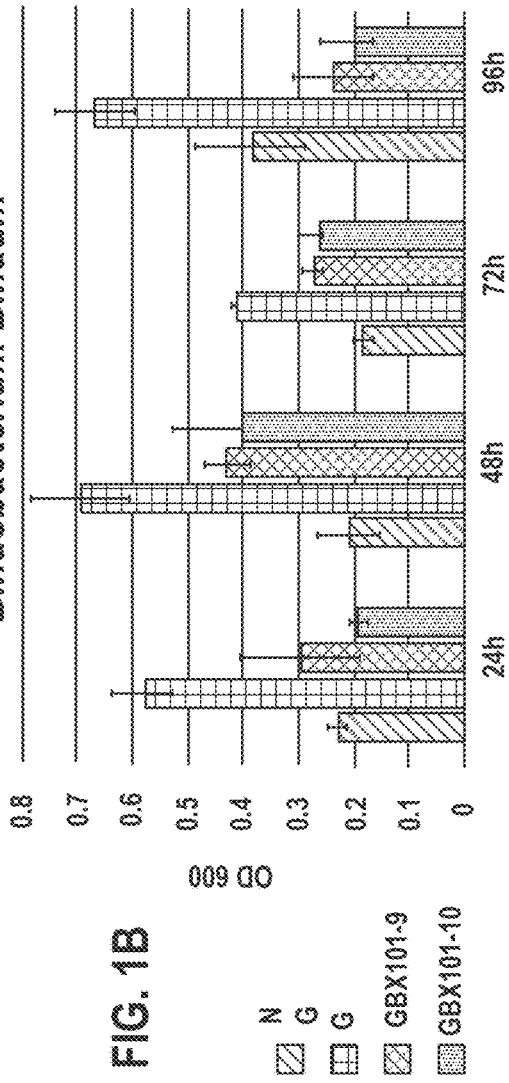

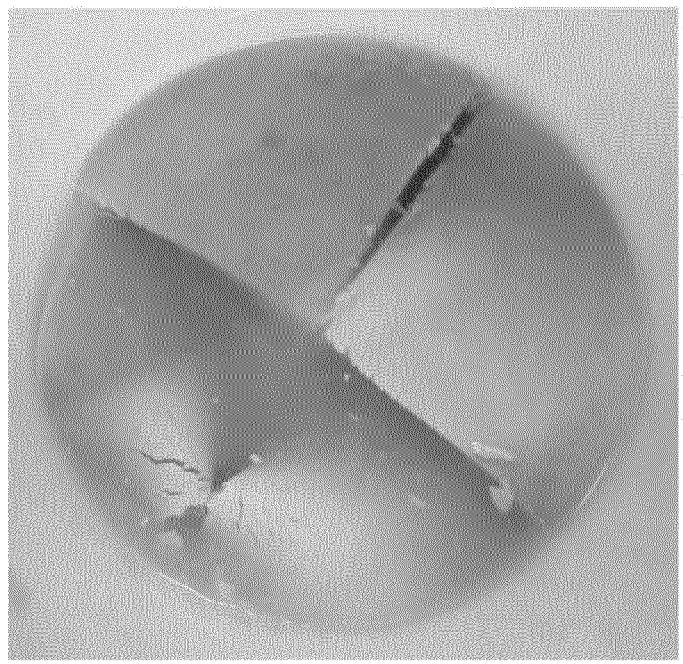
FIG. 32

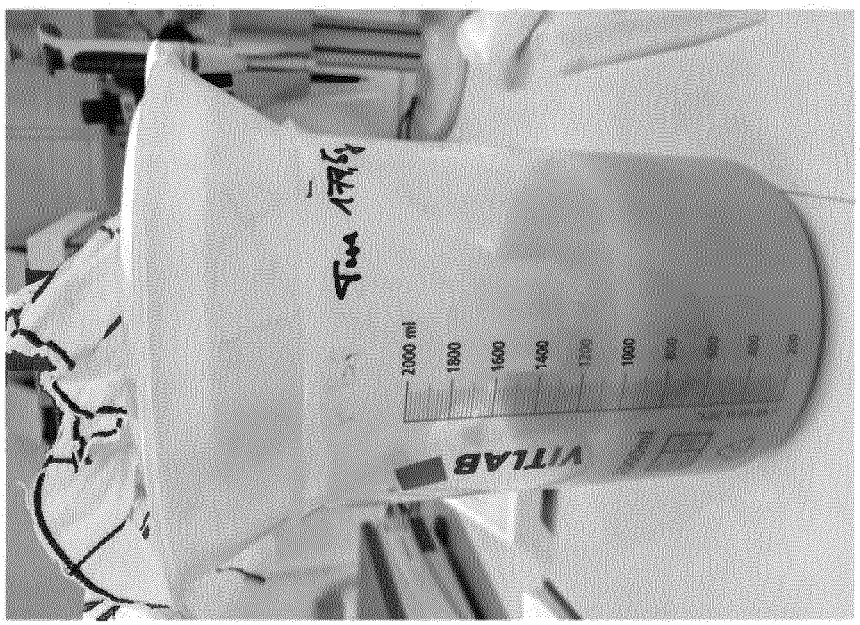
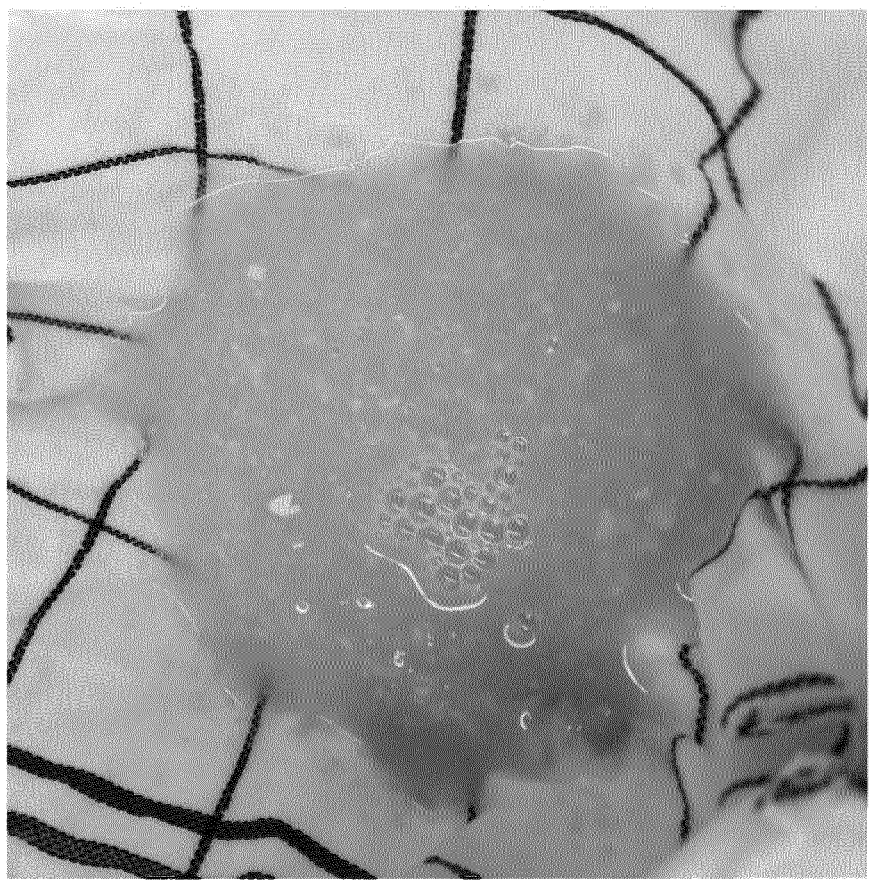
FIG. 34

FIG. 36

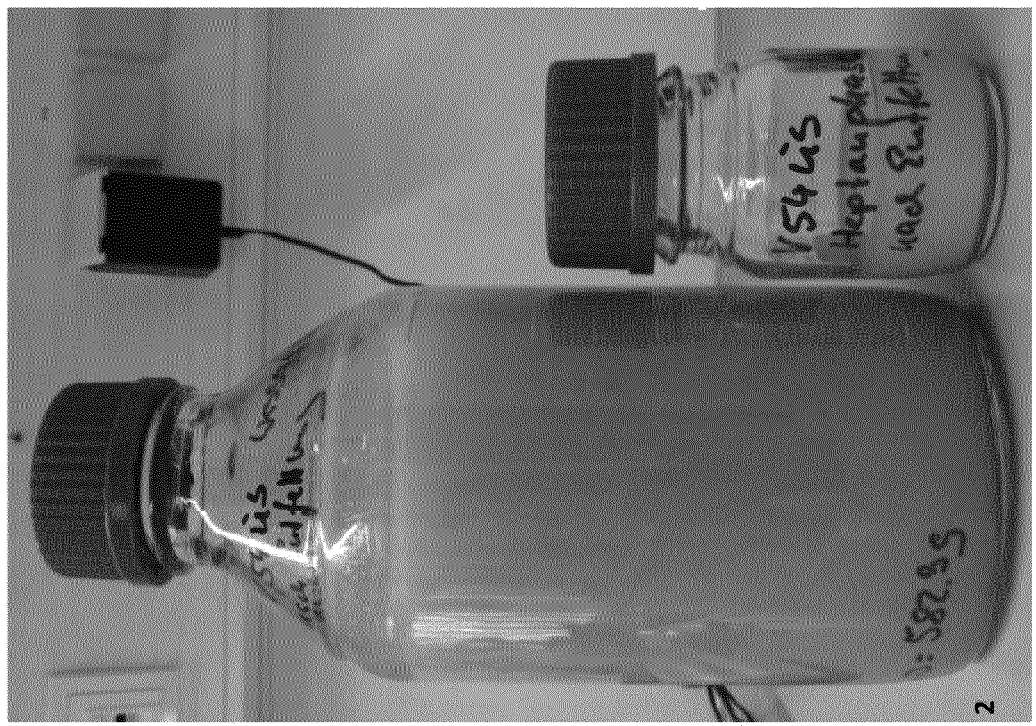
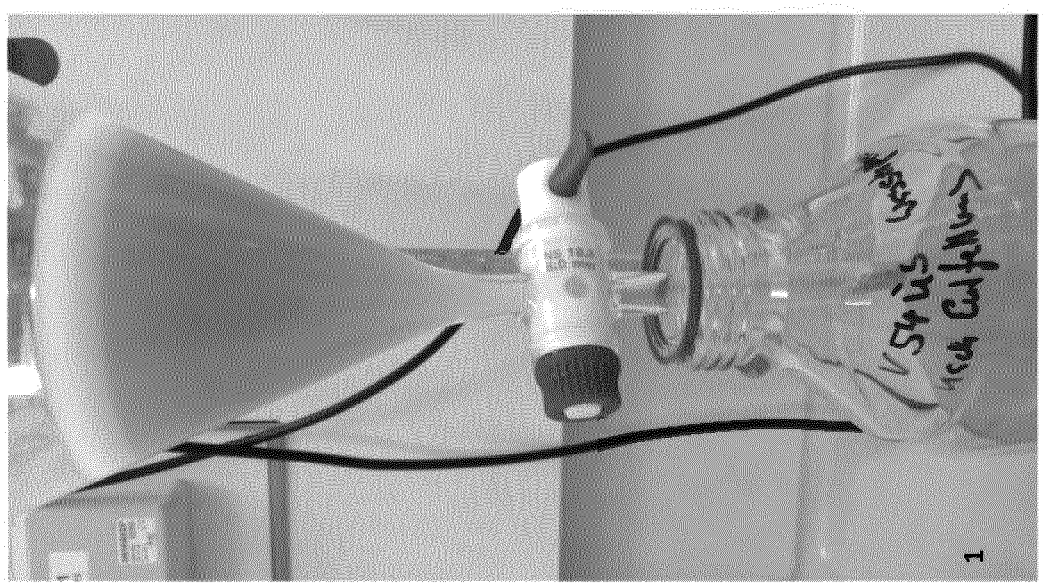
FIG. 37

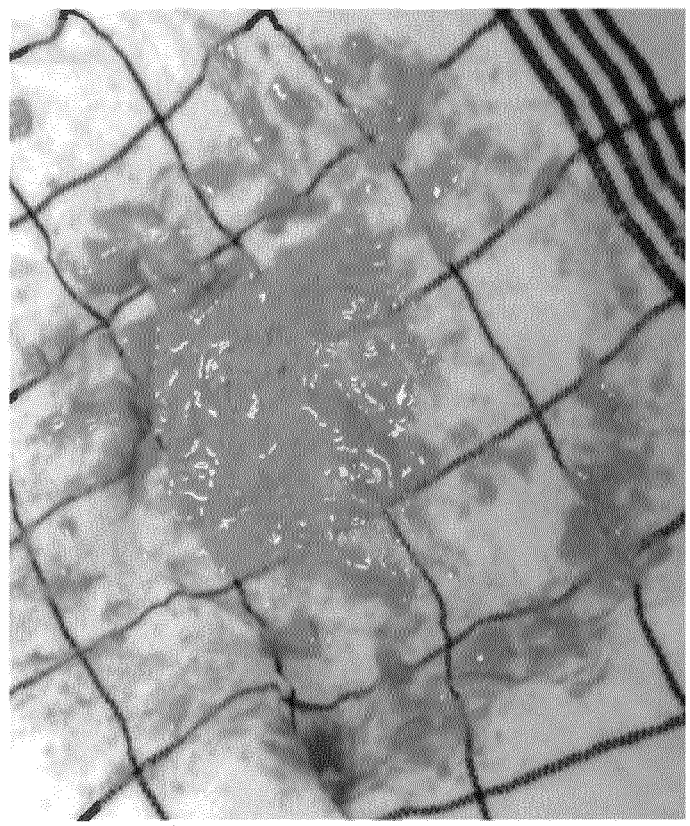
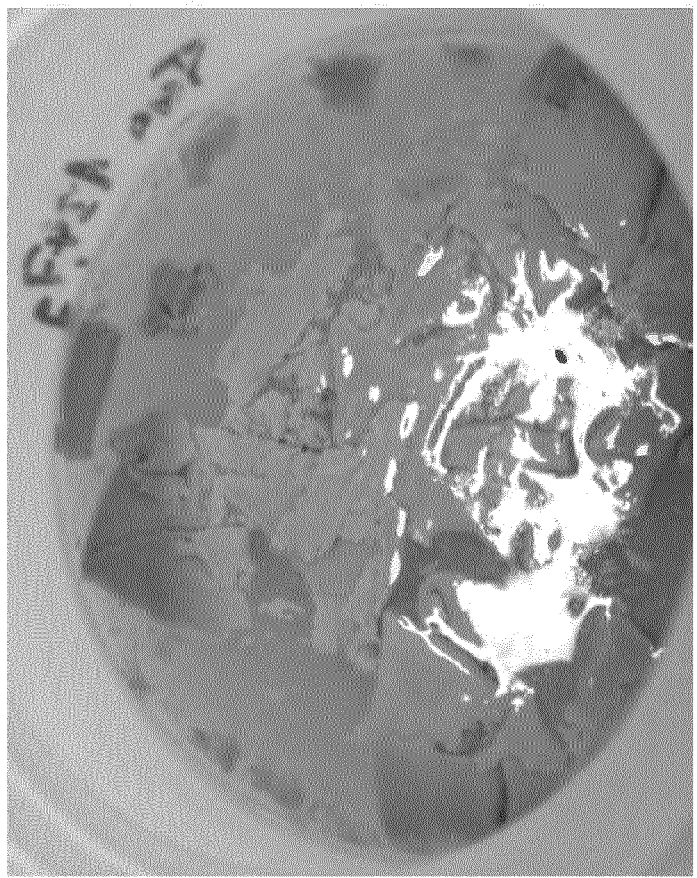
FIG. 38

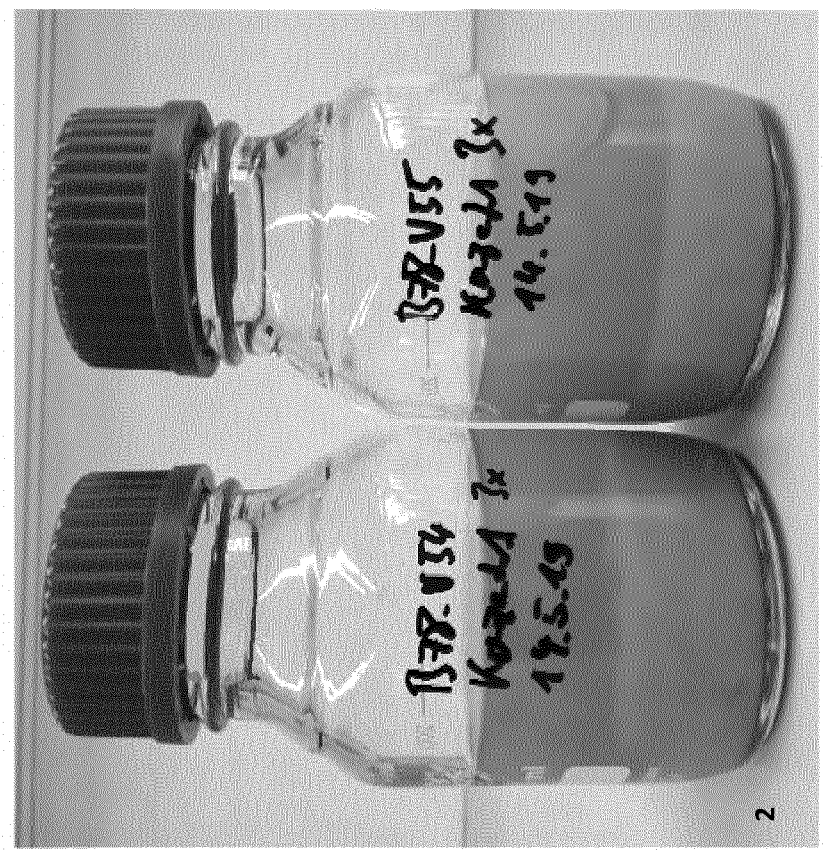
FIG. 39

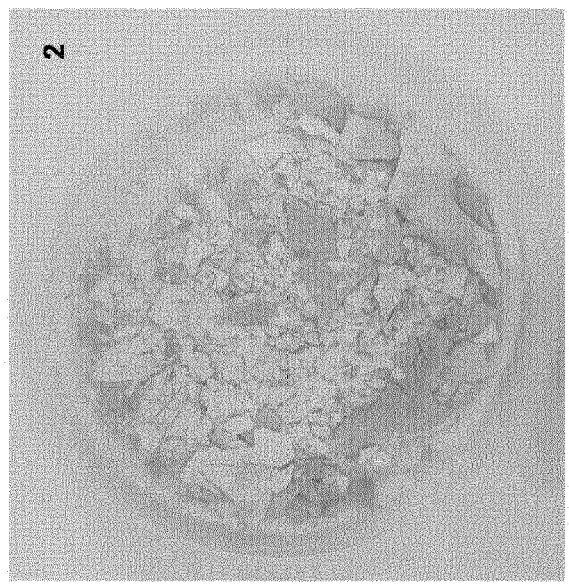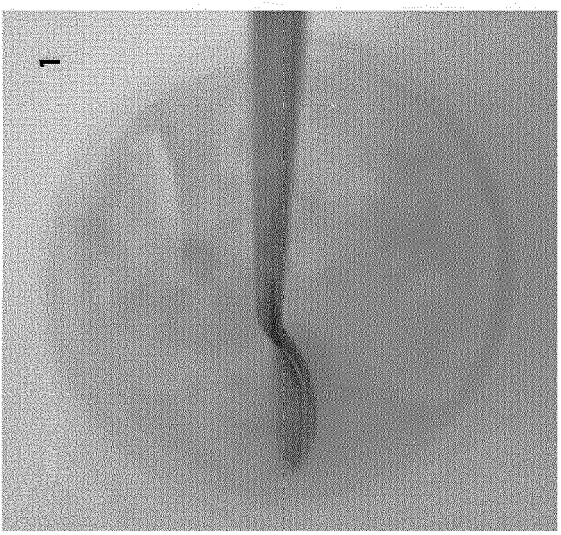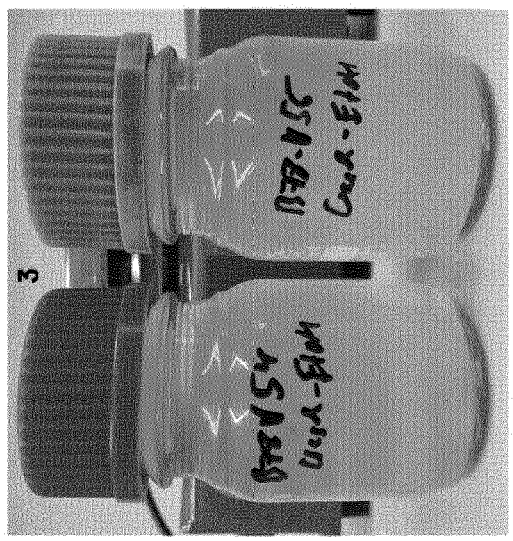
FIG. 43

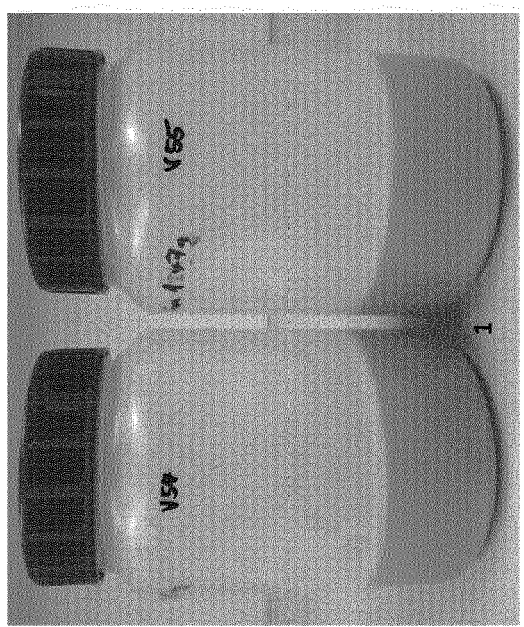
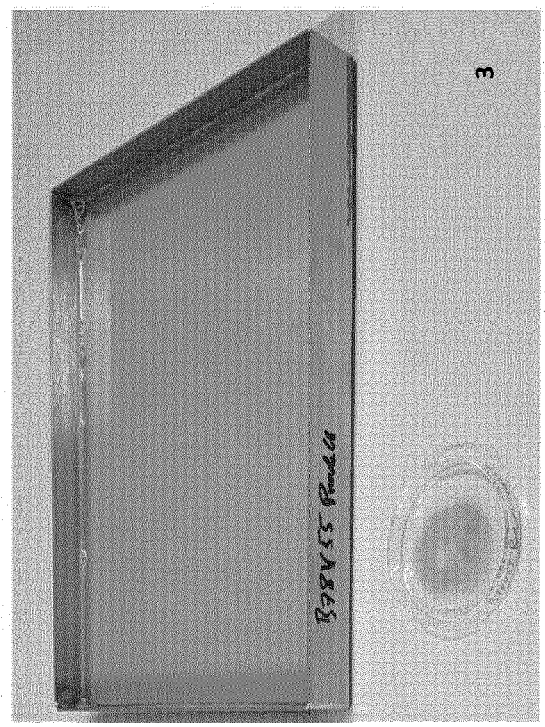
FIG. 45

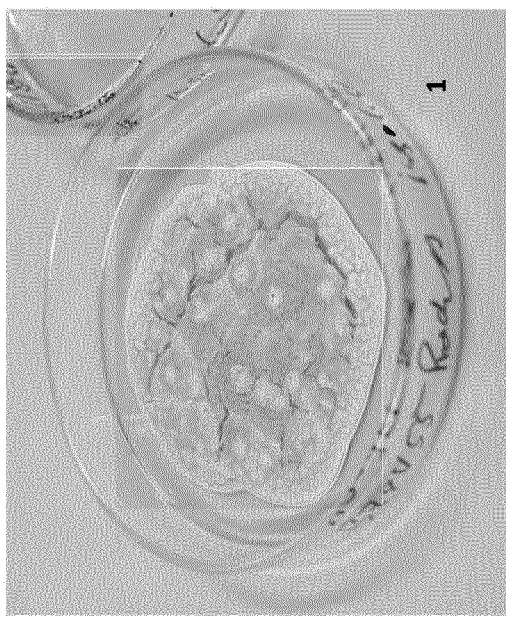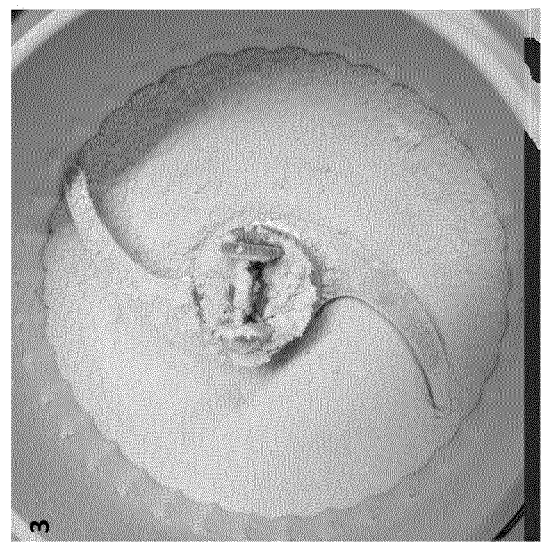
FIG. 46

COMPOSITIONS DERIVED FROM GASTROINTESTINAL TRACT MUCINS

RELATED APPLICATIONS

This application is a national stage filing under 35 U.S.C. 371 of International Application No. PCT/EP2020/052514, filed Jan. 31, 2020, which claims the benefit of U.S. Provisional Application Ser. No. 62/799,691 filed Jan. 31, 2019 and U.S. Provisional Application Ser. No. 62/968,039 filed Jan. 30, 2020; the contents of all of which are hereby incorporated by reference in their entirety. International Application No. PCT/EP2020/052514 was published under PCT Article 21(2) in English.

FIELD OF THE INVENTION

The present invention pertains generally to the fields of compositions containing glycopeptides and, in some embodiments, additionally containing free glycans (i.e., free oligosaccharides), in particular compositions useful as nutritional supplements, such as medical nutrition, domestic animal nutrition, and nutraceutical products that enhance the growth of beneficial microorganisms in the mammalian microbiome, such as *Akkermansia muciniphila*. In some embodiments, the present invention particularly relates to infant formula. The present invention also pertains to methods of producing such compositions from gastrointestinal tract mucins.

BACKGROUND OF THE INVENTION

Breast milk is an excellent source of nutrition for a newborn infant, providing macronutrients such as lipids, fats, proteins, and carbohydrates, as well as numerous micronutrients essential for infant growth. In addition, breast milk contains several biologically active components such as immunoglobulins, growth hormones, oligosaccharides, and microbiota that play critical roles in infant intestinal homeostasis and immune development (Bode, 2012). Among the bioactive components, human milk oligosaccharides (HMOs) are the third most abundant solid component after lactose and lipids. These unconjugated complex glycans act as prebiotics, antiadhesives, and antimicrobials and play critical roles in altering epithelial and immune cell responses (Bode, 2015). HMOs have prebiotic effects selectively serving as a source of energy and nutrients for desired bacterial genera to colonize the infant intestine such as *Bifidobacterium, Lactobacillus, Akkermansia* and *Bacteroides*. These bacterial communities are important in the infant gut for modulating mucosal barrier function, promoting immunological and inflammatory responses and avoiding the adhesion of certain microbial pathogens.

In pre-term infants, bacteria that colonize the gut include *Bifidobacterium* and *Lactobacillus* and these differ depending on the type of feeding habits. Infant formula contains only trace amounts of these oligosaccharides. In formula-fed infants, bacteria such as *Enterococcus*, Enterobacteria or Clostridia dominate the gut niche. However, in breast-fed infants *Bifidobacterium* and *Lactobacillus* dominate (Jandhyala et al., 2015).

Gut microbes play an important role in the regulation of host metabolism and low-grade inflammation. Abnormalities in microbiota composition and activity (called dysbiosis) have been implicated in the emergence of the metabolic syndrome, which include diseases such as obesity, type 2 diabetes and cardiovascular diseases. One of the bacteria that influence human metabolism and is found in infant and adult intestinal track (0.5-5% of the total bacteria) as well as in human milk is *Akkermansia muciniphila* (Derrien et al., 2008, *Appl Environ Microbiol.*, 74(5): 1646-1648; Cani et al., 2017, *Front Microbiol.*, 8: 1765).

*Akkermansia muciniphila* is a Gram-negative, anaerobic, non-spore-forming bacterium, within genus *Akkermansia*, from the family—Verrucomicrobiaceae, which is the most abundant mucus degrading bacterium in the healthy individual. The host and *Akkermansia* communicate continually and this interaction creates a positive feedback loop in which *Akkermansia* degrades the mucus layer which stimulates new mucus production and the production of new mucus stimulates growth of *Akkermansia*. This process ensures that abundant amounts of *Akkermansia* maintain the integrity and shape of the mucus layer. *Akkermansia* produces important metabolites as a result of the mucus degradation process, in particular two very important short chain fatty acids (SCFA): acetic acid and propionic acid, which trigger a cascade of responses in the host having a crucial role in immune stimulation and metabolic signaling (Derrien et al., 2011, *Front Microbiol.*, 2: 166).

Recent evidence demonstrates that gut concentration of *A. mucimphila* is inversely associated with obesity, diabetes, cardiometabolic diseases and low-grade inflammation. Therefore, this bacterium is considered a potential candidate for improving the conditions of subjects suffering or at risk of suffering from those disorders (Cani et al., 2017, supra).

A possibility that has been investigated to enhance the population of *A. muciniphila* in the gut is the administration of live or pasteurized *A. muciniphila* in the form of oral supplementation. There is an issue, however, of preserving the viability of *A. muciniphila* during production and storage prior to administration of those supplements (Cani et al., 2017, supra). No commercially available probiotic supplement currently exists that contains *Akkermansia muciniphila*. Alternatively, increasing *Akkermansia muciniphila* can be achieved through the consumption of certain prebiotics and polyphenol-rich foods. However, the efficacy of those prebiotics and polyphenol-rich foods is limited.

Use of compositions comprising mostly free glycans for nutritional supplements has been previously proposed. For example, U.S. Pat. No. 8,795,746 to Sonnenburg describes an infant formula supplement comprising mammalian mucin glycans released and isolated from the protein component of mammalian mucins (see, e.g., claim 1). Specifically, porcine mucin was treated with NaOH and $NaBH_4$ to release O-glycans from mucin glycoproteins (see, Col. 22, lines 43-47). Further, U.S. Pat. No. 9,757,403 to Maltzahn discusses using glycans in therapeutic preparations to modulate human gastrointestinal microbiota (see, Col. 1, lines 43-49). This patent describes synthetically producing glycans from mono- or disaccharides (see, Col. 22, lines 7-27).

SUMMARY OF THE INVENTION

The applicants have developed both glycopeptide-based formulations and combination glycan- and glycopeptide-based formulations. In some embodiments, the formulations contain up to 130 Microbiota Accessible Carbohydrates (MACs) mimicking the natural diversity and complexity of HMOs. In some embodiments, the compositions are obtained from porcine gastric mucus.

The present invention pertains to the surprising discovery that oligosaccharide-containing compositions obtained from gastrointestinal tract mucins, under conditions wherein the mucins or a partially purified fraction thereof are not subject to conditions or reagents that release, or fully release, oligosaccharides from glycoproteins or glycopeptides, promote beneficial bacteria growth in the gut including growth of *Bifidobacterium bifidum, Bifidobacterium animalis* subsp. *lactis, Bifidobacterium breve, Lactobacillus acidophilus, Lactobacillus reuteri, Akkermansia muciniphila, Bifidobacterium infantis*, and *Bacteroides* thetaiotaomicron. Furthermore, in some embodiments, the compositions of the claimed invention do not promote the growth of *Escherichia coli*.

The compositions of the present invention are especially advantageous as a substitute for human milk oligosaccharides in infant formula or as a supplement for infants (e.g., newborn infants, newborn infants delivered by C-section). As discussed above, the intestine of breast-fed infants is dominated by *Bifidobacterium* and *Lactobacillus*, while the intestine of formula-fed infants is dominated by *Enterococcus*, Enterobacteria and/or Clostridia bacteria. As shown in the Examples section herein and discussed throughout the specification, the compositions of the present disclosure provide a carbon source for *Bifidobacterium* and *Lactobacillus* bacteria and therefore are a useful additive for infant formulas, ensuring intestinal microbiota more closely aligned with the microbiota of breast-fed infants.

Compositions from Mucin Powder Obtained without Subjecting the Mucins to Conditions or Reagents that Release Oligosaccharides from Glycopeptides Some aspects of the present disclosure are directed to a composition comprising glycopeptides obtained from gastrointestinal tract mucins, wherein the composition is obtained without subjecting the mucins or a partially purified fraction thereof to conditions or reagents that release oligosaccharides from glycopeptides; the total oligosaccharide content of the composition is >15% (w/w); the free glycan content of the composition is <1% (w/w); the total glycoprotein content of the composition is 6% or less (w/w); and the composition comprises at least one glycopeptide-bound oligosaccharide having each of the following general formulae: Hex1HexNAc1Fuc1; Hex1HexNAc2; Hex1HexNAc2Fuc1; Hex1HexNAc2Fuc1 Sul1; Hex1HexNAc3; Hex2HexNAc2; Hex2HexNAc2Fuc1 Hex2HexNAc2Fuc2; Hex2HexNAc2Fuc2Sul1; Hex2HexNAc3; Hex2HexNAc3Fuc1; Hex2HexNAc4; Hex2HexNAc4Fuc1; and NeuAc1Hex1HexNAc2.

In some embodiments, the composition has a water solubility of about 100 g/L at 25° C. In some embodiments, the composition does not substantially contain particles having a diameter greater than about 4-8 µm. In some embodiments, the composition has a total free amino acid content of 15% or less (w/w). In some embodiments, the composition has a protein content 6% or less (w/w).

In some embodiments, the composition comprises glycopeptide-bound oligosaccharides having at least 7, at least 14, at least 21, or all of the following structures: Fucα1-2 (GalNAcα1-3)Galβ1-3GalNAc; Fucα1-2(GalNAcα1-3) Galβ1-4GlcNAcβ1-3Galβ1-3GalNAc; Fucα1-2Galβ1-3 (6S-GlcNAcβ1-6)GalNAc; Fucα1-2Galβ1-3(Fucα1-2Galβ1-4GlcNAcβ1-6)GalNAc; Fucα1-2Galβ1-3 (GalNAcβ1-4GlcNAcβ1-6)GalNAc; Fucα1-2Galβ1-3 (Galβ1-4GlcNAcβ1-6)GalNAc; Fucα1-2Galβ1-3 (GlcNAcα1-4Galβ1-4GlcNAcβ1-6)GalNAc; Fucα1-2Galβ1-3(GlcNAcβ1-6)GalNAc; Fucα1-2Galβ1-3 [Fucα1-2Galβ1-4(6S)GlcNAcβ1-6]GalNAc; Fucα1-2Galβ1-3GalNAc; Fucα1-2Galβ1-4GlcNAcβ1-3Galβ1-3GalNAc; GalNAcα1-3(Fucα1-2)Galβ1-3(GlcNAcα1-4Galβ1-4GlcNAcβ1-6)GalNAc; GalNAcα1-3(Fucα1-2)Galβ1-3 (SGlcNAcβ1-6)GalNAc; GalNAcα1-3(Fucα1-2)Galβ1-4 (6S)GlcNAcβ1-3Galβ1-3GalNAc; Galβ1-3(6SGlcNAcβ1-6)GalNAc; Galβ1-3(Fucα1-2Galβ1-4GlcNAcβ1-6) GalNAc; Galβ1-3(GlcNAcα1-4Galβ1-4GlcNAcb1-6) GalNAc; Galβ1-4GlcNAcβ1-3Galβ1-3(NeuAcα2-6) GalNAc; Galβ1-4GlcNAcβ1-3Galβ1-3GalNAc; GlcNAcα1-4Galβ1-3(NeuAcα2-6)GalNAc; GlcNAcα1-4Galβ1-3(Fucα1-2Galβ1-4GlcNAcβ1-6)GalNAc; GlcNAcα1-4Galβ1-3(GalNAcβ1-4GlcNAcβ1-6)GalNAc; GlcNAcα1-4Galβ1-3(GlcNAcα1-4Galβ1-4GlcNAcβ1-6) GalNAc; GlcNAcα1-4Galβ1-3(GlcNAcβ1-6)GalNAc; GlcNAcα1-4Galβ1-3[GalNAcα1-3(Fucα1-2)Galβ1-4GlcNAcβ1-6]GalNAc; GlcNAcα1-4Galβ1-3Gal(Galβ1-4GlcNAcβ1-6)GalNAc; and GlcNAcα1-4Galβ1-3GalNAc. In some embodiments, the gastrointestinal tract mucins are porcine gastrointestinal tract mucins. In some embodiments, the composition comprises <1% protein (w/w) (e.g., total protein and glycoprotein).

In some embodiments, the composition comprising glycopeptides is obtained by suspending mucin powder in a volume of ethanol; mixing the suspension with a volume of water that is 10× or more (e.g., 10-20×) the volume of ethanol; contacting the suspension with an anion exchange resin under conditions that allow the resin to bind organic and ionic species removing the resin and subjecting the suspension to centrifugation to separate any remaining insoluble material; contacting the supernatant from the centrifugation with diatomaceous earth (e.g., Celite®) for at least 5 minutes; and filtering the mixture to remove particles larger than about 8 to 4 µm.

In some embodiments, the composition is for use as a medicament. In some embodiments, the composition is for use as a nutritional or dietary composition, or nutritional or dietary premix. In some embodiments, the composition is for use as a pharmaceutical composition further comprising a pharmaceutically acceptable carrier, diluent or excipient. In some embodiments, the composition is used for prevention and/or treatment of an unbalance of the microbiota and/or disorders associated with dysbiosis such as asymptomatic dysbiotic microbiota, in particular depleted *Akkermansia muciniphila* gut microbiota. In some embodiments, the composition is used for an animal feed. In some embodiments, the composition is used for infant formula.

Some aspects of the present disclosure are directed to a composition comprising a mixture of free glycans and glycopeptides obtained from gastrointestinal tract mucins, wherein the composition is obtained without subjecting the mucins or a partially purified fraction thereof to conditions or reagents that cause complete release of oligosaccharides from glycoproteins or glycopeptides; the total oligosaccharide content of the composition is >10% (w/w); the ratio of glycopeptides:free glycans is between 4:1 to 1:6 (w/w); the total glycoprotein content of the composition is 12% or less (w/w); and the composition comprises glycopeptide-bound oligosaccharides or free glycans having each of the following general formulae: Hex1HexNAc1Fuc1; Hex1HexNAc2; Hex1HexNAc2Fuc1; Hex1HexNAc2Fuc1 Sul1; Hex1HexNAc2 Sul1; Hex1HexNAc3; Hex2HexNAc2Fuc1; Hex2HexNAc2Fuc2; Hex2HexNAc2Fuc2Sul1; Hex2HexNAc3; Hex2HexNAc3Fuc1; Hex2HexNAc3Fuc2; Hex2HexNAc4; Hex2HexNAc4Fuc1; NeuAc1Hex1HexNAc1; NeuAc1Hex1HexNAc1Fuc1; and NeuAc1Hex1HexNAc2.

In some embodiments, the composition has a water solubility of about 100 g/L at 25° C. In some embodiments, the composition does not substantially contain particles having a diameter greater than about 4-8 µm. In some embodiments, the composition has a total free amino acid content of 8% or less (w/w). In some embodiments, the composition has a protein content of 12% or less (w/w).

In some embodiments, the composition comprises glycopeptide-bound oligosaccharides or free glycans having at least 7, at least 14, at least 21, or all of the following structures: Fucα1-2(GalNAcα1-3)Galβ1-3 GalNAco1; Fucα1-2Galβ1-3(6S-GlcNAcβ1-6)GalNAco1; Fucα1-2Galβ1-3(Fucα1-2Galβ1-4GlcNAcβ1-6)GalNAco1; Fucα1-2Galβ1-3(Galβ1-4GlcNAcβ1-6)GalNAco1; Fucα1-2Galβ1-3(GlcNAcα1-4Galβ1-4GlcNAcβ1-6)GalNAco1; Fucα1-2Galβ1-3(GlcNAcβ1-6)GalNAco1; Fucα1-2Galβ1-3 (NeuAcα2-6)GalNAco1; Fucα1-2Galβ1-3 [Fucα1-2Galβ1-4(6S)GlcNAcβ1-6]GalNAco1; Fucα1-2Galβ1-3[GalNAcα1-3(Fucα1-2)Galβ1-4GlcNAcβ1-6] GalNAco1; Fucα1-2Galβ1-3GlcNAco1; Fucα1-2Galβ1-4GlcNAco1; GalNAcα1-3(Fucα1-2)Galβ1-3(GlcNAcα1-4Galβ1-4GlcNAcβ1-6)GalNAco1; Galβ1-3(6SGlcNAcβ1-6)GalNAco1; Galβ1-3(Fucα1-2Galβ1-4GlcNAcβ1-6) GalNAco1; Galβ1-3(GlcNAcα1-4Galβ1-4GlcNAcb1-6) GalNAco1; GlcNAcα1-4Galβ1-3(NeuAcα2-6)GalNAco1; GlcNAcα1-3Galβ1-4GlcNAcβ1-6GalNAco1; GlcNAcα1-4Galβ1-3(Fucα1-2Galβ1-4GlcNAcβ1-6)GalNAco1; GlcNAcα1-4Galβ1-3(GlcNAcα1-4Galβ1-4GlcNAcβ1-6) GalNAco1; GlcNAcα1-4Galβ1-3(GlcNAcβ1-6)GalNAco1; GlcNAcα1-4Galβ1-3[GalNAcα1-3(Fucα1-2)Galβ1-4GlcNAcβ1-6]GalNAco1; GlcNAcα1-4Galβ1-3Gal (Galβ1-4GlcNAcβ1-6)GalNAco1; GlcNAcα1-4Galβ1-3GalNAco1; GlcNAcα1-4Galβ1-4GlcNAco1; and NeuAcαα2-3Galβ1-3GalNAco1. In some embodiments, the gastrointestinal tract mucins are porcine gastrointestinal tract mucins.

In some embodiments, the composition comprising a mixture of free glycans and glycopeptides is obtained by a method comprising the steps of: suspending mucin powder in a volume of ethanol; mixing the suspension in a volume of 2% aqueous Ca(OH)₂ that is at least 10× (e.g., 10-20×) the volume of ethanol and mixing the resulting suspension at a temperature of between 45-55° C. for 16-24 hours; subjecting the suspension to centrifugation to separate any remaining insoluble material; neutralizing the supernatant from the centrifugation to a pH of between 7.0 and 7.5; contacting the neutralized supernatant with diatomaceous earth (Celite®) for at least 5 minutes; and filtering the mixture to remove particles larger than about 4-8 μm. In some embodiments, obtaining the composition further comprises contacting the filtrate, obtained from filtering the mixture to remove particles larger than 4-8 μm, with a cation exchange resin at a temperature of between 45-55° C. for at least 15 minutes; removing the resin; and optionally drying the filtrate.

In some embodiments, the composition is used as a medicament. In some embodiments, the composition is a nutritional or dietary composition or nutritional or dietary premix. In some embodiments, the composition is a pharmaceutical composition further comprising a pharmaceutically acceptable carrier, diluent or excipient. In some embodiments, the composition is used for prevention and/or treatment of an unbalance of the microbiota and/or disorders associated with dysbiosis such as asymptomatic dysbiotic microbiota, in particular depleted *Akkermansia muciniphila* gut microbiota. In some embodiments, the composition is used for an animal feed. In some embodiments, the composition is used for infant formula.

Some aspects of the disclosure are directed to a method of manufacturing the compositions disclosed herein comprising the following steps: providing gastrointestinal tract mucins; suspending mucin powder in a volume of ethanol; contacting the suspension with an anion exchange resin under conditions that allow the resin to bind organic and ionic species; removing the resin and subjecting the suspension to centrifugation to separate any remaining insoluble material; contacting the supernatant from the centrifugation with diatomaceous earth (e.g., Celite®) for at least 5 minutes; and filtering the mixture to remove particles larger than about 4-8 μm.

Some aspects of the disclosure are directed to a method of manufacturing the compositions disclosed herein comprising the following steps: providing gastrointestinal tract mucins; suspending mucin powder in a volume of ethanol; mixing the suspension in a volume of 2% aqueous Ca(OH)₂ that is 10-20× the volume of ethanol and mixing the resulting suspension at a temperature of between 45-55° C. for 16-24 hours; subjecting the suspension to centrifugation to separate any remaining insoluble material; neutralizing the supernatant from the centrifugation to a pH of between 7.0 and 7.5; contacting the neutralized supernatant with diatomaceous earth (e.g., Celite®) for at least 5 minutes; and filtering the mixture to remove particles larger than about 4-8 μm. In some embodiments, the method of manufacture further comprises contacting the filtrate obtained after filtering the mixture to remove particles larger than 4-8 μm with a cation exchange resin at a temperature of between 45-55° C. for at least 15 minutes; removing the resin; and optionally drying the filtrate.

In some embodiments of the compositions disclosed herein, the composition does not significantly increase the growth of *Escherichia coli* as compared to growth of *Escherichia coli* in minimal essential media (e.g., when the composition is tested in culture or added to minimal media).

In some embodiments of the compositions disclosed herein, the composition causes a significant increase in growth of one of more bacteria selected from *Bacteroides thetaiotaomicron*, *Akkermansia muciniphila*, *Lactobacillus reuteri*, *Lactobacillus acidophilus*, *Bifidobacterium bifidum*, *Bifidobacterium animalis* subsp. *lactis*, *Bifidobacterium infantis*, and *Bifidobacterium breve* after contact with the bacteria for one or more of 24 hours, 48 hours, 72 hours or 96 hours. In some embodiments, the increase in growth is in a culture comprising or consisting of the composition and minimal media as compared to growth of the same bacteria in minimal media alone. In some embodiments, the increase in growth occurs in the gut niche of a subject administered the compositions. In some embodiments, oral administration to a subject of the composition increases the amount of *Bifidobacterium* and/or *Lactobacillus* in the intestine of the subject. In some embodiments, oral administration to a subject of the composition does not increase or even decrease the amount of *Enterococcus*, *Enterobacter* or *Clostridia* in the intestine of the subject. In some embodiments, the subject is an infant.

Compositions from Porcine Gastric Mucins without Subjecting the Mucins to Conditions or Reagents that Release Oligosaccharides from Glycoproteins Some aspects of the present disclosure are directed to a composition comprising a mixture of glycoproteins obtained from mucins of the outer mucus layer of pig stomach, wherein: a) the composition is obtained without subjecting the mucins to conditions or reagents that release oligosaccharides from glycoproteins and glycopeptides; b) glycoprotein content of the composition is greater than about 70% (w/w); and c) the free glycan content of the composition is less than 1% (w/w). In some embodiments, the oligosaccharide content of the composition is greater than or equal to about 35% (w/w). In some embodiments, the composition has a salt content of less than about 2%. In some embodiments, the composition is a powder and has a glycoprotein content of greater than 75% by weight. In some embodiments, the composition has a free glycan content of less than 0.1% by weight.

In some embodiments, the composition is a nutritional or dietary composition, nutritional or dietary premix, or infant formula. In some embodiments, the composition is an animal feed or animal feed supplement. In some embodiments, the composition is a liquid or slurry for administration to an infant (e.g., newborn).

Some aspects of the present disclosure are directed to a method of manufacturing a composition comprising a mixture of glycopeptides, comprising the following steps a)-g): a) providing a composition comprising mucins from the outer mucus layer of pig stomach or a partially purified fraction thereof and water; b) adjusting the pH of the composition to 3.0 to 3.5 with the addition of an acid and incubating the solution to hydrolyze the composition; c) isolating an aqueous phase from the composition; d) defatting the isolated aqueous phase; e) precipitating and isolating a composition comprising glycopeptides from the defatted aqueous phase; f) dewatering the isolated composition; and g) drying the dewatered composition to obtain a composition comprising a mixture of glycopeptides; wherein the composition comprising a mixture of glycopeptides has an glycopeptide content of greater than or equal to about 70% (w/w) and has a free glycan content of less than 1% (w/w).

In some embodiments, the composition of step a) has been homogenized. In some embodiments, the composition of step a) comprises about a 1:1 ratio of pig stomach outer mucus layer to water. In some embodiments, the pH is adjusted in step b) with HCl. In some embodiments, the composition is incubated in step b) at a pH of 3.0 to 3.5 for 2-4 hours at 45° C. In some embodiments, step b) further comprises adding 1 part of an aqueous solution having a pH of 3.0 to 3.5 to 2-3 parts of the composition after incubation. In some embodiments, the aqueous phase is isolated in step c) by a process comprising centrifugation followed by removal of the aqueous phase. In some embodiments, the aqueous phase obtained in step c) is filtered to remove insoluble material prior to step d). In some embodiments, the isolated aqueous phase is defatted in step d) by the addition of about 5% v/w heptane followed by incubation for 6-18 hours and removal of the hexane phase. In some embodiments, the defatted aqueous phase is filtered to remove insoluble material prior to step e). In some embodiments, the defatted aqueous phase is concentrated to ½ to ¼ of the initial volume prior to step e). In some embodiments, the composition is precipitated in step e) with ethanol or acetone at about 4° C. In some embodiments, the composition is isolated in step e) by filtration or centrifugation after precipitation. In some embodiments, the composition is dewatered in step f) with ethanol. In some embodiments, drying the dewatered composition of step g) comprises freeze drying or rotary evaporation. In some embodiments, the composition of step b) comprises pepsin. In some embodiments, the composition of step a) has not been subject to conditions or reagents that release oligosaccharides from glycoproteins and glycopeptides.

Some aspects of the present disclosure are directed to a composition comprising a mixture of glycoproteins obtained by the methods disclosed herein.

Some aspects of the present disclosure are directed to a method of treating, preventing, or reducing the severity of a pathogenic microorganism infection of the gut of a subject comprising orally administering to the subject a composition disclosed herein or a composition made by a method disclosed herein. In some embodiments, the pathogenic microorganism is selected from *Escherichia coli, Helicobacter pylori, Streptococcus* spp., *Toxoplasma gondii, Plasmodium falciparum*, influenza virus, rotavirus, and respirovirus. In some embodiments, the pathogenic microorganism is *Escherichia coli.*

Some aspects of the present disclosure are directed to a method of increasing the growth of commensal bacteria in the gut of a subject comprising orally administering to the subject a composition disclosed herein or a composition made by a method disclosed herein. In some embodiments, the commensal bacteria comprise *Lactobacillus acidophilus, Lactobacillus reuteri, Akkermansia muciniphila, Bacteroides thetaiotaomicron, Bifidobacterium breve*, and/or *Bifidobacterium infantis.*

Some aspects of the present disclosure are directed to a method of reducing the fat mass of a subject comprising orally administering to the subject a composition disclosed herein or a composition made by a method disclosed herein.

Some aspects of the present disclosure are directed to a method of treating, preventing, or reducing inflammation in a subject comprising orally administering to the subject a composition disclosed herein or a composition made by a method disclosed herein. In some embodiments, administration of the composition reduces a level of calprotectin in the blood stream or stool of the subject.

Some aspects of the present disclosure are directed to a method of increasing production of short chain fatty acid (SCFA) in the gut of a subject comprising orally administering to the subject a composition disclosed herein or a composition made by a method disclosed herein. In some embodiments, the pH in the gut of the subject is decreased.

Some aspects of the present disclosure are directed to a method of improving gut barrier integrity in the gut of a subject comprising orally administering to the subject a composition disclosed herein or a composition made by a method disclosed herein.

Some aspects of the present invention are related to a method of assisting the development of beneficial gut microbiota in an infant comprising orally administering to the infant a composition disclosed herein or a composition manufactured by a method disclosed herein. In some embodiments, the infant is a newborn. In some embodiments, the newborn was delivered by caesarean section (C-section). In some embodiments, the beneficial gut microbiota comprises one or more of *Lactobacillus acidophilus, Lactobacillus reuteri, Akkermansia muciniphila, Bacteroides thetaiotaomicron, Bifidobacterium breve*, and/or *Bifidobacterium infantis*. In some embodiments, the beneficial gut microbiota includes a decreased level of a pathogenic microorganism. In some embodiments, the pathogenic microorganism is one or more of *Escherichia coli, Helicobacter pylori, Streptococcus* spp., *Toxoplasma gondii, Plasmodium falciparum*, influenza virus, rotavirus, and/or respirovirus.

The practice of the present invention will typically employ, unless otherwise indicated, conventional techniques of cell biology, cell culture, molecular biology, transgenic biology, and microbiology which are within the skill of the art. Non-limiting descriptions of certain of these techniques are found in the following publications: Ausubel, F., et al., (eds.), Current Protocols in Molecular Biology, Current Protocols in Immunology, Current Protocols in Protein Science, and Current Protocols in Cell Biology, all John Wiley & Sons, N.Y., edition as of December 2008; Sambrook, Russell, and Sambrook, Molecular Cloning: A Laboratory Manual, 3rd ed., Cold Spring Harbor Laboratory Press, Cold Spring Harbor, 2001; Harlow, E. and Lane, D., Antibodies—A Laboratory Manual, Cold Spring Harbor Laboratory Press, Cold Spring Harbor, 1988; Freshney, R. I., "Culture of Animal Cells, A Manual of Basic Technique", 5th ed., John Wiley & Sons, Hoboken, NJ, 2005. Non-limiting information regarding therapeutic agents and human diseases is found in Goodman and Gilman's The Pharmacological Basis of Therapeutics, 11th Ed., McGraw Hill, 2005, Katzung, B. (ed.) Basic and Clinical Pharmacology, McGraw-Hill/Appleton & Lange; 10th ed. (2006) or 11th edition (July 2009). Non-limiting information regarding genes and genetic disorders is found in McKusick, V. A.: Mendelian Inheritance in Man. A Catalog of Human Genes and Genetic Disorders. Baltimore: Johns Hopkins University Press, 1998 (12th edition) or the more recent online database: Online Mendelian Inheritance in Man, OMIM™. McKusick-Nathans Institute of Genetic Medicine, Johns Hopkins University (Baltimore, MD) and National Center for Biotechnology Information, National Library of Medicine (Bethesda, MD), as of May 1, 2010, available on the World Wide Web at ncbi.nlm.nih.gov/omim/ and in Online Mendelian Inheritance in Animals (OMIA), a database of genes, inherited disorders and traits in animal species (other than human and mouse), at omia.angis.org.au/contact.shtml.

All patents, patent applications, and other publications (e.g., scientific articles, books, websites, and databases) mentioned herein are incorporated by reference in their entirety. In case of a conflict between the specification and any of the incorporated references, the specification (including any amendments thereof, which may be based on an incorporated reference), shall control. Standard art-accepted meanings of terms are used herein unless indicated otherwise. Standard abbreviations for various terms are used herein.

The above discussed, and many other features and attendant advantages of the present inventions will become better understood by reference to the following detailed description of the invention.

BRIEF DESCRIPTION OF THE DRAWINGS

FIGS. 1A-1B show a Growth curve (FIG. 1A) and bar chart representation of the OD at 600 nm (FIG. 1B) of *Bifidobacterium bifidum* in minimal medium (MM) in comparison with MM supplemented with PREP-9 and MM supplemented with PREP-10. Maximum growth was reached after 48 h (OD PREP-9=0.43 and OD PREP-10=0.41). MM supplemented with glucose (G) was included as a positive control. * Significant differences t test $p<0.05$.

FIG. 32 shows the fat phase after isolation from the aqueous and sediment phases.

FIG. 34 shows further filtration of the aqueous phase. Solid material removed by filtration is shown in the left panel. Aqueous filtrate is shown in the right panel.

FIG. 36 shows 5% heptane extraction of the aqueous phase. Left panel is a close-up of the heptane/aqueous interface. Right panel shows the extraction without stirring (left bottle) and with stirring (right panel).

FIG. 37 shows separated heptane phase and aqueous phase. Left panel shows separation of heptane and aqueous phase via a separatory funnel. Right panel shows the defatted aqueous phase (left bottle) and heptane phase (right bottle).

FIG. 38 shows defatted aqueous phase after centrifugation to separate remaining fat (left panel), followed by filtration to remove fat layer (right panel).

FIG. 39 (left panel) shows defatted aqueous phase before (left bottle) and after (right bottle) concentration in a rotary evaporator to one-third original volume. FIG. 12 (right panel) shows the concentrated aqueous phase after overnight incubation at 4° C.

FIG. 43 shows dewatering of precipitate. Top left panel shows addition of pure ethanol to precipitate. Top right panel shows isolated precipitate after removal of pure ethanol. Bottom panel shows turbid ethanol supernatant.

FIG. 45 shows dissolution of the precipitate in ultrapure water (top left panel); dissolved sample with the insoluble dark fragments (top right panel); dissolved product with the dark fragments isolated (bottom panel).

FIG. 46 shows dried insoluble dark fragment (top left panel); freeze dried final product (top right panel); milled powder of the final product (bottom panel).

DETAILED DESCRIPTION OF THE INVENTION

Figure 2A:
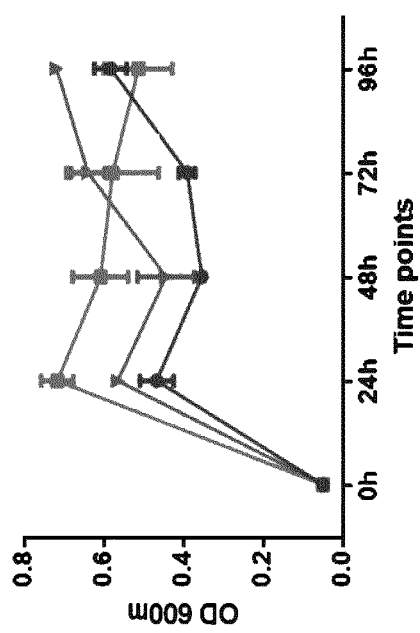
FIGS. 2A-2B show growth curve (FIG. 2A) and bar chart representation of the OD at 600 nm (FIG. 2B) of *Bifidobacterium animalis* subsp. *lactis* in minimal medium (MM) in comparison with MM supplemented with PREP-9 and MM supplemented with PREP-10. Maximum growth in MM supplemented with PREP-9 after 24 h (OD=0.72) and with PREP-10 after 96 h (OD=0.72). MM supplemented with glucose (G) was included as a positive control. * Significant differences t test $p<0.05$.

The expression "gastrointestinal tract mucins" encompasses any natural source of mucin from which glycans and glycopetides can be extracted, suitable for mammalian nutrition or pharmaceutical use. Typical sources of gastrointestinal tract mucins are extracts from gastrointestinal tract, in particular from porcine sources or from bovine sources. Commercial sources for gastrointestinal tract mucins include Biofac A/S (Kastrup, Denmark), Zhongshi Duqing (Heze, China), Shenzhen Taier Biotechnology Co., LTD (Shenzhen, China), and Dongying Tiandong Pharmaceutical Co. (Shandong, China).

In some embodiments, the gastrointestinal tract mucins are from porcine gastric mucus or pig slime. "Pig slime" is mucus extracted from pig stomachs, usually in slaughterhouses, by extraction of the upper layer of the inner stomach tissue.

The expression "subject" refers to mammals. For examples, mammals contemplated by the present invention include human, primates, domesticated animals such as cattle, sheep, pigs, horses, rodents, cats, dogs and other pets. In some embodiments, the subject is a human. In some embodiments, the subject may be an infant (1 year old or less for a human), a toddler (3 years old or less for a human), a child, a young adult, an adult or a geriatric. In some embodiments, the infant is a newborn. In some embodiments, the newborn was delivered by caesarean section (C-section). The subject may be male or female. In some embodiments, the subject is female and of child-bearing age.

The expression "domestic animal" refers to cattle, sheep, pigs, horses, other farm mammals, rodents, cats, dogs and other pets.

The expression "nutritional or dietary composition" means any comestible material having a nutritional value suitable for mammalian nutrition which can be used either alone as such or in combination with standard foodstuff.

The expression "feed additives" means products used in animal nutrition for purposes of improving the quality of feed and the quality of food from animal origin, or to improve the animals' performance and health, e.g. providing enhanced digestibility of the feed materials.

The expression "animal feed" means foodstuff suitable for animal nutrition. Substances such as nutrients and ingredients, in particular all the recommended vitamins and minerals suitable for nutritionally complete and balanced animal feed compositions, and recommenced amounts thereof, may be found for example, in the Official Publication of The Association of American Feed Control Officials, Inc. (AAFCO), Atlanta, GA, 2017 or in National Research Council, 2006, Nutritional Guidelines from the European Pet Food Industry Federation or Association of American Feed Control Officials, *Official Publication,* 2015.

The term "glycoprotein" refers to proteins linked to oligosaccharides, e.g. proteins either N-linked or O-linked to oligosaccharides, and having a molecular weight of more than about 5 KDa. The term "glycopeptide" refers to peptides linked to oligosaccharides, e.g. peptides either N-linked or O-linked to oligosaccharides, and having a molecular weight of less than about 5 KDa. Methods of determining molecular weight of glycopeptides and glycoproteins are known in the art and are not limited. In some embodiments, the molecular weight of glycopeptides and glycoproteins are determined by size exclusion chromatography.

The term "glycan" as used herein refers to an oligosaccharide that has been released or removed from a glycoprotein or glycopeptide. The term is synonymous with the term "free glycan" and "free oligosaccharide," as also used herein.

In some embodiments, peptides are defined as having a molecular weight of less than about 5 KDa. In some embodiments, the term peptides include glycopeptides. In some embodiments, proteins are defined as having a molecular weight of more than about 5 KDa. In some embodiments, the term proteins include glycoproteins.

As used herein, "a partially purified fraction" of gastrointestinal tract mucins comprises at least about 40%, at least about 50%, at least about 60%, at least about 70%, at least about 80%, at least about 90%, at least about 92.5%, at least about 95%, at least about 97.5%, at least about 98%, at least about 99%, or at least about 99.5% of the protein- and peptide-glycans present in un-purified gastrointestinal tract mucins. In some embodiments, the mucins or partially purified fraction thereof has been subject to an acid treatment.

Aspects of the present disclosure are directed to compositions comprising glycopeptides obtained from gastrointestinal tract mucins, wherein the composition is obtained without subjecting the mucins or a partially purified fraction thereof to conditions or reagents that release oligosaccharides from glycopeptides. In some embodiments, the compositions are obtained from mucins subjected to resin purification. In some embodiments, the compositions are obtained from porcine gastric mucus (pig slime).

Compositions Obtained from Mucins Using Resin Purification and without Treatment to Release Oligosaccharides In some embodiments, the composition is obtained without subjecting the mucins or a partially purified fraction thereof to conditions or reagents that release oligosaccharides from glycopeptides; the total oligosaccharide content of the composition is >15% (w/w); the free glycan content of the composition is <1% (w/w); the total glycoprotein content of the composition is about 6% or less (w/w); and the composition comprises glycopeptide-bound oligosaccharides having each of the following general formulae: Hex1HexNAc1Fuc1; Hex1HexNAc2; Hex1HexNAc2Fuc1; Hex1HexNAc2Fuc1Sul1; Hex1HexNAc3; Hex2HexNAc2; Hex2HexNAc2Fuc1 Hex2HexNAc2Fuc2; Hex2HexNAc2Fuc2Sul1; Hex2HexNAc3; Hex2HexNAc3Fuc1; Hex2HexNAc4; Hex2HexNAc4Fuc1; and NeuAc1Hex1HexNAc2.

In some embodiments, the total oligosaccharide content of the composition is greater than about 15.0% (w/w), greater than about 16.0% (w/w), greater than about 17.0% (w/w), greater than about 18.0% (w/w), greater than about 19.0% (w/w), greater than about 20.0% (w/w), greater than about 25.0% (w/w), greater than about 30.0% (w/w), greater than about 35.0% (w/w), greater than about 40% (w/w), or more. In some embodiments, the total oligosaccharide content of the composition is greater than about 15% (w/w). Methods of determining total oligosaccharide content are known in the art and are not limited. In some embodiments, total oligosaccharide content is determined by high performance anion exchange chromatography with pulsed amperometric detection (HPAEC-PAD) with an acid pretreatment to hydrolyze the oligosaccharides into monosaccharides.

In some embodiments, the free glycan content of the composition is less than about 1.0% (w/w), less than about 0.9% (w/w), less than about 0.8% (w/w), less than about 0.7% (w/w), less than about 0.6% (w/w), less than about 0.5% (w/w), less than about 0.4% (w/w), less than about 0.3% (w/w), less than about 0.2% (w/w), less than about 0.1% (w/w), or less. In some embodiments, the free glycan content of the composition is less than about 1% (w/w). In some embodiments, the free glycan content of the composition is substantially zero. Methods of determining free glycan content are known in the art and are not limited.

The composition comprises glycopeptide-bound oligosaccharides having each of the following general formulae: Hex1HexNAc1Fuc1; Hex1HexNAc2; Hex1HexNAc2Fuc1; Hex1HexNAc2Fuc1Sul1; Hex1HexNAc3; Hex2HexNAc2; Hex2HexNAc2Fuc1 Hex2HexNAc2Fuc2; Hex2HexNAc2Fuc2Sul1; Hex2HexNAc3; Hex2HexNAc3Fuc1; Hex2HexNAc4; Hex2HexNAc4Fuc1; and NeuAc1Hex1HexNAc2. In some embodiments, the composition further comprises at least one, at least two, at least three, at least four, at least five, at least six, at least seven, at least eight, at least nine, at least ten, at least fifteen, or at least twenty glycopeptide-bound oligosaccharides having a general formulae that differs from any of the general formulae set forth above. Methods of determining the general formula of glycopeptide bound oligosaccharides are known in the art. In some embodiments, the general formula of glycopeptide bound oligosaccharides is determined by liquid chromatography-electrospray ionization tandem mass spectrometry (LC-ESI/MS) after reductive glycan release.

In some embodiments, the composition has a water solubility of 80-120 g/L at 25° C. In some embodiments, the composition has a water solubility of about 80 g/L, about 85 g/L, about 90 g/L, about 95 g/L, about 100 g/L, about 105 g/L, about 110 g/L, about 115 g/L, or about 120 g/L at 25° C.

In some embodiments, the composition does not substantially contain particles having a diameter greater than about 4-8 µm (e.g., 7 µm, e.g., 4-7 µm). As utilized herein, the term "substantially" refers to the complete or nearly complete extent or degree of a characteristic or property, as would be appreciated by one of skill in the art. Thus, a composition that "does not substantially contain particles having a diameter greater than 7 µm" refers to a composition having a lack of, or near lack of, particles with a diameter greater than 7

μm, as would be appreciated by one of skill in the art. For instance, if a composition is filtered to remove particles having a diameter greater than 7 μm, such composition may still contain a trace amount of particles having a diameter greater than 7 μm, but would be considered substantially free of particles having a diameter greater than 7 μm. In some embodiments, the composition does not substantially contain particles having a diameter greater than about 8 μm, greater than about 7 μm, greater than about 6 μm, or greater than about 5 μm. Methods of determining particle size are known in the art. In some embodiments, a filter with a desired cut-off size (for instance, 7 μm) can be used to remove particles larger than the cut-off size, or determine whether a composition contains particles greater than a desired cut-off size. In some embodiments, an appropriate filter is used to remove glycoproteins (e.g., insoluble particles containing glycoproteins) without removing glycopeptides.

In some embodiments, the composition does not substantially contain lipids.

In some embodiments, the composition comprises glycopeptide-bound oligosaccharides having at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, or all of the following structures: Fucα1-2(GalNAcα1-3)Galβ1-3GalNAc; Fucα1-2(GalNAcα1-3)Galβ1-4GlcNAcβ1-3Galβ1-3GalNAc; Fucα1-2Galβ1-3(6S-GlcNAcβ1-6)GalNAc; Fucα1-2Galβ1-3(Fucα1-2Galβ1-4GlcNAcβ1-6)GalNAc; Fucα1-2Galβ1-3(GalNAcβ1-4GlcNAcβ1-6)GalNAc; Fucα1-2Galβ1-3 (Galβ1-4GlcNAcβ1-6)GalNAc; Fucα1-2Galβ1-3(GlcNAcα1-4Galβ1-4GlcNAcβ1-6)GalNAc; Fucα1-2Galβ1-3(GlcNAcβ1-6)GalNAc; Fucα1-2Galβ1-3 [Fucα1-2Galβ1-4(6S)GlcNAcβ1-6]GalNAc; Fucα1-2Galβ1-3GalNAc; Fucα1-2Galβ1-4GlcNAcβ1-3 Galβ1-3 GalNAc; GalNAcα1-3(Fucα1-2)Galβ1-3(GlcNAcα1-4Galβ1-4GlcNAcβ1-6)GalNAc; GalNAcα1-3(Fucα1-2) Galβ1-3(SGlcNAcβ1-6)GalNAc; GalNAcα1-3(Fucα1-2) Galβ1-4(6S)GlcNAcβ1-3Galβ1-3GalNAc; Galβ1-3 (6SGlcNAcβ1-6)GalNAc; Galβ1-3(Fucα1-2Galβ1-4GlcNAcβ1-6)GalNAc; Galβ1-3(GlcNAcα1-4Galβ1-4GlcNAcb1-6)GalNAc; Galβ1-4GlcNAcβ1-3Galβ1-3 (NeuAcα2-6)GalNAc; Galβ1-4GlcNAcβ1-3 Galβ1-3 GalNAc; GlcNAcα1-4Galβ1-3(NeuAcα2-6)GalNAc; GlcNAcα1-4Galβ1-3(Fucα1-2Galβ1-4GlcNAcβ1-6)GalNAc; GlcNAcα1-4Galβ1-3 (GalNAcβ1-4GlcNAcβ1-6) GalNAc; GlcNAcα1-4Galβ1-3(GlcNAcα1-4Galβ1-4GlcNAcβ1-6)GalNAc; GlcNAcα1-4Galβ1-3(GlcNAcβ1-6)GalNAc; GlcNAcα1-4Galβ1-3[GalNAcα1-3(Fucα1-2) Galβ1-4GlcNAcβ1-6]GalNAc; GlcNAcα1-4Galβ1-3Gal (Galβ1-4GlcNAcβ1-6)GalNAc; and GlcNAcα1-4Galβ1-3GalNAc. Methods of determining the structure of oligosaccharides bound to glycopeptides are known in the art and are not limited. In some embodiments, the structure of oligosaccharides bound to glycopeptides is determined by tandem mass spectrometry (MS/MS).

In some embodiments, the composition comprises glycopeptide-bound oligosaccharides having at least 14 different structures selected from the list of structures shown above. In some embodiments, the composition comprises glycopeptide-bound oligosaccharides having at least 21 different structures selected from the list of structures shown above. In some embodiments, the composition comprises at least one glycopeptide-bound oligosaccharide having each structure shown above.

In some embodiments, the composition comprises glycopeptide-bound oligosaccharides having at least 20, 30, 35, 40, 50, 60, 70, 80, 90, 100, 110, 120, 130, or more different structures.

In some embodiments, the protein (e.g., total protein and/or glycoprotein) content of the composition is less than about 6% (w/w), less than about 5% (w/w), less than about 4% (w/w), less than about 3% (w/w), less than about 2.5% (w/w), less than about 2% (w/w), less than about 1.5% (w/w), less than about 1% (w/w), less than about 0.5% (w/w), less than about 0.1% (w/w), or less. In some embodiments, the protein content of the composition is about 4.8% to 5.0% (w/w). In some embodiments, the protein content of the composition is substantially zero. Methods of determining protein content are known in the art and are not limited. In some embodiments, protein content is determined by the bicinchoninic acid (BCA) assay (Smith, P. K. et al.: Measurement of protein using bicinchoninic acid. *Anal. Biochem.* 150 (1985) 76-85).

In some embodiments, the composition comprises less than about 5%, less than about 2.5%, less than about 1%, less than about 0.5%, less than about 0.1%, or less than 0.01% free glycans (w/w). In some embodiments, the composition comprises substantially no free glycans. Methods of measuring free glycans are known in the art and are not limited.

In some embodiments, the composition comprises a total free amino acid content of about 25%, of about 20%, of about 15%, of about 10%, of about 5%, or less (w/w). In some embodiments, the composition comprises a total free amino acid content of about 10% to 15% (w/w).

Methods of Manufacturing Compositions Obtained from Mucins Using Resins without Treatment to Release Oligosaccharides Some aspects of the disclosure are directed to a method of manufacturing a composition (e.g., a composition obtained from mucins without treatment to release oligosaccharides as disclosed herein) comprising glycopeptides obtained from gastrointestinal tract mucins or a partially purified fraction thereof, the method comprising suspending mucin powder in a volume of ethanol (e.g., a sufficient volume of ethanol to suspend the mucin powder, e.g., about 1 ml of ethanol per 0.5 to 1 gram of mucin powder); mixing the suspension with a volume of water sufficient to dilute the ethanol (e.g., at least 10× the volume of ethanol, e.g., 10-20× the volume of ethanol); contacting the suspension with an anion exchange resin (e.g., about 1-5 grams resin per gram of mucin powder) under conditions that allow the resin to bind organic and ionic species and deionize the solution; removing the resin and removing any remaining insoluble material (e.g., by centrifugation and/or filtration); contacting the suspension with diatomaceous earth (e.g., Celite®) (e.g., for at least about 5 minutes); and filtering the mixture to remove particles larger than about 4 to 8 μm (e.g., about 7 μm).

As used herein, the gastrointestinal tract mucins or a partially purified fraction thereof comprise any gastrointestinal tract mucins described herein.

In some embodiments, the resin is weakly basic anion exchange resin. In some embodiments, the resin is a highly porous resin. In some embodiments, the resin is DIAION® WA30 (highly porous type weakly basic anion exchange resin) or its equivalent. In some embodiments, the suspension is contacted with the resin for at least 15 minutes, at least 30 minutes, at least 1 hour, at least 2 hours, at least 5 hours, at least 8 hours, at least 10 hours, or more. In some embodiments, the suspension is contacted with the resin for about 8 hours. In some embodiments, the suspension is contacted with the resin at a temperature of at least 65° C., at least 70° C., at least 75° C., at least 77° C., at least 80° C., at least 82° C., at least 85° C., at least 90° C., at least 95° C., or more. In some embodiments, the suspension is contacted with the resin at a temperature of about 65° C., about 70° C., about 75° C., about 77° C., about 80° C., about 82° C., about 85° C., about 90° C., about 95° C., or more. In some embodiments, the resin and suspension are contacted with stirring (e.g., magnetic stirring). Any conditions that enable binding of the resin to organic and ionic species known in the art may be used and are not limited. Methods of removing the resin from the suspension are also not limited. In some embodiments, the suspension is removed and reserved by decantation, filtration and/or centrifugation. The resin should be removed under conditions that do not release the organic and ionic species bound to the resin.

In some embodiments, after removal of the resin, the suspension is processed to remove insoluble materials. In some embodiments, the suspension is processed by centrifugation at 500 to 10,000×g and the supernatant collected to remove insoluble particles. In some embodiments, the suspension is passed through a filter having a cut-off of about 100 kDa and the filtrate collected to remove insoluble particles.

In some embodiments, after processing to remove insoluble materials, the solution is contacted with diatomaceous earth as a filter aid to reduce filter clogging. In some embodiments, the solution is contacted with about 1 gram of diatomaceous earth per 10 to 50 ml of solution. In some embodiments, the diatomaceous earth and solution are contacted with stirring (e.g., magnetic stirring). In some embodiments, the diatomaceous earth and solution are contacted for at least or about 1 minute, 2 minutes, 3 minutes, 5 minutes, 7 minutes, 8 minutes, 10 minutes, 20 minutes, or longer. The term "diatomaceous earth" that is also known as D.E., diatomite, or kieselgur/kieselguhr, means a naturally occurring, soft, siliceous sedimentary rock that is easily crumbled into a fine white to off-white powder. It has a particle size ranging from less than 3 μm to more than 1 mm, but typically 10 μm to 200 μm. Depending on the granularity, this powder can have an abrasive feel, similar to pumice powder, and has a low density as a result of its high porosity. The typical chemical composition of oven-dried diatomaceous earth is 80 to 90% silica, with 2 to 4% alumina (attributed mostly to clay minerals) and 0.5 to 2% iron oxide. In some embodiments, the diatomaceous earth is CELITE®.

After contact with the diatomaceous earth, the diatomaceous earth can be separated from the solution by any suitable means. In some embodiments, the diatomaceous earth is removed by filtration and the filtrate collected. In some embodiments, the filtration is performed with WHATMAN® 595 qualitative filter paper. In some embodiments, filtration removes particles larger than about 4 μm, about 5 μm, about 6 μm, about 7 μm, about 8 μm, or larger.

In some embodiments, after processing with diatomaceous earth, the filtrate is dried. Any suitable methods of drying known in the art may be used and is not limited. In some embodiments, the composition is dried with a rotoevaporator. In some embodiments, drying is performed at about 40 to 60° C.

Compositions Comprising Free Glycans and Glycopeptides

Some aspects of the present disclosure are directed to a composition comprising a mixture of free glycans and glycopeptides obtained from gastrointestinal tract mucins, wherein the composition is obtained without subjecting the mucins or a partially purified fraction thereof to conditions or reagents that cause complete release of oligosaccharides from glycoproteins or glycopeptides; the total oligosaccharide content of the composition is >10% (w/w); the ratio of glycopeptides:free glycans is between 4:1 to 1:6 (w/w); the total glycoprotein content of the composition is 12% or less (w/w); and the composition comprises glycopeptide-bound oligosaccharides or free glycans having each of the following general formulae: Hex1HexNAc1Fuc1; Hex1HexNAc2; Hex1HexNAc2Fuc1; Hex1HexNAc2Fuc1Sul1; Hex1HexNAc2Sul1; Hex1HexNAc3; Hex2HexNAc2Fuc1; Hex2HexNAc2Fuc2; Hex2HexNAc2Fuc2Sul1; Hex2HexNAc3; Hex2HexNAc3Fuc1; Hex2HexNAc3Fuc2; Hex2HexNAc4; Hex2HexNAc4Fuc1; NeuAc1Hex1HexNAc1; NeuAc1Hex1HexNAc1Fuc1; and NeuAc1Hex1HexNAc2.

In some embodiments, the total oligosaccharide content of the composition is greater than about 10.0% (w/w), greater than about 11.0% (w/w), greater than about 12.0% (w/w), greater than about 13.0% (w/w), greater than about 14.0% (w/w), greater than about 15.0% (w/w), greater than about 20.0% (w/w), greater than about 25.0% (w/w), greater than about 30.0% (w/w), greater than about 35% (w/w), or more. In some embodiments, the total oligosaccharide content of the composition is greater than about 10% (w/w). Methods of determining total oligosaccharide content are known in the art and are not limited. In some embodiments, total oligosaccharide content is determined by HPAEC-PAD with an acid pre-treatment to hydrolyze the glycopeptide-bound oligosaccharides and free glycans into monosaccharides.

In some embodiments, the composition has a ratio of glycopeptides:free glycans of between 4:1 to 1:6 (w/w), 3:1 to 1:6 (w/w), 2:1 to 1:6 (w/w), 1:1 to 1:6 (w/w), 3:1 to 1:5 (w/w), 3:1 to 1:4 (w/w), 3:1 to 1:3 (w/w), 3:1 to 1:2 (w/w), 3:1 to 1:1 (w/w), 2:1 to 1:5 (w/w), 1:1 to 1:5 (w/w), 2:1 to 1:4 (w/w), 1:1 to 1:3 (w/w), or 1:1 to 1:2 (w/w).

The composition comprises glycopeptide-bound oligosaccharides or free glycans having each of the following general formulae: Hex1HexNAc1Fuc1; Hex1HexNAc2; Hex1HexNAc2Fuc1; Hex1HexNAc2Fuc1Sul1; Hex1HexNAc2Sul1; Hex1HexNAc3; Hex2HexNAc2Fuc1; Hex2HexNAc2Fuc2; Hex2HexNAc2Fuc2Sul1; Hex2HexNAc3; Hex2HexNAc3Fuc1; Hex2HexNAc3Fuc2; Hex2HexNAc4; Hex2HexNAc4Fuc1; NeuAc1Hex1HexNAc1; NeuAc1Hex1HexNAc1Fuc1; and NeuAc1Hex1HexNAc2. In some embodiments, the composition further comprises at least one, at least two, at least three, at least four, at least five, at least six, at least seven, at least eight, at least nine, at least ten, at least fifteen, or at least twenty glycopeptide-bound oligosaccharides or free glycans having a general formulae that differs from any of the general formulae set forth above. Methods of determining the general formula of glycopeptide-bound oligosaccharides and free glycans are known in the art. In some embodiments, the general formula of glycopeptide bound oligosaccharides and free glycans is determined by liquid chromatography-electrospray ionization tandem mass spectrometry (LC-ESI/MS) after reductive oligosaccharide release from glycopeptides.

In some embodiments, the composition has a water solubility of 80-120 g/L at 25° C. In some embodiments, the composition has a water solubility of about 80 g/L, about 85 g/L, about 90 g/L, about 95 g/L, about 100 g/L, about 105 g/L, about 110 g/L, about 115 g/L, or about 120 g/L at 25° C.

In some embodiments, the composition does not contain particles having a diameter greater than about 8 μm, greater than about 7 µm, greater than about 6 µm, greater than about 5 µm, or greater than about 4 µm. Methods of determining particle size are known in the art. In some embodiments, a filter with a desired cut-off size (for instance, 7 µm) can be used to remove particles larger than the cut-off size, or determine whether a composition contains particles greater than a desired cut-off size.

In some embodiments, the composition does not substantially contain lipids. In some embodiments, the protein (e.g., total protein and/or glycoprotein) content of the composition is less than about 12% (w/w), less than about 11% (w/w), less than about 10% (w/w), less than about 9% (w/w), less than about 8% (w/w), less than about 7% (w/w), less than about 6% (w/w), less than about 5% (w/w), less than about 4% (w/w), less than about 3% (w/w), less than about 2% (w/w), less than about 1% (w/w), or less. In some embodiments, the protein content of the composition is about 9% to 12% (w/w). In some embodiments, the protein content of the composition is substantially zero. Methods of determining protein content are known in the art and are not limited. In some embodiments, protein content is determined by the bicinchoninic acid (BCA) assay (Smith, P. K. et al.: Measurement of protein using bicinchoninic acid. *Anal. Biochem.* 150 (1985) 76-85).

In some embodiments, the composition comprises a total free amino acid content of about 15%, of about 10%, of about 8%, of about 7.5%, of about 5%, or less (w/w). In some embodiments, the composition comprises a total free amino acid content of about 7% to 9% (w/w).

In some embodiments, the composition comprises glycopeptide-bound oligosaccharides or free glycans having at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, or all of the following structures: Fucα1-2(GalNAcα1-3)Galβ1-3GalNAco1; Fucα1-2Galβ1-3(6S-GlcNAcβ1-6)GalNAco1; Fucα1-2Galβ1-3(Fucα1-2Galβ1-4GlcNAcβ1-6)GalNAco1; Fucα1-2Galβ1-3(Galβ1-4GlcNAcβ1-6)GalNAco1; Fucα1-2Galβ1-3(GlcNAcα1-4Galβ1-4GlcNAcβ1-6)GalNAco1; Fucα1-2Galβ1-3(GlcNAcβ1-6)GalNAco1; Fucα1-2Galβ1-3(NeuAcα2-6)GalNAco1; Fucα1-2Galβ1-3 [Fucα1-2Galβ1-4(6S)GlcNAcβ1-6]GalNAco1; Fucα1-2Galβ1-3 [GalNAcα1-3(Fucα1-2)Galβ1-4GlcNAcβ1-6]GalNAco1; Fucα1-2Galβ1-3GlcNAco1; Fucα1-2Galβ1-4GlcNAco1; GalNAcα1-3(Fucα1-2)Galβ1-3(GlcNAcα1-4Galβ1-4GlcNAcβ1-6)GalNAco1; Galβ1-3(6SGlcNAcβ1-6)GalNAco1; Galβ1-3(Fucα1-2Galβ1-4GlcNAcβ1-6)GalNAco1; Galβ1-3(GlcNAcα1-4Galβ1-4GlcNAcb1-6)GalNAco1; GlcNAcα1-4Galβ1-3(NeuAcα2-6)GalNAco1; GlcNAcα1-3Galβ1-4GlcNAcβ1-6GalNAco1; GlcNAcα1-4Galβ1-3(Fucα1-2Galβ1-4GlcNAcβ1-6)GalNAco1; GlcNAcα1-4Galβ1-3(GlcNAcα1-4Galβ1-4GlcNAcβ1-6)GalNAco1; GlcNAcα1-4Galβ1-3(GlcNAcβ1-6)GalNAco1; GlcNAcα1-4Galβ1-3[GalNAcα1-3(Fucα1-2)Galβ1-4GlcNAcβ1-6]GalNAco1; GlcNAcα1-4Galβ1-3Gal(Galβ1-4GlcNAcβ1-6)GalNAco1; GlcNAcα1-4Galβ1-3GalNAco1; GlcNAcα1-4Galβ1-4GlcNAco1; and NeuAcαα2-3Galβ1-3GalNAco1.

Methods of determining the structure of oligosaccharides bound to glycopeptides and in free glycans are known in the art and are not limited. In some embodiments, the structure of oligosaccharides bound to glycopeptides and in free glycans is determined by tandem mass spectrometry (MS/MS).

In some embodiments, the composition comprises glycopeptide-bound oligosaccharides or free glycans having at least 14 different structures selected from the list of structures shown above. In some embodiments, the composition comprises glycopeptide-bound oligosaccharides or free glycans having at least 21 different structures selected from the list of structures shown above. In some embodiments, the composition comprises glycopeptide-bound oligosaccharides or free glycans having each structure shown above.

In some embodiments, the composition comprises glycopeptide-bound oligosaccharides or free glycans having at least 20, 30, 35, 40, 50, 60, 70, 80, 90, 100, 110, 120, 130, or more different structures.

In some embodiments, the composition comprises more than about 25%, more than about 30%, more than about 35%, more than about 40%, more than about 45%, more than about 50%, more than about 55%, more than about 60%, more than about 65%, more than about 70%, more than about 75%, more than about 80%, or more than about 85% free glycans (w/w). In some embodiments, the composition comprises less than 90%, 85%, 80%, 75%, or 70% free glycans (w/w). In some embodiments, the composition comprises between 25%-90% free glycans (w/w), 40%-85% free glycans (w/w), or 70%-80% free glycans (w/w). Methods of measuring free glycans are known in the art and are not limited.

Methods of Manufacturing Compositions Comprising Free Glycans and Glycopeptides

In some embodiments, a composition as described herein (e.g., a composition comprising free glycans and glycopeptides) is obtained by a method comprising the steps of: suspending mucin powder in a volume of ethanol; mixing the suspension in a volume of about 2% aqueous Ca(OH)$_2$ that is at least about 10× (e.g., 10-20×) the volume of ethanol and mixing the resulting suspension at a temperature of between 45-55° C. for 16-24 hours; subjecting the suspension to centrifugation to separate any remaining insoluble material; neutralizing the supernatant from the centrifugation to a pH of between about 7.0 and 7.5; contacting the neutralized supernatant with diatomaceous earth (Celite®) for at least 5 minutes; and filtering the mixture to remove particles larger than about 4 to 8 µm (e.g., about 7 µm). In some embodiments, obtaining the composition further comprises contacting the filtrate, obtained from filtering the mixture to remove particles larger than about 4 to 8 µm, with a cation exchange resin at a temperature of between 45-55° C. for at least 15 minutes; removing the resin; and optionally drying the filtrate.

In some embodiments, the mixture comprising about 2% aqueous Ca(OH)$_2$ and ethanol is mixed with stirring (e.g., magnetic stirring). In some embodiments, the mixture comprising 2% aqueous Ca(OH)$_2$ and ethanol is mixed at a temperature of at least 45° C., 46° C., 47° C., 48° C., 49° C., 50° C., 51° C., 52° C., 53° C., 54° C., or 55° C. In some embodiments, the mixture comprising 2% aqueous Ca(OH)$_2$ and ethanol is mixed for at least 4 hours, 8 hours, 16 hours, 17 hours, 18 hours, 19 hours, 20 hours, 21 hours, 22 hours, 23 hours, or 24 hours. In some embodiments, 2% aqueous Ca(OH)$_2$ can be substituted with about 1.5% to 3% aqueous Ca(OH)$_2$.

In some embodiments, after treatment with 2% aqueous Ca(OH)$_2$, the suspension is processed to remove insoluble materials. In some embodiments, the suspension is processed by centrifugation at 500 to 10,000×g and the supernatant collected to remove insoluble particles. In some embodiments, the suspension is passed through a filter having a cut-off of about 100 KDa and the filtrate collected to remove insoluble particles.

In some embodiments, after processing to remove insoluble materials, the solution (e.g. supernatant or filtrate) is neutralized to a pH of 7.0 to 7.5. Any suitable method of neutralization may be used and is not limited. In some embodiments, $CO_2$ gas is passed through the solution. In some embodiments, dry ice is added to the solution. In some embodiments, the solution is neutralized to a pH of about 7.0, 7.1, 7.2, 7.3, 7.4, or 7.5.

In some embodiments, after neutralization, the solution is contacted with diatomaceous earth. In some embodiments, the solution is contacted with about 1 gram of diatomaceous earth per 10 to 50 ml of solution. In some embodiments, the diatomaceous earth and solution are contacted with stirring (e.g., magnetic stirring). In some embodiments, the diatomaceous earth and solution are contacted for at least or about 1 minute, 2 minutes, 3 minutes, 5 minutes, 7 minutes, 8 minutes, 10 minutes, 20 minutes, 30 minutes, or longer. In some embodiments, the diatomaceous earth is CELITE®.

After contact with the diatomaceous earth, the diatomaceous earth can be separated from the solution by any suitable means. In some embodiments, the diatomaceous earth is removed by filtration and the filtrate collected. In some embodiments, the filtration is performed with WHATMAN® 595 qualitative filter paper. In some embodiments, filtration removes particles larger than about 5 μm, about 7 μm, about 8 μm, about 10 μm, or larger. In some embodiments, the diatomaceous earth is removed by centrifugation followed by decantation.

In some embodiments, after separation from the diatomaceous earth, the solution is contacted with an ion exchange resin to further deionize the solution. In some embodiments, the resin is a weak-base anion exchange resin (e.g., DIAION WA30). In other preferred embodiment, the resin is a strong cation exchange resin that removes Ca+ and further cations (e.g., DOWEX® MARATHON™ hydrogen form resin). In some embodiments, about 1 gram of resin is added to 5 to 15 ml of solution. In some embodiments, the resin is DOWEX® MARATHON™ hydrogen form resin (i.e., Amberlite resin) or its equivalent. In some embodiments, the solution and the resin are mixed with stirring (e.g., magnetic stirring). In some embodiments, the solution and the resin are mixed at a temperature of at least 45° C., 46° C., 47° C., 48° C., 49° C., 50° C., 51° C., 52° C., 53° C., 54° C., or 55° C. In some embodiments, the solution and the resin are mixed for at least 5 minutes, 10 minutes, 15 minutes, or longer. After mixing with the resin, the resin may be removed by any suitable method. In some embodiments, the resin is removed by centrifugation/decantation or filtration. In some embodiments, the resultant solution is dried. In some embodiments, the solution is dried with a roto-evaporator (e.g., at about 50° C.).

Compositions Obtained from Porcine Gastric Mucus without Treatment to Release Oligosaccharides Some aspects of the present invention are directed to a composition comprising a mixture of glycoproteins obtained from pig slime. "Pig slime" is mucus extracted from pig stomachs, usually in slaughterhouses, by extraction of the upper layer of the inner stomach tissue. In some embodiments, the composition is obtained without subjecting the mucins to conditions or reagents that release oligosaccharides from glycoproteins and glycopeptides. In some embodiments, the composition is obtained by a process comprising lowering the pH of the pig slime or a purified portion thereof to a pH between 2 and 5 to activate pepsin and cleave high molecular weight glycoproteins, and isolating the glycoproteins.

In some embodiments, the oligosaccharide content of the composition is greater than about 10%, 15%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 50%, or 55% (w/w). As used herein, the oligosaccharide content is the total weight of oligosaccharide in the composition. Such weight does not include the weight of proteins or peptides attached to the oligosaccharides. In some embodiments, the oligosaccharide content of the composition is greater than about 30% (w/w). In some embodiments, the oligosaccharide content of the composition is greater than or equal to about 35% (w/w). In some embodiments, the oligosaccharide content of the composition is greater than or equal to about 40% (w/w). In some embodiments, the oligosaccharide content comprises substantially all oligosaccharides bound to glycoprotein or glycopeptide without substantially any unbound oligosaccharides. In some embodiments, the oligosaccharide content comprises substantially all oligosaccharides bound to glycoproteins without substantially any unbound oligosaccharides. Methods of determining oligosaccharide content are known in the art and are not limited. In some embodiments, oligosaccharide content is determined by HPAEC-PAD with an acid pre-treatment to hydrolyze the glycans into monosaccharides.

In some embodiments, the composition has a salt content of less than about 0.1%, 0.5%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3.0, 3.5%, or 4%. In some embodiments, the composition has a salt content of less than about 2%. In some embodiments, the salt content of the composition is substantially zero.

The composition may take the form of a slurry, powder, or liquid. In some embodiments, the composition is a powder and has a glycoprotein content of greater than about 65%, 67%, 70%, 71%, 72%, 73%, 74%, 75%, 76%, 77%, 78%, 79%, 80%, 82%, or 85% by weight. In some embodiments, the composition is a powder and has a glycoprotein content of greater than about 75% by weight. In some embodiments, the composition is a slurry and has a glycoprotein content of greater than about 65%, 67%, 70%, 71%, 72%, 73%, 74%, 75%, 76%, 77%, 78%, 79%, 80%, 82%, or 85% by weight. In some embodiments, the composition is a slurry and has a glycoprotein content of greater than about 60% by weight.

In some embodiments, the composition does not comprise more than about 5%, more than about 4%, more than about 3%, more than about 2%, more than about 1%, more than about 0.5%, or more than about 0.1% free glycans. In some embodiments, the composition has a free glycan content of less than 1%. In some embodiments, the composition has a free glycan content of substantially zero. The phrase "free glycans" refers to glycans that are not attached to a protein or polypeptide.

In some embodiments, the composition is obtained from pig slime, is a powder, and has an oligosaccharide content of greater than 30%, a free glycan content of less than 1%, and a glycoprotein content of greater than 75% by weight.

Methods of Obtaining Compositions Obtained from Porcine Gastric Mucus without Treatment to Release Oligosaccharides Some aspects of the present disclosure are directed to a method of manufacturing a composition comprising a mixture of glycopeptides from pig slime, comprising the following steps: providing a composition comprising mucins from the outer mucus layer of pig stomach (i.e., pig slime) or a partially purified fraction thereof and water; adjusting the pH of the composition to 2 to 5 (e.g., 3.0 to 3.5) with the addition of an acid and incubating the solution to hydrolyze the composition; and isolating a composition comprising glycopeptides from the hydrolyzed composition. Some aspects of the present disclosure are directed to a method of manufacturing a composition comprising a mixture of glycopeptides, comprising the following steps: (a) providing a composition comprising mucins from the outer mucus layer of pig stomach (i.e., pig slime) or a partially purified fraction thereof and water; (b) adjusting the pH of the composition to 2 to 5 (e.g., 3.0 to 3.5) with the addition of an acid and incubating the solution to hydrolyze the composition; (c) isolating an aqueous phase from the composition; (d) defatting the isolated aqueous phase; and (e) precipitating and isolating a composition comprising glycopeptides from the defatted aqueous phase.

In some embodiments, the composition comprising mucins from the outer mucus layer of pig stomach (i.e., pig slime) or a partially purified fraction thereof comprises one or more proteases (e.g., pepsin) having proteolytic activity at a pH of between 2-5. In some embodiments, the composition comprising mucins from the outer mucus layer of pig stomach (i.e., pig slime) or a partially purified fraction thereof has not been subject to conditions or reagents that release oligosaccharides from glycoproteins and glycopeptides. In some embodiments, the composition is referred to as GBX102 or GBX-102.

In some embodiments, the method further comprises a step (f) of dewatering the isolated composition. In some embodiments, the method further comprises a step (g) of drying the dewatered composition to obtain a composition comprising a mixture of glycopeptides.

In some embodiments, the composition comprising a mixture of glycopeptides (i.e., the composition obtained by the methods described herein) has an oligosaccharide content of greater than or equal to about 44% (w/w), greater than or equal to about 40% (w/w), greater than or equal to about 38% (w/w), greater than or equal to about 36% (w/w), greater than or equal to about 34% (w/w), greater than or equal to about 32% (w/w), greater than or equal to about 31% (w/w), greater than or equal to about 30% (w/w), greater than or equal to about 29.5% (w/w), greater than or equal to about 29% (w/w), greater than or equal to about 28.5% (w/w), greater than or equal to about 28% (w/w), greater than or equal to about 27% (w/w), greater than or equal to about 26% (w/w), greater than or equal to about 25% (w/w), greater than or equal to about 24% (w/w), or greater than or equal to about 20% (w/w). In some embodiments, the composition comprising a mixture of glycopeptides has an oligosaccharide content of greater than or equal to about 30% (w/w).

In some embodiments, the composition of step a) has been homogenized. Methods of homogenization are not limited and may be any suitable method known in the art. In some embodiments, the composition is homogenized with a blender (e.g., for 1-2 minutes). In some embodiments, the composition is homogenized by sonication.

The ratio of pig stomach outer mucus layer (e.g., pig slime) to water for the composition of step (a) is not limited and may be any suitable ratio to enable processing of the mucus by the methods disclosed herein. In some embodiments, no water is added to the pig stomach outer mucus layer. In some embodiments, the composition of step a) comprises about a 1:1 ratio of pig stomach outer mucus layer to water.

The method of adjusting the pH of the composition in step b) is not limited. In some embodiments, the pH is adjusted in step b) with HCl. Any suitable time and temperature combination may be used to cleave high molecular weight glycopeptides in step b) via proteases in the composition (e.g., pepsin), as long as such conditions do not release or substantially release oligosaccharides from glycoproteins and glycopeptides of the mucins in the pig stomach outer mucus layer. In some embodiments, the pH is adjusted to a pH of between 2 and 5. In some embodiments, the composition is incubated in step b) at a pH of 2.8 to 3.7 for 1-5 hours at 40-50° C. In some embodiments, the composition is incubated in step b) at a pH of 3.0 to 3.5 for 2-4 hours at 45° C. In some embodiments, the incubation comprises shaking. In some embodiments, step b) further comprises a further final addition of acid after incubation. In some embodiments, step b) further comprises adding 1 part of an aqueous solution having a pH of 3.0 to 3.5 to 2-3 parts of the composition after incubation.

The isolation of the aqueous phase in step c) may be by any suitable method known in the art and is not limited. In some embodiments, the aqueous phase is isolated in step c) by a process comprising centrifugation followed by removal of the aqueous phase. Any suitable centrifugation speed may be used that separates the aqueous phase. In some embodiments, centrifugation is at 500 to 10,000×g. In some embodiments, centrifugation is performed at 4° C. In some embodiments, centrifugation is performed at 3000-4000 rpm (e.g., 3500 rpm).

In some embodiments, the aqueous phase obtained in step c) is decanted and further processed to remove insoluble material. In some embodiments, the insoluble material is removed by centrifugation. In some embodiments, the aqueous phase obtained in step c) is filtered to remove insoluble material prior to step d). In some embodiments, the filtration is performed with a cloth filter. In some embodiments, the cloth filter has a pore size of about 100-200 μM.

The method of defatting in step d) is not limited and may be any suitable method in the art. In some embodiments, defatting is with a non-polar solvent. In some embodiments, the isolated aqueous phase is defatted in step d) by the addition of about 5% v/w heptane or hexane followed by incubation for 6-18 hours at 30° C. and removal of the heptane or hexane phase. In some embodiments, the defatted aqueous phase is processed to remove insoluble materials prior to step d). In some embodiments, the defatted aqueous phase is filtered to remove insoluble material prior to step e). In some embodiments, the filtration is performed with a cloth filter. In some embodiments, the cloth filter has a pore size of about 100-200 μM.

In some embodiments, the defatted aqueous phase is concentrated to ½ to ¼ of the initial volume prior to step e). In some embodiments, the defatted aqueous phase is concentrated to ⅓ of the initial volume prior to step e). Any suitable method of concentration may be used and is not limited. In some embodiments, concentration is with a rotary evaporator. In some embodiments, the defatted aqueous phase is concentrated to ½ to ¼ of the initial volume using a rotary evaporator at 60° C. In some embodiments, the concentrated composition is incubated for 8-24 hours at about 4° C. to allow settling.

In some embodiments, the defatted aqueous phase (e.g., defatted and concentrated aqueous phase) is precipitated with an organic solvent in step e). Any suitable organic solvent may be used and is not limited. In some embodiments, the organic solvent is ethanol or acetone. In some embodiments, the organic solvent (e.g., acetone, ethanol) is added at a ratio of about 60%, 65%, 70%, 75%, 80%, 85%, 90%, or 95% (v/v) to the defatted aqueous phase. In some embodiments, the organic solvent (e.g., acetone, ethanol) is added at a ratio of 80% (v/v) to the defatted aqueous phase. In some embodiments, the organic solvent (e.g., acetone, ethanol) is added at a ratio of 80% (v/v) to the defatted aqueous phase. In some embodiments the defatted aqueous phase (e.g., defatted and concentrated aqueous phase) is precipitated with an organic solvent (e.g., acetone, ethanol) at about 4° C. In some embodiments, the precipitant is isolated in step e) by filtration or centrifugation. Any suitable methods of filtration or centrifugation may be used and are not limited. In some embodiments, the precipitant is isolated by centrifugation at 500 to 10,000 g. In some embodiments, centrifugation is performed at 3000-4000 rpm (e.g., 3500 rpm).

In some embodiments, the supernatant obtained after isolation of the precipitant is further treated with an aqueous solvent to further precipitate glycopeptides and glycoproteins. In some embodiments, the further precipitation is carried out with a ratio of about 90% (v/v) ethanol or acetone at 4 4° C. In some embodiments, the precipitant is isolated by centrifugation or filtration and pooled with the previously obtained precipitant.

The method of dewatering in step f) is not limited and may be any suitable method known in the art. In some embodiments, the isolated composition (precipitant) is dewatered with an organic solvent. In some embodiments, the composition is dewatered in step f) with ethanol.

The method of drying the dewatered composition of step g) is not limited and may be any suitable method known in the art. In some embodiments, drying the dewatered composition of step g) comprises freeze drying or rotary evaporation. In some embodiments, the dried composition is milled or homogenized to provide a powder.

Some aspects of the present invention are directed to a composition obtained by the methods disclosed above for obtaining mucins from pig slime. In some embodiments, the composition is a powder and has an oligosaccharide content of greater than 30%, a free glycan content of less than 1%, and a glycoprotein content of greater than 75% by weight.

Source and Use of the Compositions Described Herein

The source of gastrointestinal tract mucins used to obtain the compositions (e.g., a composition obtained from mucins or pig slime without treatment to release oligosaccharides, a composition comprising free glycans and glycopeptides) described herein is not limited. Gastrointestinal tract mucins can be obtained from bovine, porcine, ovine, dromedary, and avian sources. In some embodiments, the gastrointestinal tract mucins are porcine gastrointestinal tract mucins. In some embodiments, the gastrointestinal tract mucins are an industrial by-product. In some embodiments, the mucins are obtained from pig slime.

In some embodiments, the composition (e.g., a composition obtained from mucins or pig slime without treatment to release oligosaccharides, a composition comprising free glycans and glycopeptides) is for use as a medicament. In some embodiments, the composition is for use as a nutritional or dietary composition, or nutritional or dietary premix. In some embodiments, the composition is a pharmaceutical composition further comprising a pharmaceutically acceptable carrier, diluent or excipient. In some embodiments, the composition is used for prevention and/or treatment of an unbalance of the microbiota and/or disorders associated with dysbiosis such as asymptomatic dysbiotic microbiota, in particular depleted *Akkermansia muciniphila* gut microbiota. In some embodiments, the composition is used for an animal feed. In some embodiments, the composition is used for infant formula.

The present compositions are much more structurally diverse than previous pre-biotic formulations containing fructooligosaccharides (FOS) and/or galactoligosaccharides (GOS). FOS and GOS are linear chain, simpler oligosaccharides that do not contain the structural complexity and diversity of the present composition. Unlike these previous prebiotics, the glycoprotein- or glycopeptide-bound oligosaccharides, or only glycopeptide-bound oligosaccharides, of the present composition have multiple building blocks, branched structures and a higher variety of structures which impart biological functionalities including anti-microbial activity, better microbiota maintenance, and immunological activity.

In some embodiments, the composition is for use in prevention and/or treatment of an unbalance of the microbiota and/or disorders associated with dysbiosis such as asymptomatic dysbiotic microbiota, in particular depleted *Akkermansia muciniphila* gut microbiota. The term "dysbiosis" is defined as a state in which the microbiota produces harmful effects via (a) qualitative and quantitative changes in the content or amount of the microbiota itself (e.g., depleted *Akkermansia muciniphila*), (b) changes in their metabolic activities; and/or (c) changes in their local distribution. Abnormalities in microbiota composition and activity (called dysbiosis) have been implicated in the emergence of the metabolic syndrome, which include diseases such as obesity, type 2 diabetes and cardiovascular diseases. *Akkermansia muciniphila* is one of the most abundant single species in the healthy human intestinal microbiota (0.5-5% of the total bacteria). Low levels of *Akkermansia muciniphila* in the dietary tract have been associated with insulin resistance and metabolic disease. Thus, in some embodiments, a human with dysbiosis has a percentage of *Akkermansia muciniphila* in the gut compared to total gut bacteria of less than about 3%, 2%, 1.5%, 1%, or 0.5%. In some embodiments, a human with dysbiosis exhibits insulin resistance or obesity.

In some embodiments, the composition is for use in an animal feed. In some embodiments, the composition can be used for the preparation of nutritional/dietary supplement or complete food, in particular for oral delivery.

In some embodiments, the composition is in the form of a nutritional supplement or complete food. In some embodiments, the composition is useful as an infant formula supplement. In some embodiments, the composition is useful as a human nutritional supplement. In some embodiments, the composition is useful as a domestic animal nutritional supplement.

The complete food or dietary/nutritional supplement according to the invention can additionally be artificially enriched in vitamins, soluble or insoluble mineral salts or mixtures thereof or enzymes.

The compositions of the invention can be formulated as solid dosage forms containing a nutritional/dietary supplement with or without suitable excipients or diluents and prepared either by compression or molding methods well known in the art, encompassing compressed tablets and molded tablets or tablet triturates. In addition to the active or therapeutic/nutritional/cosmetic ingredient or ingredients, tablets contain a number or inert materials or additives, including those materials that help to impart satisfactory compression characteristics to the formulation, including diluents, binders, and lubricants. Other additives which help to give additional desirable physical characteristics to the finished tablet, such as disintegrators, coloring agents, flavoring agents, and sweetening agents might also be added in those compositions.

As used herein, "diluents" are inert substances added to increase the bulk of the formulation to make the tablet a practical size for compression. Commonly used diluents include calcium phosphate, calcium sulfate, lactose, kaolin, mannitol, sodium chloride, dry starch, powdered sugar, silica, and the like.

As used herein, "binders" are agents used to impart cohesive qualities to the powdered material. Binders, or "granulators" as they are sometimes known, impart cohesiveness to the tablet formulation, which insures the tablet remaining intact after compression, as well as improving the free-flowing qualities by the formulation of granules of desired hardness and size. Materials commonly used as binders include starch; gelatin; sugars, such as sucrose, glucose, dextrose, molasses, and lactose; natural and synthetic gums, such as acacia, sodium alginate, extract of Irish moss, panwar gum, ghatti gum, mucilage of isapol husks, carboxymethylcellulose, methylcellulose, polyvinylpyrrolidone, Veegum, microcrystalline cellulose, microcrystalline dextrose, amylose, and larch arabogalactan, and the like.

As used herein, "lubricants" are materials that perform a number of functions in tablet manufacture, such as improving the rate of flow of the tablet granulation, preventing adhesion of the tablet material to the surface of the dies and punches, reducing interparticle friction, and facilitating the ejection of the tablets from the die cavity. Commonly used lubricants include talc, magnesium stearate, calcium stearate, stearic acid, and hydrogenated vegetable oils.

As used herein, "disintegrators" or "disintegrants" are substances that facilitate the breakup or disintegration of tablets after administration. Materials serving as disintegrants have been chemically classified as starches, clays, celluloses, algins, or gums. Other disintegrators include Veegum HV, methylcellulose, agar, bentonite, cellulose and wood products, natural sponge, cation-exchange resins, alginic acid, guar gum, citrus pulp, cross-linked polyvinylpyrrolidone, carboxymethylcellulose, and the like.

As used herein, "coloring agents" are agents that give tablets a more pleasing appearance, and in addition help the manufacturer to control the product during its preparation and help the user to identify the product. Any of the approved certified water-soluble FD&C dyes, mixtures thereof, or their corresponding lakes may be used to color tablets. A color lake is the combination by adsorption of a water-soluble dye to a hydrous oxide of a heavy metal, resulting in an insoluble form of the dye.

As used herein, "flavoring agents" vary considerably in their chemical structure, ranging from simple esters, alcohols, and aldehydes to carbohydrates and complex volatile oils. Natural and synthetic flavors of almost any desired type are now available.

Further materials as well as formulation processing techniques and the like are set out in *The Science and Practice of Pharmacy* (Remington: The Science & Practice of Pharmacy), 22nd Edition, 2012, Lloyd, Ed. Allen, *Pharmaceutical Press*, which is incorporated herein by reference.

The compositions of the invention can be in the forms of a powder or syrups.

As used here, "powders" means a solid dosage form intended to be suspended or dissolved in water or another liquid or mixed with soft foods prior to administration. Powders are typically prepared by spray drying or freeze drying of liquid formulations. Powders are advantageous due to flexibility, stability, rapid effect, and ease of administration.

According to a particular aspect, the compositions according to the present invention are useful for use in infant food formulations or in premixes (which are then used to produce infant food formulations). The premix is usually in a dry form. The premix is usually produced by mixing the composition according to the present invention with other suitable ingredients, which are useful and/or essential in an infant formulation and/or premix (or which are useful and/or essential for the production of an infant formulation and/or premix).

According to a particular aspect, an infant formulation in the context of the present invention is usually a dry formulation, which is then dissolved either in water or in milk.

The infant food premix or food formulations may further contain auxiliary agents, for example antioxidants (such as ascorbic acid or salts thereof, tocopherols (synthetic or natural); butylated hydroxytoluene (BHT); butylated hydroxyanisole (BHA); propyl gallate; tert-butyl hydroxyquinoline and/or ascorbic acid esters of a fatty acid); ethoxyquin, plasticizers, stabilizers (such as soy lecithin, citric acid esters of mono- and di-glycerides, and the like), humectants (such as glycerine, sorbitol, polyethylene glycol), dyes, fragrances, fillers and buffers.

According to a further aspect of the present invention, is provided an infant formula or premix comprising a composition as defined herein for use in promoting, assisting or achieving balanced growth or development in an infant or preventing or reducing the risk of unbalanced growth or development in an infant. In some embodiments, oral administration to a subject of the infant formula or premix increases the amount of *Bifidobacterium* and/or *Lactobacillus* in the intestine of the subject. In some embodiments, oral administration to a subject of the infant formula or premix decreases the amount of *Enterococcus, Enterobacter* or Clostridia in the intestine of the subject.

According to a particular aspect of the present invention, an infant formula may further comprise a carbohydrate source such as lactose, saccharose, maltodextrin, starch and mixtures thereof.

According to a particular aspect of the present invention, an infant formula may further comprise human milk oligosaccharides (HMOs).

According to a particular aspect of the present invention, an infant formula may further comprise a source of lipids including high oleic sunflower oil and high oleic safflower oil. The essential fatty acids linoleic and [alpha]-linolenic acid may also be added as may small amounts of oils containing high quantities of preformed arachidonic acid and docosahexaenoic acid such as fish oils or microbial oils. An infant formula may also contain all vitamins and minerals understood to be essential in the daily diet and in nutritionally significant amounts. Minimum requirements have been established for certain vitamins and minerals. Examples of minerals, vitamins and other nutrients optionally present in the infant formula include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. An infant formula may optionally contain other substances which may have a beneficial effect such as fiber, lactoferrin, nucleotides, nucleosides, and the like.

In some embodiments, the composition is in the form of a liquid (e.g., water, milk, a sugar solution, etc.) suitable for oral administration to an infant, including a newborn.

According to a particular aspect, the animal feed formulation according to the invention can be of any form, such as dry product, semi moist product, wet food product or a liquid and includes any food supplement, snack or treat. This includes, standard food products including liquids, as well as pet food snacks (for example, snack bars, pet chew, crunchy treat, cereal bars, snacks, biscuits and sweet products). Preferably, the pet foodstuff may be in the form of a dry foodstuff or wet foodstuff. The foodstuff of the first aspect of the invention is, in particular, a nutritionally balanced food product and/or food supplement, for example a pet product and/or pet supplement.

According to a particular embodiment, the animal feed formulations or premixes may include one or more nutrients selected from essential amino acids (such as aspartic acid, serine, glutamic acid, glycine, alanine or proline) and essential lipids (such as myristic acid, palmitic acid, stearic acid, palmitoleic acid, oleic acid or linolenic acid).

In a further aspect of the invention, there is provided pet foodstuff comprising the compositions described herein. In some embodiments, the pet foodstuff comprises about 0.5% (w/w), about 1% (w/w), about 1.5% (w/w), about 2% (w/w), or about 3% (w/w) of the composition of the invention. The pet foodstuff may comprise aspartic acid, serine, glutamic acid, glycine, alanine or proline or any combination thereof and myristic acid, palmitic acid, stearic acid, palmitoleic acid, oleic acid or linolenic acid or any combination thereof.

In some embodiments, the compositions are useful as a pharmaceutical composition to treat a human suffering from obesity, diabetes, cardiometabolic diseases or low-grade inflammation.

Some aspects of the present invention are related to a method of treating, preventing, or reducing the severity of a pathogenic microorganism infection of the gut of a subject comprising orally administering to the subject a composition disclosed herein or a composition manufactured by a method disclosed herein. In some embodiments, the pathogenic microorganism is selected from *Escherichia coli, Helicobacter pylori, Streptococcus* spp., *Toxoplasma gondii, Plasmodium falciparum, Clostridium* spp., *Salmonella* spp., influenza virus, rotavirus, and respirovirus. In some embodiments, administration of the composition inhibits glycan-mediated binding of one or more pathogenic micro-organisms to mucosal cells by about 5%, 10%, 20%, 30%, 40%, 50%, 60%, 70%, 80%, 85%, 90%, 95%, 99%, 99.9% or more. In some embodiments, administration of the composition inhibits glycan-mediated binding of one or more pathogenic micro-organisms to mucosal cells by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 10-fold, 20-fold, 50-fold, 100-fold, or more. In some embodiments, administration of the composition to a patient inhibits growth or decreases the level of one or more pathogenic microorganisms (e.g., *Escherichia coli*) in the gut of the patient by about 5%, 10%, 20%, 30%, 40%, 50%, 60%, 70%, 80%, 85%, 90%, 95%, 99%, 99.9% or more. In some embodiments, administration of the composition to a patient inhibits growth or decreases the level of one or more pathogenic microorganisms (e.g., pathogenic *Escherichia coli*) in the gut of the patient by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 10-fold, 20-fold, 50-fold, 100-fold or more.

Some aspects of the present invention are related to a method of reducing the fat mass of a subject comprising orally administering to the subject a composition disclosed herein or a composition manufactured by a method disclosed herein.

Some aspects of the present invention are related to a method of treating, preventing, or reducing inflammation in a subject comprising orally administering to the subject a composition disclosed herein or a composition manufactured by a method disclosed herein. In some embodiments, administration of the composition reduces inflammation (e.g., inflammation in the gut) by about 5%, 10%, 20%, 30%, 40%, 50%, 60%, 70%, 80%, 85%, 90%, 95%, 99%, 99.9% or more. In some embodiments, administration of the composition reduces inflammation (e.g., inflammation in the gut) by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 10-fold, 20-fold, 50-fold, 100-fold, or more. In some embodiments, reduces a level of calprotectin in the blood stream or stool of the subject. In some embodiments, calprotectin is decreased in the stool or decreased in the blood by about 5%, 10%, 20%, 30%, 40%, 50%, 60%, 70%, 80%, 85%, 90%, 95%, 99%, 99.9% or more. In some embodiments, calprotectin is decreased in the stool or blood by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 10-fold, 20-fold, 50-fold, 100-fold, or more (e.g., compared to before administration of a composition of the invention).

Some aspects of the present invention are related to a method of increasing production of short chain fatty acid (SCFA) (e.g., butyrate and/or propionate) in the gut of a subject comprising orally administering to the subject a composition disclosed herein or a composition manufactured by a method disclosed herein. In some embodiments, SCFA production is increased by about 5%, 10%, 20%, 30%, 40%, 50%, 60%, 70%, 80%, 85%, 90%, 95%, 99%, 99.9% or more. In some embodiments, SCFA production is increased by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 10-fold, 20-fold, 50-fold, 100-fold, or more. In some embodiments, the composition, when orally administered to a subject, is capable of lowering pH in the gut of the subject. In some embodiments, the decrease in pH is caused by an increase in SCFA production in the gut.

In some embodiments, administration of the composition to a patient increases growth or increases the level of one or more commensal bacteria (e.g., *Lactobacillus acidophilus, Lactobacillus reuteri, Akkermansia muciniphila, Bacteroides thetaiotaomicron, Bifidobacterium breve*, and/or *Bifidobacterium infantis*) in the gut of the patient by about 5%, 10%, 20%, 30%, 40%, 50%, 60%, 70%, 80%, 85%, 90%, 95%, 99%, 99.9% or more. In some embodiments, administration of the composition to a patient increases growth or increases the level of one or more commensal bacteria (e.g., *Lactobacillus acidophilus, Lactobacillus reuteri, Akkermansia muciniphila, Bacteroides thetaiotaomicron, Bifidobacterium breve*, and/or *Bifidobacterium infantis*) in the gut of the patient by about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 10-fold, 20-fold, 50-fold, 100-fold or more.

Some aspects of the present invention are related to a method of improving gut barrier integrity in the gut of a subject comprising orally administering to the subject a composition disclosed herein or a composition manufactured by a method disclosed herein.

Some aspects of the present invention are related to a method of assisting the development of beneficial gut microbiota in an infant comprising orally administering to the infant a composition disclosed herein or a composition manufactured by a method disclosed herein. In some embodiments, the infant is a newborn. In some embodiments, the newborn was delivered by caesarean section (C-section). In some embodiments, the beneficial gut microbiota comprises one or more of *Lactobacillus acidophilus, Lactobacillus reuteri, Akkermansia muciniphila, Bacteroides thetaiotaomicron, Bifidobacterium breve*, and/or *Bifidobacterium infantis*. In some embodiments, the beneficial gut microbiota includes a decreased level of a pathogenic microorganism. In some embodiments, the pathogenic microorganism is one or more of *Escherichia coli, Helicobacter pylori, Streptococcus* spp., *Toxoplasma gondii, Plasmodium falciparum*, influenza virus, rotavirus, and/or respirovirus.

Methods of manufacturing the compositions described herein are not limited. In some embodiments, the compositions described herein are obtained by the methods of manufacture also described herein.

Bacterial Growth Properties of the Compositions Described Herein

In some embodiments, the compositions described throughout the specification cause reduced growth of *Escherichia coli* when orally administered to a subject. In some embodiments, the compositions cause less *Escherichia coli* growth than a composition comprising a substantially identical mixture of oligosaccharides, wherein a higher percentage of the oligosaccharides are free glycans. In some embodiments, the compositions cause less *Escherichia coli* growth than a composition comprising different oligosaccharides. In some embodiments, the compositions cause less *Escherichia coli* growth than a composition obtained by a method not disclosed herein. In some embodiments, the compositions cause less *Escherichia coli* in minimal media supplemented with the compositions than other mucin derived compositions. The type of *Escherichia coli* is not limited. In some embodiments, the *Escherichia coli* is commensal *Escherichia coli*. In some embodiments, the *Escherichia coli* is pathogenic *Escherichia coli* (e.g., associated with diarrheal diseases). In some embodiments, the *Escherichia coli* is both commensurate and pathogenic *Escherichia coli*. In some embodiments, "reduced growth of *Escherichia coli*" means at least about 10%, at least about 20%, at least about 30%, at least about 40%, at least about 50%, at least about 60%, at least about 70%, at least about 80%, at least about 90%, or at least about 95% less growth of *Escherichia coli*.

In some embodiments, the compositions described throughout the specification cause increased growth of *Akkermansia mucimphila* in the intestine when orally administered to a subject. In some embodiments, the compositions cause more *Akkermansia mucimphila* growth than a composition comprising a substantially identical mixture of oligosaccharides, wherein a higher percentage of the oligosaccharides are free glycans. In some embodiments, the compositions cause more *Akkermansia muciniphila* growth than a composition comprising different oligosaccharides. In some embodiments, minimal media supplemented with the compositions described herein cause increased *Akkermansia muciniphila* growth than *Akkermansia muciniphila* growth in minimal media alone. In some embodiments, the increased *Akkermansia muciniphila* growth occurs at one or more of 24 hours, 48 hours, 72 hours or 96 hours after culture inoculation. In some embodiments, the compositions cause increased growth of *Akkermansia muciniphila* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Bifidobacterium bifidum* in the intestine when orally administered to a subject. In some embodiments, the compositions cause more *Bifidobacterium bifidum* growth than a composition comprising a substantially identical mixture of oligosaccharides, wherein a higher percentage of the oligosaccharides are free glycans. In some embodiments, the compositions cause more *Bifidobacterium bifidum* growth than a composition comprising different oligosaccharides. In some embodiments, minimal media supplemented with the compositions described herein cause increased *Bifidobacterium bifidum* growth than *Bifidobacterium bifidum* growth in minimal media alone. In some embodiments, the increased *Bifidobacterium bifidum* growth occurs at one or more of 24 hours, 48 hours, 72 hours or 96 hours after culture inoculation. In some embodiments, compositions cause increased growth of *Bifidobacterium bifidum* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Lactobacillus acidophilus* in the intestine when orally administered to a subject. In some embodiments, the compositions cause more *Lactobacillus acidophilus* growth than a composition comprising a substantially identical mixture of oligosaccharides, wherein a higher percentage of the oligosaccharides are free glycans. In some embodiments, the compositions cause more *Lactobacillus acidophilus* growth than a composition comprising different oligosaccharides. In some embodiments, minimal media supplemented with the compositions described herein cause increased *Lactobacillus acidophilus* growth than *Lactobacillus acidophilus* growth in minimal media alone. In some embodiments, the increased *Lactobacillus acidophilus* growth occurs at one or more of 24 hours, 48 hours, 72 hours or 96 hours after culture inoculation. In some embodiments, the compositions cause increased growth of *Lactobacillus acidophilus* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Bifidobacterium animalis* subsp. *lactis* in the intestine when orally administered to a subject. In some embodiments, the compositions cause more *Bifidobacterium animalis* subsp. *lactis* growth than a composition comprising a substantially identical mixture of oligosaccharides, wherein a higher percentage of the oligosaccharides are free glycans. In some embodiments, the compositions cause more *Bifidobacterium animalis* subsp. *lactis* growth than a composition comprising different oligosaccharides. In some embodiments, minimal media supplemented with the compositions described herein cause increased *Bifidobacterium animalis* subsp. *lactis* growth than *Bifidobacterium animalis* subsp. *lactis* growth in minimal media alone. In some embodiments, the increased *Bifidobacterium animalis* subsp. *lactis* growth occurs at one or more of 24 hours, 48 hours, 72 hours or 96 hours after culture inoculation. In some embodiments, the obtained compositions cause increased growth of *Bifidobacterium animalis* subsp. *lactis* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Bifidobacterium breve* in the intestine when orally administered to a subject. In some embodiments, the compositions cause more *Bifidobacterium breve* growth than a composition comprising a substantially identical mixture of oligosaccharides, wherein a higher percentage of the oligosaccharides are free glycans. In some embodiments, the compositions cause more *Bifidobacterium breve* growth than a composition comprising different oligosaccharides. In some embodiments, minimal media supplemented with the compositions described herein cause increased *Bifidobacterium breve* growth than *Bifidobacterium breve* growth in minimal media alone. In some embodiments, the increased *Bifidobacterium breve* growth occurs at one or more of 24 hours, 48 hours, 72 hours or 96 hours after culture inoculation. In some embodiments, the obtained compositions cause increased growth of *Bifidobacterium breve* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Bacteroides* thetaiotaomicron in the intestine when orally administered to a subject. In some embodiments, the compositions cause more *Bacteroides* thetaiotaomicron growth than a composition comprising a substantially identical mixture of oligosaccharides, wherein a higher percentage of the oligosaccharides are free glycans. In some embodiments, the compositions cause more *Bacteroides* thetaiotaomicron growth than a composition comprising different oligosaccharides. In some embodiments, minimal media supplemented with the compositions described herein cause increased *Bacteroides* thetaiotaomicron growth than *Bacteroides* thetaiotaomicron growth in minimal media alone. In some embodiments, the increased *Bacteroides* thetaiotaomicron growth occurs at one or more of 24 hours, 48 hours, 72 hours or 96 hours after culture inoculation. In some embodiments, the compositions cause increased growth of *Bacteroides* thetaiotaomicron gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Lactobacillus reuteri* in the intestine when orally administered to a subject. In some embodiments, the compositions cause more *Lactobacillus reuteri* growth than a composition comprising a substantially identical mixture of oligosaccharides, wherein a higher percentage of the oligosaccharides are free glycans. In some embodiments, the compositions cause more *Lactobacillus reuteri* growth than a composition comprising different oligosaccharides. In some embodiments, the compositions cause more *Lactobacillus reuteri* growth than a composition (e.g., a composition comprising substantially the same oligosaccharides) obtained by a method not disclosed herein. In some embodiments, minimal media supplemented with the compositions described herein cause increased *Lactobacillus reuteri* growth than *Lactobacillus reuteri* growth in minimal media alone. In some embodiments, the increased *Lactobacillus reuteri* growth occurs at one or more of 24 hours, 48 hours, 72 hours or 96 hours after culture inoculation. In some embodiments, the compositions cause increased growth of *Lactobacillus reuteri* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

In some embodiments, the compositions described throughout the specification cause increased growth of *Bifidobacterium infantis* in the intestine when orally administered to a subject. In some embodiments, the compositions cause more *Bifidobacterium infantis* growth than a composition comprising a substantially identical mixture of oligosaccharides, wherein a higher percentage of the oligosaccharides are free glycans. In some embodiments, the compositions cause more *Bifidobacterium infantis* growth than a composition comprising different oligosaccharides. In some embodiments, the compositions cause more *Bifidobacterium infantis* growth than a composition (e.g., a composition comprising substantially the same oligosaccharides) obtained by a method not disclosed herein. In some embodiments, minimal media supplemented with the compositions described herein cause increased *Bifidobacterium infantis* growth than *Bifidobacterium infantis* growth in minimal media alone. In some embodiments, the increased *Bifidobacterium infantis* growth occurs at one or more of 24 hours, 48 hours, 72 hours or 96 hours after culture inoculation. In some embodiments, the compositions cause increased growth of *Bifidobacterium infantis* gut microbiota when orally administered to a subject. In some embodiments, growth is increased by at least about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, or 5-fold as compared to growth prior to administration of the composition.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or prior publication, or for any other reason. All statements as to the date or representation as to the contents of these documents is based on the information available to the applicants and does not constitute any admission as to the correctness of the dates or contents of these documents.

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the invention where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. For example, any one or more active agents, additives, ingredients, optional agents, types of organism, disorders, subjects, or combinations thereof, can be excluded.

Where the claims or description relate to a composition of matter, it is to be understood that methods of making or using the composition of matter according to any of the methods disclosed herein, and methods of using the composition of matter for any of the purposes disclosed herein are aspects of the invention, unless otherwise indicated or unless it would be evident to one of ordinary skill in the art that a contradiction or inconsistency would arise. Where the claims or description relate to a method, e.g., it is to be understood that methods of making compositions useful for performing the method, and products produced according to the method, are aspects of the invention, unless otherwise indicated or unless it would be evident to one of ordinary skill in the art that a contradiction or inconsistency would arise.

Where ranges are given herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. It is also understood that where a series of numerical values is stated herein, the invention includes embodiments that relate analogously to any intervening value or range defined by any two values in the series, and that the lowest value may be taken as a minimum and the greatest value may be taken as a maximum. Numerical values, as used herein, include values expressed as percentages. For any embodiment of the invention in which a numerical value is prefaced by "about" or "approximately", the invention includes an embodiment in which the exact value is recited. For any embodiment of the invention in which a numerical value is not prefaced by "about" or "approximately", the invention includes an embodiment in which the value is prefaced by "about" or "approximately".

"Approximately" or "about" generally includes numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value). It should be understood that, unless clearly indicated to the contrary, in any methods claimed herein that include more than one act, the order of the acts of the method is not necessarily limited to the order in which the acts of the method are recited, but the invention includes embodiments in which the order is so limited. It should also be understood that unless otherwise indicated or evident from the context, any product or composition described herein may be considered "isolated".

Specific examples of certain aspects of the inventions disclosed herein are set forth below in the Examples.

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

EXAMPLES

The aim of the following studies was to investigate the ability of key bacterial strains from the human intestinal microbiota to consume structurally diverse MAC formulations and the potential inhibitory effect of the formulations in unwanted bacteria in vitro.

Example 1—PREP-9 (Also Sometimes Referred to as GBX101-9 or GBX101)

10 g of mucin powder (ALI) was dispersed in 5 to 10 ml ethanol absolute in a 50 ml beaker. The ethanol slurry was then introduced to a 250 ml flask containing 100 ml deionized water. 20 g of resin (DIAION® WA30 (highly porous type weakly basic anion exchange resin)) was then added to the flask and the mixture magnetically stirred at 100 rpm and 80° C. for 8 hours. For GBX101-9_reused resin samples, the DIAION® WA30 resin used was regenerated after an initial use using a regenerant such as NaOH 1-4%. The resin was removed by decantation and remaining mixture centrifuged to pellet insoluble materials. The supernatant was recovered, 3.0 g CELITE® (diatomaceous earth) was added, and the mixture was magnetically stirred at 250 rpm for 5 minutes. The mixture was then filtered on a Buchner funnel equipped with filter paper (WHATMAN® 595 qualitative filter paper) under suction. The filtrate was recovered and dried with a rotary evaporator at 50° C. 4.8 g dry yellowish powder was obtained. Yield=48%.

Oligosaccharide Content (HPAEC-PAD): 19.51%

TABLE 1

| | | List of oligosaccharide species bound to glycopeptide (obtained via LC-MS/MS): | | | |
|---|---|---|---|---|---|
| Name | Composition | Putative structures | RT | Intensity | Percentage |
| 384-1 | Hex1HexNAc1 | Galβ1-3GalNAcol | 9.46 | 6891.2 | 0.5 |
| 384-2 | Hex1HexNAc1 | Galβ1-4GlcNAcol | | | 0.0 |
| 384-3 | Hex1HexNAc1 | GlcNAcα1-4Galol | 12.28 | 5930.0 | 0.4 |
| 425-1 | HexNAc2 | GalNAcβ1-4GlcNAcol | | | 0.0 |
| 425-2 | HexNAc2 | GlcNAcβ1-6GalNAcol | 12.57 | 455.0 | 0.0 |
| 462 | Hex1HexNAc1Sul1 | 6SGlcNAcβ1-3Galol | nd | 0.0 | 0.0 |
| 464-1 | Hex1HexNAc1Sul1 | Galβ1-4(6S)GlcNAcol | | | 0.0 |
| 464-1 | Hex1HexNAc1Sul1 | 6SGalβ1-3GalNAcol | nd | 0.0 | 0.0 |
| 464-2 | Hex1HexNAc1Sul1 | 6SGalβ1-4GlcNAcol | 11.61 | 2245.5 | 0.2 |
| 470 | NeuAc1Hex1 | NeuAcα2-3Galol | nd | 0.0 | 0.0 |
| 505 | HexNAc2Sul1 | 6SGlcNAcβ1-6GalNAcol | nd | 0.0 | 0.0 |
| 513 | NeuAc1HexNAc1 | NeuAcα2-6GalNAcol | 12.02 | 2136.6 | 0.2 |
| 529 | NeuGcHexNAc1 | NeuGcα2-6GalNAcol | 11.90 | 237.4 | 0.0 |
| 530-1 | Hex1HexNAc1deHex1 | Fucα1-2(GalNAcα1-3)Galol | 14.83 | 2780.4 | 0.2 |
| 530-2 | Hex1HexNAc1deHex1 | Fucα1-2Galβ1-3GlcNAcol | | | 0.0 |
| 530-3 | Hex1HexNAc1deHex1 | Fucα1-2Galβ1-4GlcNAcol | | | 0.0 |
| 530-4 | Hex1HexNAc1deHex1 | Fucα1-2Galβ1-3GalNAcol | 28.93 | 69636.3 | 5.2 |
| 546 | Hex2HexNAc1 | Galβ1-4GlcNAcβ1-3Galol | 13.86 | 606.9 | 0.0 |
| 571 | HexNAc2deHex1 | GlcNAcβ1-4(Fucα1-6)GlcNAcol | | | 0.0 |
| 587-1 | Hex1HexNAc2 | GlcNAcα1-4Galβ1-3GalNAcol | 12.77 | 123137.3 | 9.3 |
| 587-2 | Hex1HexNAc2 | GlcNAcα1-4Galβ1-4GlcNAcol | | | 0.0 |
| 587-3 | Hex1HexNAc2 | GlcNAcα1-4Galβ1-3GlcNAcol | | | 0.0 |
| 587-4 | Hex1HexNAc2 | Galβ1-3GlcNAcβ1-6GalNAcol | nd | 0.0 | 0.0 |
| 610-1 | Hex1HexNAc1deHex1Sul1 | Fucα1-2Galβ1-4(6S)GlcNAcol | nd | 0.0 | 0.0 |
| 610-2 | Hex1HexNAc1deHex1Sul1 | Fucα1-2Galβ1-3(6S)GlcNAcol | | | 0.0 |
| 628 | HexNAc3 | GalNAcβ1-4GlcNAcβ1-6GalNAcol | nd | 0.0 | 0.0 |
| 667-1 | Hex1HexNAc2Sul1 | GlNAcα1-4Galβ1-4(6S)GlcNAcol | nd | 0.0 | 0.0 |
| 667-2 | Hex1HexNAc2Sul1 | Galβ1-3(6SGlcNAcβ1-6)GalNAcol | 14.64 | 16848.9 | 1.3 |
| 667-3 | Hex1HexNAc2Sul1 | Galβ1-4(6S)GlcNAcβ1-6GalNAcol | 15.91 | 11887.3 | 0.9 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| 673-1 | NeuAc1Hex1HexNAc1 | NeuAcαα2-3Galβ1-3GalNAcol | nd | 0.0 | 0.0 |
| 673-2 | NeuAc1Hex1HexNAc1 | NeuAcα2-3Galβ1-4GlcNAcol | nd | 0.0 | 0.0 |
| 675-1 | NeuAc1Hex1HexNAc1 | Galβ1-3(NeuAcα2-6)GalNAcol | 13.06 | 9019.9 | 0.7 |
| 675-2 | NeuAc1Hex1HexNAc1 | NeuAcαα2-3Galβ1-3GalNAcol | 15.51 | 11662.1 | 0.9 |
| 675-3 | NeuAc1Hex1HexNAc1 | NeuAcα2-3Galβ1-4GlcNAcol | | | 0.0 |
| 676 | Hex1HexNAc1deHex2 | Fucα1-2Galβ1-4(Fucα1-3)GlcNAcol | nd | 0.0 | 0.0 |
| 690-1 | Hex2HexNAc1deHex1 | Fucα1-2Galβ-3GlcNAcβ1-3Galol | nd | 0.0 | 0.0 |
| 690-2 | Hex2HexNAc1deHex1 | Fucα1-2Galβ-4GlcNAcβ1-3Galol | nd | 0.0 | 0.0 |
| 691-1 | NeuGc1Hex1HexNAc1 | Galβ1-3(NeuGcα2-6)GalNAcol | nd | 0.0 | 0.0 |
| 691-2 | NeuGc1Hex1HexNAc1 | NeuGcα2-3Galβ1-3GalNAcol | nd | 0.0 | 0.0 |
| 733-1 | Hex1HexNAc2deHex1 | Fucα1-2(GalNAcα1-3)Galβ1-3GlcNAcol | | | 0.0 |
| 733-2 | Hex1HexNAc2deHex1 | Fucα1-2(GalNAcα1-3)Galβ1-3GalNAcol | 18.10 | 46277.9 | 3.5 |
| 733-3 | Hex1HexNAc2deHex1 | Fucα1-2Galβ1-4GlcNAcβ1-6GalNAcol | nd | 0.0 | 0.0 |
| 733-4 | Hex1HexNAc2deHex1 | Fucα1-2Galβ1-3(GlcNAcβ1-6)GalNAcol | 28.93 | 23520.0 | 1.8 |
| 749-1 | Hex2HexNAc2 | GlcNAcα1-4Galβ1-4GlcNAcβ1-3Galol | 15.12 | 1743.3 | 0.1 |
| 749-2 | Hex2HexNAc2 | Galβ1-3(Galβ1-4GlcNAcβ1-6)GalNAcol | 16.01 | 8323.8 | 0.6 |
| 749-3 | Hex2HexNAc2 | Galβ1-4GlcNAcβ1-3Galβ1-3GalNAcol | 16.80 | 32791.8 | 2.5 |
| 790-1 | Hex1HexNAc3 | GlcNAcα1-4Galβ1-3(GlcNAcβ1-6)GalNAcol | 15.22 | 39804.1 | 3.0 |
| 790-2 | Hex1HexNAc3 | GlcNAcα1-3Galβ1-4GlcNAcβ1-6GalNAcol | nd | 0.0 | 0.0 |
| 811 | Hex1HexNAc2deHex1Sul1 | Fucα1-2Galβ1-3(6S-GlcNAcβ1-6)GalNAcol | nd | 0.0 | 0.0 |
| 813-1 | Hex1HexNAc2deHex1Sul1 | Fucα1-2(GalNAcα1-3)Galβ1-4(6S)GlcNAcol | | | 0.0 |
| 813-2 | Hex1HexNAc2deHex1Sul1 | Fucα1-2Galβ1-3(6S-GlcNAcβ1-6)GalNAcol | 30.61 | 132920.6 | 10.0 |
| 821 | NeuAc1Hex1HexNAc1deHex1 | Fucα1-2Galβ1-3(NeuAcα2-6)GalNAcol | 30.61 | 4413.4 | 0.3 |
| 829 | Hex2HexNAc2Sul1 | Galβ1-4(6S)GlcNAcβ1-3Galβ1-3GalNAcol | 19.69 | 1830.9 | 0.1 |
| 835 | NeuAc1Hex2HexNAc1 | NeuAcα2-3Galβ1-4GlcNAcβ1-3Galol | nd | 0.0 | 0.0 |
| 837 | NeuAc1Hex2HexNAc1 | NeuAcα2-3Galβ1-4GlcNAcβ1-3Galol | nd | 0.0 | 0.0 |
| 870 | Hex1HexNAc3Sul1 | GlcNAcα1-4Galβ1-3[(6S)GlcNAcβ1-6]GalNAcol | 17.50 | 5854.2 | 0.4 |
| 878 | NeuAc1Hex1HexNAc2 | GlcNAcα1-4Galβ1-3(NeuAcα2-6)GalNAcol | 15.91 | 32566.1 | 2.4 |
| 879 | Hex1HexNAc2deHex2 | Fucα1-2(GalNAcα1-3)Gal-(Fuc)GlcNAcol | | | 0.0 |
| 895-1 | Hex2HexNAc2deHex1 | Galβ1-4(Fucα1-3)GlcNAcβ1-3Galβ1-3GalNAcol | 14.25 | 1633.7 | 0.1 |
| 895-2 | Hex2HexNAc2deHex1 | Fucα1-2Galβ1-4GlcNAcβ1-3Galβ1-3GalNAcol | 21.72 | 24145.7 | 1.8 |
| 895-3 | Hex2HexNAc2deHex1 | Galβ1-3(Fucα1-2Galβ1-4GlcNAcβ1-6)GalNAcol | 23.26 | 18270.0 | 1.4 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| 895-4 | Hex2HexNAc2deHex1 | Fucα1-2Galβ1-3(Galβ1-4GlcNAcβ1-6)GalNAcol | 29.12 | 19822.2 | 1.5 |
| 936-1 | Hex1HexNAc3deHex1 | Fucα1-2(GalNAcα1-3)Galβ1-4GlcNAcβ1-6GalNAcol | nd | 0.0 | 0.0 |
| 936-2 | Hex1HexNAc3deHex1 | Fucα1-2Galβ1-3(GalNAcβ1-4GlcNAcβ1-6)GalNAcol | 29.12 | 12981.5 | 1.0 |
| 950 | Hex1HexNAc3Sul2 | 6SGlcNAcα1-4Galβ1-3(6SGlcNAcβ1-6)GalNAcol | 21.12 | 1180.0 | 0.1 |
| 952-1 | Hex2HexNAc3 | Galβ1-3(GlcNAcα1-4Galβ1-4GlcNAcb1-6)GalNAcol | 17.20 | 75572.8 | 5.7 |
| 952-2 | Hex2HexNAc3 | GlcNAcα1-4Galβ1-3Gal(Galβ1-4GlcNAcβ1-6)GalNAcol | 18.10 | 14277.8 | 1.1 |
| 952-3 | Hex2HexNAc3 | GlcNAcα1-4Galβ1-4GlcNAcβ1-3Galβ1-4GlcNAcol | | | 0.0 |
| 966 | NeuAc2Hex1HexNAc1 | NeuAcα2-3Galβ1-3(NeuAcα2-6)GalNAcol | 16.90 | 4768.3 | 0.4 |
| 975-1 | Hex2HexNAc2deHex1Sul1 | GalNAcα1-3(Fucα1-2)Galβ1-4(6S)GlcNAcβ1-3Galol | nd | 0.0 | 0.0 |
| 975-2 | Hex2HexNAc2deHex1Sul1 | Galβ1-3[Fucα1-2Galβ1-4(6S)GlcNAcβ1--6]GalNAcol | 17.60 | 2902.5 | 0.2 |
| 975-3 | Hex2HexNAc2deHex1Sul1 | Fucα1-2Galβ1-4(6S)GlcNAcβ1-3Galβ1-3GalNAcol | 18.61 | 10925.2 | 0.8 |
| 982 | NeuAc1NeuGc1Hex1HexNAc1 | NeuGcα2-3Galβ1-3(NeuAcα2-6)GalNAcol | nd | 0.0 | 0.0 |
| 993 | Hex1HexNAc4 | GlcNAcα1-4Galβ1-3(GalNAcβ1-4GlcNAcβ1-6)GalNAcol | 16.90 | 15927.5 | 1.2 |
| 1016-1 | Hex1HexNAc3deHex1Sul1 | Fucα1-2Galβ1-4(6S)GlcNAcβ1-6(GlcNAcβ1-3)GalNAcol | nd | 0.0 | 0.0 |
| 1016-2 | Hex1HexNAc3deHex1Sul1 | GalNAcα1-3(Fucα1-2)Galβ1-3(SGlcNAcβ1-6)GalNAcol | 21.82 | 16011.8 | 1.2 |
| 1040-1 | NeuAc1Hex2HexNAc2 | Galβ1-4GlcNAcβ1-3Galβ1-3(NeuAcα2-6)GalNAcol | 20.30 | 16458.0 | 1.2 |
| 1040-2 | NeuAc1Hex2HexNAc2 | NeuAcα2-3Galβ1-3(Galβ1-4GlcNAcβ1-6)GalNAcol | 23.06 | 3276.1 | 0.2 |
| 1041-1 | Hex2HexNAc2deHex2 | Fucα1-2Galβ1-4GlcNAcβ1-3(Fucα1-2)Galβ1-4GlcNAcol | | | 0.0 |
| 1041-2 | Hex2HexNAc2deHex2 | Fucα1-2Galβ1-3(Fucα1-2Galβ1-4GlcNAcβ1-6)GalNAcol | 30.81 | 48969.0 | 3.7 |
| 1057 | Hex3HexNAc2deHex1 | Fucα1-2Galβ1-4GlcNAcβ1-3(Galβ1-4GlcNAcβ1-6)Galol | nd | 0.0 | 0.0 |
| 1081 | NeuAc1Hex1HexNAc3 | NeuAcα2-6GalNAcβ1-4GlcNAcβ1-3Galβ1-3GalNAcol | nd | 0.0 | 0.0 |
| 1098-1 | Hex2HexNAc3deHex1 | Fucα1-2(GalNAcα1-3)Galβ1-4GlcNAcβ1-3Galβ1-3GalNAcol | 15.12 | 15651.3 | 1.2 |
| 1098-2 | Hex2HexNAc3deHex1 | Galβ1-3[Fucα1-2(GalNAcα1-3)Galβ1- | nd | 0.0 | 0.0 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| 1098-3 | Hex2HexNAc3deHex1 | 4GlcNAcβ1-6]GalNAcol GlcNAcα1-4Galβ1-3(Fucα1-2Galβ1-4GlcNAcβ1-6)GalNAcol | 25.30 | 41341.4 | 3.1 |
| 1098-4 | Hex2HexNAc3deHex1 | Fucα1-2Galβ1-3(GlcNAcα1-4Galβ1-4GlcNAcβ1-6)GalNAcol | 29.41 | 16772.4 | 1.3 |
| 1114 | Hex3HexNAc3 | Galβ1-3(Galβ1-4GlcNAcβ1-3Galβ1-4GlcNAcβ1-6)GalNAcol | 22.55 | 4439.4 | 0.3 |
| 1121 | Hex2HexNAc2deHex2Sul1 | Fucα1-2Galβ1-3[Fucα1-2Galβ1-4(6S)GlcNAcβ1-6]GalNAcol | 31.10 | 23776.5 | 1.8 |
| 1135 | Hex3HexNAc2deHex1Sul1 | Fucα1-2Galβ1-4GlcNAcβ1-3Galβ1-4(6S)GlcNAcβ1-3Galol | nd | 0.0 | 0.0 |
| 1139 | Hex1HexNAc4deHex1 | Fucα1-2(GalNAcα1-3)Galβ1-3(GalNAcβ1-4GlcNAcβ1-6)GalNAcol | 20.70 | 6145.9 | 0.5 |
| 1155 | Hex2HexNAc4 | GlcNAcα1-4Galβ1-3(GlcNAcα1-4Galβ1-4GlcNAcβ1-6)GalNAcol | 19.20 | 113030.3 | 8.5 |
| 1178-1 | Hex2HexNAc3deHex1Sul1 | GalNAcα1-3(Fucα1-2)Galβ1-4(6S)GlcNAcβ1-3Galβ1-3GalNAcol | 16.30 | 13960.9 | 1.0 |
| 1178-2 | Hex2HexNAc3deHex1Sul1 | Fucα1-2Galβ1-4GlcNAcβ1-3Galβ1-4(6S)GlcNAcβ1-6GalNAcol | 22.44 | 10811.9 | 0.8 |
| 1186-1 | NeuAc1Hex2HexNAc2deHex1 | Fucα1-2Galβ1-4GlcNAcβ1-3Galβ1-3(NeuAcα2-6)GalNAcol | nd | 0.0 | 0.0 |
| 1186-2 | NeuAc1Hex2HexNAc2deHex1 | NeuAcα2-3Galβ1-3(Fucα1-2Galβ1-4GlcNAcβ1-6)GalNAcol | 26.82 | 3062.3 | 0.2 |
| 1201 | Hex3HexNAc2deHex2 | Fucα1-2Galβ1-4GlcNAcβ1-3Gal(Fuc)GlcNAcβ1-3Galol | nd | 0.0 | 0.0 |
| 1203-1 | Hex3HexNAc2deHex2 | Fucα1-2Galβ1-4GlcNAcβ1-3[Fuc(Gal)GlcNAcβ1-6]Galol | nd | 0.0 | 0.0 |
| 1203-2 | Hex3HexNAc2deHex2 | Fucα1-2Galβ1-4GlcNAcβ1-3(Fucα1-2Galβ1-4GlcNAcβ1-6)Galol | nd | 0.0 | 0.0 |
| 1219 | Hex1HexNAc4deHex1Sul1 | GalNAcα1-3(Fucα1-2)Galβ1-3[GalNAcβ1-4(6S)GlcNAcβ1-6]GalNAcol | nd | 0.0 | 0.0 |
| 1243-1 | NeuAc1Hex2HexNAc3 | GlcNAcα1-4Galβ1-4GlcNAcβ1-3Galβ1-3(NeuAcα2-6)GalNAcol | 20.40 | 9027.8 | 0.7 |
| 1243-2 | NeuAc1Hex2HexNAc3 | NeuAcα2-3Galβ1-3[GlcNAcα1-4Galβ1-4GlcNAcβ1-6]GalNAcol | 24.28 | 5094.6 | 0.4 |
| 1244-1 | Hex2HexNAc3deHex2 | GalNAcα1-3(Fucα1-2)Galβ1-3[Fucα1-2Galβ1-4GlcNAcβ1-6]GalNAcol | nd | 0.0 | 0.0 |
| 1244-2 | Hex2HexNAc3deHex2 | Fucα1-2Galβ1-3[GalNAcα1-3(Fucα1- | 29.22 | 12328.3 | 0.9 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| | | 2)Galβ1-4GlcNAcβ1-6]GalNAcol | | | |
| 1260-1 | Hex3HexNAc3deHex1 | Fucα1-2Gaβ1-4GlcNAcβ1-3Galβ1-3(Gaβ1-4GlcNAcβ1-6)GalNAcol | nd | 0.0 | 0.0 |
| 1260-2 | Hex3HexNAc3deHex1 | Fucα1-2Galβ1-4GlcNAcβl-3(GlcNAcα1-4Galβ1-4GlcNAcβ1-6)Galol | nd | 0.0 | 0.0 |
| 1301-1 | Hex2HexNAc4deHex1 | GlcNAcα1-4Galβ1-3[GalNAcα1-3(Fucα1-2)Galβ1-4GlcNAcβ1-6]GalNAcol | 19.10 | 27788.4 | 2.1 |
| 1301-2 | Hex2HexNAc4deHex1 | GalNAcα1-3(Fucα1-2)Galβ1-3(GlcNAcα1-4Galβ1-4GlcNAcβ1-6]GalNAcol | 22.13 | 23452.1 | 1.8 |
| 1317-1 | Hex3Hex4 | GlcNAcα1-4Galβ1-4GlcNAcβ1-3(GlcNAcα1-4Galβ1-4GlcNAcβ1-6)Galol | 22.75 | 6131.7 | 0.5 |
| 1317-2 | Hex3Hex4 | Galβ1-3(HexNAc-Galβ1-4GlcNAcβ1-3Galβ1-4GlcNAcβ1-6)GalNAcol | nd | 0.0 | 0.0 |
| 1317-3 | Hex3Hex4 | GlcNAcα1-4Galβ1-4GlcNAcβ1-3Galβ1-4GlcNAcβ1-3Galβ1-3GalNAcol | nd | 0.0 | 0.0 |
| 1324-1 | Hex2HexNAc3deHex2Sul1 | Fucα1-2Galβ1-4GlcNAcβ1-3[Fucα1-2Gal-(6S)GlcNAcβ1-6]GalNAcol | nd | 0.0 | 0.0 |
| 1324-2 | Hex2HexNAc3deHex2Sul1 | S + Fucα1-2Gal-GlcNAcβ1-3(Fucα1-2Gal-GlcNAcβ1-6)GalNAcol | nd | 0.0 | 0.0 |
| 1324-3 | Hex2HexNAc3deHex2Sul1 | Fucα1-2Galβ1-3[GalNAcα1-3(Fucα1-2)Galβ1-4(6S)GlcNAcβ1-6]GalNAcol | nd | 0.0 | 0.0 |
| 1331 | NeuAc2Hex2HexNAc2 | NeuAcα2-3Galβ1-3(NeuAcα2-3Galβ1-4GlcNAcβ1-6)GalNAcol | 22.95 | 3047.2 | 0.2 |
| 1340-1 | Hex3HexNAc3deHex1Sul1 | Fucα1-2Galβ1-4(6S)GlcNAcβ1-3Galβ1-4GlcNAcβ1-3Galβ1-3GalNAcol | nd | 0.0 | 0.0 |
| 1340-2 | Hex3HexNAc3deHex1Sul1 | Fucα1-2Galβ1-4(6S)GlcNAcβ1-3Galβ1-4GlcNAcβ1-3Galβ1-4GlcNAcol | | | 0.0 |
| 1358 | Hex2HexNAc5 | GlcNAcα1-4Gal-GlcNAcβ1-3(GlcNAcα1-4Gal-GlcNAcβ1-6)GalNAcol | 21.01 | 4103.1 | 0.3 |
| 1381 | Hex2HexNAc4deHex1Sul1 | GalNAcα1-3(Fucα1-2)Galβ1-4GlcNAcβ1-3Galβ1-4(6S)GlcNAcβ1-6GalNAcol | 18.20 | 4107.8 | 0.3 |
| 1389 | NeuAc1Hex2HexNAc3deHex1 | NeuAcα2-3Galβ1-3[GalNAcα1-3(Fucα1-2)Galβ1-4GlcNAcβ1-6]GalNAcol | nd | 0.0 | 0.0 |
| 1406-1 | Hex3HexNAc3deHex2 | Fucα1-2Galβ1-4GlcNAcβ1-3Galβ1-3[Gal(Fuc)GlcNAcβ1-6]GalNAcol | 27.24 | 3730.8 | 0.3 |
| 1406-2 | Hex3HexNAc3deHex2 | Fucα1-2Galβ1-4GlcNAcβ1-3(Fucα1- | 30.12 | 11022.8 | 0.8 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| 1447 | Hex2HexNAc4deHex2 | 2Galβ1-4GlcNAcβ1-6)Galβ1-3GalNAcol GalNAcα1-3(Fucα1-2)Galβ1-3[GalNAcα1-3(Fucα1-2)Galβ1-4GlcNAcβ1-6]GalNAcol | 21.82 | 11604.3 | 0.9 |
| 1463-1 | Hex3HexNAc4deHex1 | GalNAcα1-3(Fucα1-2)Galβ1-3(Galβ1-4GlcNAcβ1-3Galβ1-4GlcNAcβ1-6)GalNAcol | 21.52 | 2291.1 | 0.2 |
| 1463-2 | Hex3HexNAc4deHex1 | Gal-GlcNAcβ1-3(Fucα1-2Galβ1-4GlcNAcβ1-6)Galβ1-3(GlcNAcβ1-6)GalNAcol | 25.90 | 6791.3 | 0.5 |
| 1463-3 | Hex3HexNAc4deHex1 | Fucα1-2Galβ1-4GlcNAcβ1-3(GlcNAcβ1-6)Galβ1-3(Gal-GlcNAcβ1-6)GalNAcol | 26.82 | 3841.7 | 0.3 |
| 1486 | Hex3HexNAc3deHex2Sul1 | Fucα1-2Galβ1-4GlcNAcβ1-3[Fucα1-2Galβ1-4(6S)GlcNAcβ1-6)Galβ1-3GalNAcol | nd | 0.0 | 0.0 |
| 1520-1 | Hex3HexNAc5 | GlcNAcα1-4Galβ1-4GlcNAcβ1-3(GlcNAcα1-4Galβ1-4GlcNAcβ1-6)Galβ1-3GalNAcol | 23.36 | 4655.7 | 0.4 |
| 1520-2 | Hex3HexNAc5 | GlcNAcα1-4Galβ1-3(GlcNAcα1-4Galβ1-4GlcNAcβ1-3Galβ1-4GlcNAcβ1-6)GalNAcol | 24.28 | 1908.4 | 0.1 |
| 1527 | Hex2HexNAc4deHex2Sul1 | GalNAcα1-3(Fucα1-2)Galβ1-3[GalNAcα1-3(Fucα1-2)Galβ1-4(6S)GlcNAcβ1 6)GalNAcol | nd | 0.0 | 0.0 |
| 1543 | Hex3HexNAc4deHex1Sul1 | Fucα1-2(GalNAcα1-3)Galβ1-4GlcNAcβ1-3Galβ1-4(6S)GlcNAcβ1-3Galβ1-4GlcNAcol | | | 0.0 |
| 1609-1 | Hex3HexNAc4deHex2 | Fucα1-2Galβ1-4GlcNAcβ1-3[Gal(Fuc)GlcNAcβ1-6]Galβ1-3(GlcNAcβ1-6)GalNAcol | 27.24 | 1147.4 | 0.1 |
| 1609-2 | Hex3HexNAc4deHex2 | Fucα1-2Galβ1-4GlcNAcβ1-3(GlcNAcβ1-6)Galβ1-3(Fucα1-2Galβ1-4GlcNAcβ1-6)GalNAcol | 28.06 | 3724.3 | 0.3 |
| 1609-3 | Hex3HexNAc4deHex2 | Fucα1-2Galβ1-4GlcNAcβ1-3(Fucα1-2Galβ1-4GlcNAcβ1-6)Galβ1-3(GlcNAcβ1-6)GalNAcol | 29.92 | 9117.0 | 0.7 |
| 1625 | Hex4HexNAc4deHex1 | Galβ1-4GlcNAcβ1-3(Fucα1-2Galβ1-4GlcNAcβ1-6)Galβ1-3(Galβ1-4GlcNAcβ1-6)GalNAcol | 26.62 | 5972.5 | 0.4 |
| 1666 | Hex3HexNAc5deHex1 | GlcNAcα1-4Galβ1-4GlcNAcβ1-3GlcNAcβ1-6)Galβ1-3(Fucα1-2Galβ1-4GlcNAcβ1-6)GalNAcol | 21.21 | 3459.3 | 0.3 |
| 1689-1 | Hex3HexNAc4deHex2Sul1 | Fucα1-2Gal-GlcNAcβ1-3(Fucα1- | 28.06 | 1840.6 | 0.1 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| | | 2Gal-GlcNAcβ1-6)Galβ1-3(6S-GlcNAcβ1-6)GalNAcol | | | |
| 1689-2 | Hex3HexNAc4deHex2Sul1 | Fucα1-2Gal-GlcNAcβ1-3(Fucα1-2Gal-GlcNAcβ1-6)Galβ1-3(6S-GlcNAcβ1-6)GalNAcol | nd | 0.0 | 0.0 |
| 1723 | Hex3HexNAc6 | GlcNAcα1-4Galβ1-4GlcNAcβ1-3(GlcNAcβ1-6)Galβ1-3(GlcNAcα1-4Galβ1-4GlcNAcβ1-6)GalNAcol | 23.87 | 4641.7 | 0.3 |
| 1771 | Hex4HexNAc4deHex2 | Fucα1-2Galβ1-4GlcNAcβ1-3(Fucα1-2Galβ1-4GlcNAcβ1-6)Galβ1-3(Galβ1-4GlcNAcβ1-6)GalNAcol | 27.44 | 1697.8 | 0.1 |
| 1812 | Hex3HexNAc5deHex2 | GalNAcα1-3(Fucα1-2)Galβ1-3[GalNAcα1-3(Fucα1-2)Galβ1-4GlcNAcβ1-3Galβ1-4GlcNAcβ1-6]GalNAcol | 18.40 | 2339.1 | 0.2 |
| 1828 | Hex4HexNAc5deHex1 | | nd | 0.0 | 0.0 |
| 1869-1 | Hex3HexNAc6deHex1 | GlcNAcβ1-3[Fucα1-2(GalNAcα1-3)Galβ1-4GlcNAcβ1-6]Galβ1-3(GlcNAcα1-4Galβ1-4GlcNAcβ1-6)GalNAcol | 22.23 | 6505.7 | 0.5 |
| 1869-2 | Hex3HexNAc6deHex1 | | nd | 0.0 | 0.0 |
| 1876 | Hex5HexNAc3deHex3 | | nd | 0.0 | 0.0 |
| 1885 | Hex4HexNAc6 | GlcNAcα1-4Galβ1-4GlcNAcβ1-3(Galβ1-4GlcNAcβ1-6)Galβ1-3(GlcNAcα1-4Galβ1-4GlcNAcβ1-6)GalNAcol | 25.00 | 2523.2 | 0.2 |
| 1917-1 | Hex4HexNAc4deHex3 | Fucα1-2Galβ1-4GlcNAcβ1-3(Fucα1-2Galβ1-4GlcNAcβ1-6)Galβ1-3[Gal(Fuc)GlcNAcβ1-6]GalNAcol | 29.02 | 2067.6 | 0.2 |
| 1917-2 | Hex4HexNAc4deHex3 | Fucα1-2Galβ1-4GlcNAcβ1-3(Fucα1-2Galβ1-4GlcNAcβ1-6)Galβ1-3[Fucα1-2Galβ1-4GlcNAcβ1-6]GalNAcol | 31.10 | 6980.1 | 0.5 |
| 1926 | Hex3HexNAc7 | GlcNAcα1-4Galβ1-4GlcNAcβ1-3(GlcNAcα1-4GlcNAcβ1-6)Galβ1-3(GalNAcβ1-4GlcNAcβ1-6)GalNAcol | nd | 0.0 | 0.0 |
| 1974-1 | Hex4HexNAc5deHex2 | GlcNAcα1-4Galβ1-4GlcNAcβ1-3(Fucα1-2Galβ1-4GlcNAcβ1-6)Galβ1-3(Fucα1-2Galβ1-4GlcNAcβ1-6)GalNAcol | nd | 0.0 | 0.0 |
| 1974-2 | Hex4HexNAc5deHex2 | Fucα1-2Galβ1-4GlcNAcβ1-3(Fucα1-2Galβ1-4GlcNAcβ1-6)Galβ1-3(GlcNAcα1-4Galβ1-4GlcNAcβ1-6)GalNAcol | nd | 0.0 | 0.0 |
| 1990 | Hex5HexNAc5deHex1 | Fucα1-2Galβ1-4GlcNAcβ1-3Galβ1- | nd | 0.0 | 0.0 |

TABLE 1-continued

List of oligosaccharide species bound to glycopeptide (obtained via LC-MS/MS):

| Name | Composition | Putative structures | RT | Intensity | Percentage |
|---|---|---|---|---|---|
| | | 4GlcNAcβ1-3Galβ1-4GlcNAcβ1-3Galβ1-4GlcNAcβ1-3Galβ1-3GalNAcol | | | |
| 1996 | NeuAc1Hex4HexNAc4deHex1Sul1 | | nd | 0.0 | 0.0 |
| 2031-1 | Hex4HexNAc6deHex1 | GlcNAcα1-4Galβ1-4GlcNAcβ1-3(GlcNAcα1-4Galβ1-4GlcNAcβ1-6)Galβ1-3(Fucα1-2Galβ1-4GlcNAcβ1-6)GalNAcol | 27.24 | 7088.9 | 0.5 |
| 2031-2 | Hex4HexNAc6deHex1 | Fucα1-2Galβ1-4GlcNAcβ1-3(GlcNAcα1-4Galβ1-4GlcNAcβ1-6)Galβ1-3(GlcNAcα1-4Galβ1-4GlcNAcβ1-6)GalNAcol | nd | 0.0 | 0.0 |
| 2088 | Hex4HexNAc7 | GlcNAcα1-4Galβ1-4GlcNAcβ1-3(GlcNAcα1-4Galβ1-4GlcNAcβ1-6)Galβ1-3(GlcNAcα1-4Galβ1-4GlcNAcβ1-6)GalNAcol | nd | 0.0 | 0.0 |
| 2095 | Hex6HexNAc4deHex2 | | nd | 0.0 | 0.0 |
| 2119 | NeuAc1Hex4HexNAc5deHex1 | | nd | 0.0 | 0.0 |
| 2282 | Hex5HexNAc5deHex3 | | nd | 0.0 | 0.0 |
| 2380 | Hex4HexNAc7deHex2 | Fucα1-2(GalNAcα1-3)Galβ1-4GlcNAcβ1-3[Fucα1-2(GalNAcα1-3)Galβ1-4GlcNAcβ1-6]Galβ1-3(GlcNAcα1-4Galβ1-4GlcNAcβ1-6)GalNAcol | nd | 0.0 | 0.0 |
| 2526 | Hex4HexNAc7deHex3 | Fucα1-2(GalNAcα1-3)Galβ1-4GlcNAcβ1-3[Fucα1-2(GalNAcα1-3)Galβ1-4GlcNAcβ1-6]Galβ1-3[Fucα1-2(GalNAcα1-3)Galβ1-4GlcNAcβ1-6]GalNAcol | nd | 0.0 | 0.0 |
| | | | | 1329667.2 | 100.0 |

Amino acid content: 11.2%
Protein content: 4.9%

Example 2—PREP-10 (Herein Also Sometimes Referred to as GBX101-10 or GBX101)

10 g of mucin powder (ALI) was dispersed in 5 to 10 ml ethanol absolute in a 50 ml beaker. The ethanol slurry was then introduced to a 250 ml flask containing 100 ml 2% $Ca(OH)_2$ aqueous solution and the mixture magnetically stirred at 50° C. for 20 hours followed by centrifugation at 4500 rpm for 20 minutes. The precipitate was discarded and the supernatant neutralized with $CO_2$ gas or dry ice to a pH of between 7 and 7.5. 3.0 g CELITE® (diatomaceous earth) was then added to the supernatant and then the mixture was magnetically stirred at 250 rpm for 5 minutes. The mixture was then filtered on a Buchner funnel equipped with filter paper (WHATMAN® 595 qualitative filter paper) under suction. 10 g DOWEX® MARATHON™ hydrogen form resin was then added to the filtrate and the mixture was magnetically stirred at 250 rpm and 50° C. for 20 minutes. The resin was then removed by decantation and the supernatant dried under a rotary evaporator at 50° C. 4.9 g dry light brown powder was obtained. Yield=49%.

Glycan Content: 12.06%

TABLE 2

List of oligosaccharide species present on glycopeptides and free glycans species (obtained via LC-MS/MS):

| Name[1] | Composition[2] | Putative structures [3] | RT | Intensity | Percentage |
|---|---|---|---|---|---|
| 384-1 | Hex1HexNAc1 | Galβ1-3GalNAcol | 9.81 | 2866.42 | 0.6 |
| 384-2 | Hex1HexNAc1 | Galβ1-4GlcNAcol | 11.10 | 3385.66 | 0.7 |
| 384-3 | Hex1HexNAc1 | GlcNAcα1-4Galol | 12.56 | 3480.66 | 0.7 |
| 425-1 | HexNAc2 | GalNAcβ1-4GlcNAcol | 10.08 | 907.72 | 0.2 |
| 425-2 | HexNAc2 | GlcNAcβ1-6GalNAcol | 12.37 | 1087.34 | 0.2 |

TABLE 2-continued

List of oligosaccharide species present on glycopeptides and free glycans species (obtained via LC-MS/MS):

| Name[1] | Composition[2] | Putative structures [3] | RT | Intensity | Percentage |
|---|---|---|---|---|---|
| 462 | Hex1HexNAc1Sul1 | 6SGlcNAcβ1-3Galol | nd | 0.00 | 0.0 |
| 464-1 | Hex1HexNAc1Sul1 | Galβ1-4(6S)GlcNAcol | 10.57 | 1071.00 | 0.2 |
| 464-1 | Hex1HexNAc1Sul1 | 6SGalβ1-3GalNAcol | nd | 0.00 | 0.0 |
| 464-2 | Hex1HexNAc1Sul1 | 6SGalβ1-4GlcNAcol | nd | 0.00 | 0.0 |
| 470 | NeuAc1Hex1 | NeuAcα2-3Galol | nd | 0.00 | 0.0 |
| 505 | HexNAc2Sul1 | 6SGlcNAcβ1-6GalNAcol | 13.42 | 2447.50 | 0.5 |
| 513 | NeuAc1HexNAc1 | NeuAcα2-6GalNAcol | nd | 0.00 | 0.0 |
| 529 | NeuGcHexNAc1 | NeuGcα2-6GlNAcol | nd | 0.00 | 0.0 |
| 530-1 | Hex1HexNAc1deHex1 | Fucα1-2(GalNAcα1-3)Galol | 15.08 | 2240.37 | 0.5 |
| 530-2 | Hex1HexNAc1deHex1 | Fucα1-2Galβ1-3GlcNAcol | 19.23 | 13740.10 | 2.8 |
| 530-3 | Hex1HexNAc1deHex1 | Fucα1-2Galβ1-4GlcNAcol | 20.57 | 8306.79 | 1.7 |
| 530-4 | Hex1HexNAc1deHex1 | Fucα1-2Galβ1-3GalNAcol | 26.41 | 22852.91 | 4.7 |
| 546 | Hex2HexNAc1 | Galβ1-4GlcNAcβ1-3Galol | nd | 0.00 | 0.0 |
| 571 | HexNAc2deHex1 | GlcNAcβ1-4(Fucα1-6)GlcNAcol | 16.17 | 1144.84 | 0.2 |
| 587-1 | Hex1HexNAc2 | GlcNAcα1-4Galβ1-3GalNAcol | 13.23 | 17798.64 | 3.7 |
| 587-2 | Hex1HexNAc2 | GlcNAcα1-4Galβ1-4GlcNAcol | 13.62 | 9573.22 | 2.0 |
| 587-3 | Hex1HexNAc2 | GlcNAcα1-4Galβ1-3GlcNAcol | 14.40 | 6599.56 | 1.4 |
| 587-4 | Hex1HexNAc2 | Galβ1-3GlcNAcβ1-6GalNAcol | nd | 0.00 | 0.0 |
| 610-1 | Hex1HexNAc1deHex1Sul1 | Fucα1-2Galβ1-4(6S)GlcNAcol | 16.75 | 2557.95 | 0.5 |
| 610-2 | Hex1HexNAc1deHex1Sul1 | Fucα1-2Galβ1-3(6S)GlcNAcol | 18.43 | 3232.22 | 0.7 |
| 628 | HexNAc3 | GalNAcβl-4GlcNAcβl-6GalNAcol | nd | 0.00 | 0.0 |
| 667-1 | Hex1HexNAc2Sul1 | GlNAcα1-4Galβ1-4(6S)GlcNAcol | nd | 0.00 | 0.0 |
| 667-2 | Hex1HexNAc2Sul1 | Galβ1-3(6SGlcNAcβ1-6)GalNAcol | 13.72 | 7517.00 | 1.5 |
| 667-3 | Hex1HexNAc2Sul1 | Galβ1-4(6S)GlcNAcβ1-6GalNAcol | 14.69 | 1806.85 | 0.4 |
| 673-1 | NeuAc1Hex1HexNAc1 | NeuAcαα2-3Galβ1-3GalNAcol | nd | 0.00 | 0.0 |
| 673-2 | NeuAc1Hex1HexNAc1 | NeuAcα2-3Galβ1-4GlcNAcol | nd | 0.00 | 0.0 |
| 675-1 | NeuAc1Hex1HexNAc1 | Galβ1-3(NeuAcα2-6)GalNAcol | 12.37 | 3131.80 | 0.6 |
| 675-2 | NeuAc1Hex1HexNAc1 | NeuAcαα2-3Galβ1-3GalNAcol | 13.33 | 5217.90 | 1.1 |
| 675-3 | NeuAc1Hex1HexNAc1 | NeuAcα2-3Galβ1-4GlcNAcol | 14.40 | 3424.79 | 0.7 |
| 676 | Hex1HexNAc1deHex2 | Fucα1-2Galβ1-4(Fucα1-3)GlcNAcol | nd | 0.00 | 0.0 |
| 690-1 | Hex2HexNAc1deHex1 | Fucα1-2Galβ-3GlcNAcβ1-3Galol | nd | 0.00 | 0.0 |
| 690-2 | Hex2HexNAc1deHex1 | Fucα1-2Galβ-4GlcNAcβ1-3Galol | nd | 0.00 | 0.0 |
| 691-1 | NeuGc1Hex1HexNAc1 | Galβ1-3(NeuGcα2-6)GalNAcol | 12.37 | 150.90 | 0.0 |
| 691-2 | NeuAc1Hex1HexNAc1 | NeuGcα2-3Galβ1-3GalNAcol | nd | 0.00 | 0.0 |
| 733-1 | Hex1HexNAc2deHex1 | Fucα1-2(GalNAcα1-3)Galβ1-3GlcNAcol | 14.98 | 12540.98 | 2.6 |
| 733-2 | Hex1HexNAc2deHex1 | Fucα1-2(GalNAcα1-3)Galβ1-3GalNAcol | 17.80 | 23592.60 | 4.8 |
| 733-3 | Hex1HexNAc2deHex1 | Fucα1-2Galβ1-4GlcNAcβ1-6GalNAcol | nd | 0.00 | 0.0 |
| 733-4 | Hex1HexNAc2deHex1 | Fucα1-2Galβ1-3(GlcNAcβ1-6)GalNAcol | 26.80 | 9256.90 | 1.9 |
| 749-1 | Hex2HexNAc2 | GlcNAcα1-4Galβ1-4GlcNAcβ1-3Galol | 15.37 | 665.50 | 0.1 |
| 749-2 | Hex2HexNAc2 | Galβ1-3(Galβ1-4GlcNAcβ1-6)GalNAcol | 16.17 | 1809.10 | 0.4 |
| 749-3 | Hex2HexNAc2 | Galβ1-4GlcNAcβ1-3Galβ1-3GalNAcol | 16.95 | 2701.42 | 0.6 |
| 790-1 | Hex1HexNAc3 | GlcNAcα1-4Galβ1-3(GlcNAcβ1-6)GalNAcol | 15.67 | 11266.00 | 2.3 |
| 790-2 | Hex1HexNAc3 | GlcNAcα1-3Galβ1-4GlcNAcβ1-6GalNAcol | 17.35 | 6329.32 | 1.3 |
| 811 | Hex1HexNAc2deHex1Sul1 | Fucα1-2Galβ1-3(6S-GlcNAcβ1-6)GalNAcol | nd | 0.00 | 0.0 |
| 813-1 | Hex1HexNAc2deHex1Sul1 | Fucα1-2(GalNAcα1-3)Galβ1-4(6S)GlcNAcol | 15.87 | 2121.81 | 0.4 |
| 813-2 | Hex1HexNAc2deHex1Sul1 | Fucα1-2Galβ1-3(6S-GlcNAcβ1-6)GalNAcol | 26.22 | 51770.42 | 10.6 |
| 821 | NeuAc1Hex1HexNAc1deHex1 | Fucα1-2Galβ1-3(NeuAcα2-6)GalNAcol | 26.31 | 5021.38 | 1.0 |
| 829 | Hex2HexNAc2Sul1 | Galβ1-4(6S)GlcNAcβ1-3Galβ1-3GalNAcol | nd | 0.00 | 0.0 |
| 835 | NeuAc1Hex2HexNAc1 | NeuAcα2-3Galβ1-4GlcNAcβ1-3Galol | nd | 0.00 | 0.0 |
| 837 | NeuAc1Hex2HexNAc1 | NeuAcα2-3Galβ1-4GlcNAcβ1-3Galol | nd | 0.00 | 0.0 |
| 870 | Hex1HexNAcβSul1 | GlcNAcα1-4Galβ1-3[(6S)GlcNAcβ1-6]GalNAcol | 15.97 | 1734.37 | 0.4 |

TABLE 2-continued

List of oligosaccharide species present on glycopeptides and free glycans species (obtained via LC-MS/MS):

| Name[1] | Composition[2] | Putative structures[3] | RT | Intensity | Percentage |
|---|---|---|---|---|---|
| 878 | NeuAc1Hex1HexNAc2 | GlcNAcα1-4Galβ1-3(NeuAcα2-6)GalNAcol | 14.79 | 8004.38 | 1.6 |
| 879 | Hex1HexNAc2deHex2 | Fucα1-2(GalNAcα1-3)Gal-(Fuc)GlcNAcol | 15.57 | 3310.23 | 0.7 |
| 895-1 | Hex2HexNAc2deHex1 | Galβ1-4(Fucα1-3)GlcNAcβ1-3Galβ1-3GalNAcol | 19.32 | 1572.91 | 0.3 |
| 895-2 | Hex2HexNAc2deHex1 | Fucα1-2Galβ1-4GlcNAcβ1-3Galβ1-3GalNAcol | 20.09 | 3224.10 | 0.7 |
| 895-3 | Hex2HexNAc2deHex1 | Galβ1-3(Fucα1-2Galβ1-4GlcNAcβ1-6)GalNAcol | 21.33 | 7270.64 | 1.5 |
| 895-4 | Hex2HexNAc2deHex1 | Fucα1-2Galβ1-3(Galβ1-4GlcNAcβ1-6)GalNAcol | 27.19 | 6355.48 | 1.3 |
| 936-1 | Hex1HexNAc3deHex1 | Fucα1-2(GalNAcα1-3)Galβ1-4GlcNAcβ1-6GalNAcol | 18.73 | 1826.87 | 0.4 |
| 936-2 | Hex1HexNAc3deHex1 | Fucα1-2Galβ1-3(GalNAcβ1-4GlcNAcβ1-6)GalNAcol | 27.09 | 3176.64 | 0.7 |
| 950 | Hex1HexNAc3Sul2 | 6SGlcNAcα1-4Galβ1-3(6SGlcNAcβ1-6)GalNAcol | nd | 0.00 | 0.0 |
| 952-1 | Hex2HexNAc3 | Galβ1-3(GlcNAcα1-4Galβ1-4GlcNAcb1-6)GalNAcol | 17.35 | 7851.80 | 1.6 |
| 952-2 | Hex2HexNAc3 | GlcNAcα1-4Galβ1-3Gal(Galβ1-4GlcNAcβ1-6)GalNAcol | 17.84 | 5320.77 | 1.1 |
| 952-3 | Hex2HexNAc3 | GlcNAcα1-4Galβ1-4GlcNAcβ1-3Galβ1-4GlcNAcol | 20.76 | 3086.03 | 0.6 |
| 966 | NeuAc2Hex1HexNAc1 | NeuAcα2-3Galβ1-3(NeuAcα2-6)GalNAcol | nd | 0.00 | 0.0 |
| 975-1 | Hex2HexNAc2deHex1Sul1 | GalNAcα1-3(Fucα1-2)Galβ1-4(6S)GlcNAcβ1-3Galol | nd | 0.00 | 0.0 |
| 975-2 | Hex2HexNAc2deHex1Sul1 | Galβ1-3[Fucα1-2Galβ1-4(6S)GlcNAcβ1-6]GaNAcol | nd | 0.00 | 0.0 |
| 975-3 | Hex2HexNAc2deHex1Sul1 | Fucα1-2Galβ1-4(6S)GlcNAcβ1-3Galβ1-3GalNAcol | 18.63 | 2012.94 | 0.4 |
| 982 | NeuAc1NeuGc1Hex1HexNAc1 | NeuGcα2-3Galβ1-3(NeuAcα2-6)GalNAcol | nd | 0.00 | 0.0 |
| 993 | Hex1HexNAc4 | GlcNAcα1-4Galβ1-3(GalNAcβ1-4GlcNAcβ1-6)GalNAcol | 17.14 | 2509.47 | 0.5 |
| 1016-1 | Hex1HexNAc3deHex1Sul1 | Fucα1-2Galβ1-4(6S)GlcNAcβ1-6(GlcNAcβ1-3)GalNAcol | nd | 0.00 | 0.0 |
| 1016-2 | Hex1HexNAc3deHex1Sul1 | GalNAcα1-3(Fucα1-2)Galβ1-3(SGlcNAcβ1-6)GalNAcol | 18.43 | 3336.16 | 0.7 |
| 1040-1 | NeuAc1Hex2HexNAc2 | Galβ1-4GlcNAcβ1-3Galβ1-3(NeuAcα2-6)GalNAcol | 17.74 | 2354.93 | 0.5 |
| 1040-2 | NeuAc1Hex2HexNAc2 | NeuAcα2-3Galβ1-3(Galβ1-4GlcNAcβ1-6)GalNAcol | nd | 0.00 | 0.0 |
| 1041-1 | Hex2HexNAc2deHex2 | Fucα1-2Galβ1-4GlcNAcβ1-3(Fucα1-2)Galβ1-4GlcNAcol | 22.03 | 1092.55 | 0.2 |
| 1041-2 | Hex2HexNAc2deHex2 | Fucα1-2Galβ1-3(Fucα1-2Galβ1-4GlcNAcβ1-6)GalNAcol | 28.84 | 24371.80 | 5.0 |
| 1057 | Hex3HexNAc2deHex1 | Fucα1-2Galβ1-4GlcNAcβ1-3(Galβ1-4GlcNAcβ1-6)Galol | nd | 0.00 | 0.0 |
| 1081 | NeuAc1Hex1HexNAc3 | NeuAcα2-6GalNAcβ1-4GlcNAcβ1-3Galβ1-3GalNAcol | nd | 0.00 | 0.0 |
| 1098-1 | Hex2HexNAc3deHex1 | Fucα1-2(GalNAcα1-3)Galβ1-4GlcNAcβ1-3Galβ1-3GalNAcol | 15.87 | 4104.86 | 0.8 |
| 1098-2 | Hex2HexNAc3deHex1 | Galβ1-3[Fucα1-2(GalNAcα1-3)Galβ1-4GlcNAcβ1-6]GalNAcol | nd | 0.00 | 0.0 |
| 1098-3 | Hex2HexNAc3deHex1 | GlcNAcα1-4Galβ1-3(Fucα1-2Galβ1-4GlcNAcβ1-6)GalNAcol | 22.93 | 16797.99 | 3.4 |
| 1098-4 | Hex2HexNAc3deHex1 | Fucα1-2Galβ1-3(GlcNAcα1-4Galβ1-4GlcNAcβ1-6)GalNAcol | 27.19 | 15379.87 | 3.2 |
| 1114 | Hex3HexNAc3 | Galβ1-3(Galβ1-4GlcNAcβ1-3Galβ1-4GlcNAcβ1-6)GalNAcol | nd | 0.00 | 0.0 |
| 1121 | Hex2HexNAc2deHex2Sul1 | Fucα1-2Galβ1-3[Fucα1-2Galβ1-4(6S)GlcNAcβ1-6]GalNAcol | 26.41 | 4671.30 | 1.0 |
| 1135 | Hex3HexNAc2deHex1Sul1 | Fucα1-2Galβ1-4GlcNAcβ1-3Galβ1-4(6S)GlcNAcβ1-3Galol | nd | 0.00 | 0.0 |
| 1139 | Hex1HexNAc4deHex1 | Fucα1-2(GalNAcα1-3)Galβ1-3(GalNAcβ1-4GlcNAcβ1-6)GalNAcol | nd | 0.00 | 0.0 |

TABLE 2-continued

List of oligosaccharide species present on glycopeptides and free glycans species (obtained via LC-MS/MS):

| Name[1] | Composition[2] | Putative structures[3] | RT | Intensity | Percentage |
|---|---|---|---|---|---|
| 1155 | Hex2HexNAc4 | GlcNAcα1-4Galβ1-3(GlcNAcα1-4Galβ1-4GlcNAcβ1-6)GalNAcol | 18.63 | 23643.35 | 4.9 |
| 1178-1 | Hex2HexNAc3deHex1Sul1 | GalNAcα1-3(Fucα1-2)Galβ1-4(6S)GlcNAcβ1-3Galβ1-3GalNAcol | nd | 0.00 | 0.0 |
| 1178-2 | Hex2HexNAc3deHex1Sul1 | Fucα1-2Galβ1-4GlcNAcβ1-3Galβ1-4(6S)GlcNAcβ1-6GalNAcol | 16.55 | 2088.57 | 0.4 |
| 1186-1 | NeuAc1Hex2HexNAc2deHex1 | Fucα1-2Galβ1-4GlcNAcβ1-3Galβ1-3(NeuAcα2-6)GalNAcol | nd | 0.00 | 0.0 |
| 1186-2 | NeuAc1Hex2HexNAc2deHex1 | NeuAcα2-3Galβ1-3(Fucα1-2Galβ1-4GlcNAβ1-6)GalNAcol | 26.82 | 3062.77 | 0.6 |
| 1201 | Hex3HexNAc2deHex2 | Fucα1-2Galβ1-4GlcNAcβ1-3Gal(Fuc)GlcNAcβ1-3Galol | nd | 0.00 | 0.0 |
| 1203-1 | Hex3HexNAc2deHex2 | Fucα1-2Galβ1-4GlcNAcβ1-3[Fuc(Gal)GlcNAcβ1-6]Galol | nd | 0.00 | 0.0 |
| 1203-2 | Hex3HexNAc2deHex2 | Fucα1-2Galβ1-4GlcNAcβ1-3(Fucα1-2Galβ1-4GlcNAcβ1-6)Galol | nd | 0.00 | 0.0 |
| 1219 | Hex1HexNAc4deHex1Sul1 | GalNAcα1-3(Fucα1-2)Galβ1-3[GalNAcβ1-4(6S)GlcNAcβ1-6]GalNAcol | nd | 0.00 | 0.0 |
| 1243-1 | NeuAc1Hex2HexNAc3 | GlcNAcα1-4Galβ1-4GlcNAcβ1-3Galβ1-3(NeuAcα2-6)GalNAcol | 17.74 | 1345.80 | 0.3 |
| 1243-2 | NeuAc1Hex2HexNAc3 | NeuAcα2-3Galβ1-3[GlcNAcα1-4Galβ1-4GlcNAcβ1-6]GalNAcol | nd | 0.00 | 0.0 |
| 1244-1 | Hex2HexNAc3deHex2 | GalNAcα1-3(Fucα1-2)Galβ1-3[Fucα1-2Galβ1-4GlcNAcβ1-6]GalNAcol | nd | 0.00 | 0.0 |
| 1244-2 | Hex2HexNAc3deHex2 | Fucα1-2Galβ1-3[GalNAcα1-3(Fucα1-2)Galβ1-4GlcNAcβ1-6]GalNAcol | 27.19 | 5020.69 | 1.0 |
| 1260-1 | Hex3HexNAc3deHex1 | Fucα1-2Gaβ1-4GlcNAcβ1-3Galβ1-3(Gaβ1-4GlcNAcβ1-6)GalNAcol | nd | 0.00 | 0.0 |
| 1260-2 | Hex3HexNAc3deHex1 | Fucα1-2Galβ1-4GlcNAcβ1-3(GlcNAcα1-4Galβ1-4GlcNAcβ1-6)Galol | nd | 0.00 | 0.0 |
| 1301-1 | Hex2HexNAc4deHex1 | GlcNAcα1-4Galβ1-3[GalNAcα1-3(Fucα1-2)Galβ1-4GlcNAcβ1-6]GalNAcol | 19.10 | 27788.42 | 5.7 |
| 1301-2 | Hex2HexNAc4deHex1 | GalNAcα1-3(Fucα1-2)Galβ1-3(GlcNAcα1-4Galβ1-4GlcNAcβ1-6)GalNAcol | 22.13 | 23452.11 | 4.8 |
| 1317-1 | Hex3Hex4 | GlcNAcα1-4Galβ1-4GlcNAcβ1-3(GlcNAcα1-4Galβ1-4GlcNAcβ1-6)Galol | nd | 0.00 | 0.0 |
| 1317-2 | Hex3Hex4 | Galβ1-3(HexNAc-Galβ1-4GlcNAcβ1-3Galβ1-4GlcNAcβ1-6)GalNAcol | nd | 0.00 | 0.0 |
| 1317-3 | Hex3Hex4 | GlcNAcα1-4Galβ1-4GlcNAcβ1-3Galβ1-4GlcNAcβ1-3Galβ1-3GalNAcol | nd | 0.00 | 0.0 |
| 1324-1 | Hex2HexNAc3deHex2Sul1 | Fucα1-2Galβ1-4GlcNAcβ1-3[Fucα1-2Gal-(6S)GlcNAcβ1-6]GalNAcol | nd | 0.00 | 0.0 |
| 1324-2 | Hex2HexNAc3deHex2Sul1 | S + Fucα1-2Gal-GlcNAcβ1-3(Fucα1-2Gal-GlcNAcβ1-6)GalNAcol | nd | 0.00 | 0.0 |
| 1324-3 | Hex2HexNAc3deHex2Sul1 | Fucα1-2Galβ1-3[GalNAcα1-3(Fucα1-2)Galβ1-4(6S)GlcNAcβ1-6]GalNAcol | nd | 0.00 | 0.0 |
| 1331 | NeuAc2Hex2HexNAc2 | NeuAcα2-3Galβ1-3(NeuAcα2-3Galβ1-4GlcNAcβ1-6)GalNAcol | nd | 0.00 | 0.0 |
| 1340-1 | Hex3HexNAc3deHex1Sul1 | Fucα1-2Galβ1-4(6S)GlcNAcβ1-3Galβ1-4GlcNAcβ1-3Galβ1-3GalNAcol | nd | 0.00 | 0.0 |
| 1340-2 | Hex3HexNAc3deHex1Sul1 | Fucα1-2Galβ1-4(6S)GlcNAcβ1-3Galβ1-4GlcNAcβ1-3Galβ1-4GlcNAcol | 24.87 | 3451.42 | 0.7 |

TABLE 2-continued

List of oligosaccharide species present on glycopeptides and free glycans species (obtained via LC-MS/MS):

| Name[1] | Composition[2] | Putative structures [3] | RT | Intensity | Percentage |
|---|---|---|---|---|---|
| 1358 | Hex2HexNAc5 | GlcNAcα1-4Gal-GlcNAcβ1-3(GlcNAcα1-4Gal-GlcNAcβ1-6)GalNAcol | nd | 0.00 | 0.0 |
| 1381 | Hex2HexNAc4deHex1Sul1 | GalNAcα1-3(Fucα1-2)Galβ1-4GlcNAcβ1-3Galβ1-4(6S)GlcNAcβ1-6GalNAcol | nd | 0.00 | 0.0 |
| 1389 | NeuAc1Hex2HexNAc3deHex1 | NeuAcα2-3Galβ1-3[GalNAcα1-3(Fucα1-2)Galβ1-4GlcNAcβ1-6]GalNAcol | nd | 0.00 | 0.0 |
| 1406-1 | Hex3HexNAc3deHex2 | Fucα1-2Galβ1-4GlcNAcβ1-3Galβ1-3[Gal(Fuc)GlcNAcβ1-6]GalNAcol | nd | 0.00 | 0.0 |
| 1406-2 | Hex3HexNAc3deHex2 | Fucα1-2Galβ1-4GlcNAcβ1-3(Fucα1-2Galβ1-4GlcNAcβ1-6)Galβ1-3GalNAcol | 27.96 | 2499.99 | 0.5 |
| 1447 | Hex2HexNAc4deHex2 | GalNAcα1-3(Fucα1-2)Galβ1-3[GalNAcα1-3(Fucα1-2)Galβ1-4GlcNAcβ1-6]GalNAcol | 20.09 | 2270.36 | 0.5 |
| 1463-1 | Hex3HexNAc4deHex1 | GalNAcα1-3(Fucα1-2)Galβ1-3(Galβ1-4GlcNAcβ1-3Galβ1-4GlcNAcβ1-6)GalNAcol | nd | 0.00 | 0.0 |
| 1463-2 | Hex3HexNAc4deHex1 | Gal-GlcNAcβ1-3(Fucα1-2Galβ1-4GlcNAcβ1-6)Galβ1-3(GlcNAcβ1-6)GalNAcol | nd | 0.00 | 0.0 |
| 1463-3 | Hex3HexNAc4deHex1 | Fucα1-2Galβ1-4GlcNAcβ1-3(GlcNAcβ1-6)Galβ1-3(Gal-GlcNAcβ1-6)GalNAcol | nd | 0.00 | 0.0 |
| 1486 | Hex3HexNAc3deHex2Sul1 | Fucα1-2Galβ1-4GlcNAcβ1-3[Fucα1-2Galβ1-4(6S)GlcNAcβ1-6]Galβ1-3GalNAcol | nd | 0.00 | 0.0 |
| 1520-1 | Hex3HexNAc5 | GlcNAcα1-4Galβ1-4GlcNAcβ1-3(GlcNAcα1-4Galβ1-4GlcNAcβ1-6)Galβ1-3GalNAcol | nd | 0.00 | 0.0 |
| 1520-2 | Hex3HexNAc5 | GlcNAcα1-4Galβ1-3(GlcNAcα1-4Galβ1-3Galβ1-4GlcNAcβ1-6)GalNAcol | nd | 0.00 | 0.0 |
| 1527 | Hex2HexNAc4deHex2Sul1 | GalNAcα1-3(Fucα1-2)Galβ1-3[GalNAcα1-3(Fucα1-2)Galβ1-4(6S)GlcNAcβ1-6]GalNAcol | nd | 0.00 | 0.0 |
| 1543 | Hex3HexNAc4deHex1Sul1 | Fucα1-2(GalNAcα1-3)Galβ1-4GlcNAcβ1-3Galβ1-4(6S)GlcNAcβ1-3Galβ1-4GlcNAcol | 21.83 | 1546.39 | 0.3 |
| 1609-1 | Hex3HexNAc4deHex2 | Fucα1-2Galβ1-4GlcNAcβ1-3[Gal(Fuc)GlcNAcβ1-6]Galβ1-3(GlcNAcβ1-6)GalNAcol | 24.57 | 1348.04 | 0.3 |
| 1609-2 | Hex3HexNAc4deHex2 | Fucα1-2Galβ1-4GlcNAcβ1-3(GlcNAcβ1-6)Galβ1-3(Fucα1-2Galβ1-4GlcNAcβ1-6)GalNAcol | 25.30 | 3317.43 | 0.7 |
| 1609-3 | Hex3HexNAc4deHex2 | Fucα1-2Galβ1-4GlcNAcβ1-3(Fucα1-2Galβ1-4GlcNAcβ1-6)Galβ1-3(GlcNAcβ1-6)GalNAcol | nd | 0.00 | 0.0 |
| 1625 | Hex4HexNAc4deHex1 | Galβ1-4GlcNAcβ1-3(Fucα1-2Galβ1-4GlcNAcβ1-6)Galβ1-3(Galβ1-4GlcNAcβ1-6)GalNAcol | nd | 0.00 | 0.0 |
| 1666 | Hex3HexNAc5deHex1 | GlcNAcα1-4Galβ1-4GlcNAcβ1-3GlcNAcβ1-6)Galβ1-3(Fucα1-2Galβ1-4GlcNAcβ1-6)GalNAcol | nd | 0.00 | 0.0 |
| 1689-1 | Hex3HexNAc4deHex2Sul1 | Fucα1-2Gal-GlcNAcβ1-3(Fucα1-2Gal-GlcNAcβ1-6)Galβ1-3(6S-GlcNAcβ1-6)GalNAcol | 24.20 | 1581.03 | 0.3 |
| 1689-2 | Hex3HexNAc4deHex2Sul1 | Fucα1-2Gal-GlcNAcβ1-3(Fucα1-2Gal-GlcNAcβ1-6)Galβ1-3(6S-GlcNAcβ1-6)GalNAcol | nd | 0.00 | 0.0 |
| 1723 | Hex3HexNAc6 | GlcNAcα1-4Galβ1-4GlcNAcβ1-3(GlcNAcβ1-6)Galβ1- | 21.23 | 1073.11 | 0.2 |

TABLE 2-continued

List of oligosaccharide species present on glycopeptides and free glycans species (obtained via LC-MS/MS):

| Name[1] | Composition[2] | Putative structures [3] | RT | Intensity | Percentage |
|---|---|---|---|---|---|
| 1771 | Hex4HexNAc4deHex2 | 3(GlcNAcα1-4Galβ1-4GlcNAcβ1-6)GalNAcol Fucα1-2Galβ1-4GlcNAcβ1-3(Fucα1-2Galβ1-4GlcNAcβ1-6)Galβ1-3(Galβ1-4GlcNAcβ1-6)GalNAcol | nd | 0.00 | 0.0 |
| 1812 | Hex3HexNAc5deHex2 | GalNAcα1-3(Fucα1-2)Galβ1-3[GalNAcα1-3(Fucα1-2)Galβ1-4GlcNAcβ1-3Galβ1-4GlcNAcβ1-6]GalNAcol | nd | 0.00 | 0.0 |
| 1828 | Hex4HexNAc5deHex1 | | nd | 0.00 | 0.0 |
| 1869-1 | Hex3HexNAc6deHex1 | GlcNAcβ1-3[Fucα1-2(GalNAcα1-3)Galβ1-4GlcNAcβ1-6]Galβ1-3(GlcNAcα1-4Galβ1-4GlcNAcβ1-6)GalNAcol | nd | 0.00 | 0.0 |
| 1869-2 | Hex3HexNAc6deHex1 | | nd | 0.00 | 0.0 |
| 1876 | Hex5HexNAc3deHex3 | | nd | 0.00 | 0.0 |
| 1885 | Hex4HexNAc6 | GlcNAcα1-4Galβ1-4GlcNAcβ1-3(Galβ1-4GlcNAcβ1-6)Galβ1-3(GlcNAcα1-4Galβ1-4GlcNAcβ1-6)GalNAcol | 22.32 | 964.59 | 0.2 |
| 1917-1 | Hex4HexNAc4deHex3 | Fucα1-2Galβ1-4GlcNAcβ1-3(Fucα1-2Galβ1-4GlcNAcβ1-6)Galβ1-3[Gal(Fuc)GlcNAcβ1-6]GalNAcol | nd | 0.00 | 0.0 |
| 1917-2 | Hex4HexNAc4deHex3 | Fucα1-2Galβ1-4GlcNAcβ1-3(Fucα1-2Galβ1-4GlcNAcβ1-6)Galβ1-3[Fucα1-2Galβ1-4GlcNAcβ1-6]GalNAcol | 29.33 | 1155.00 | 0.2 |
| 1926 | Hex3HexNAc7 | GlcNAcα1-4Galβ1-4GlcNAcβ1-3(GlcNAcα1-4Galβ1-4GlcNAcβ1-6)Galβ1-3(GalNAcβ1-4GlcNAcβ1-6)GalNAcol | nd | 0.00 | 0.0 |
| 1974-1 | Hex4HexNAc5deHex2 | GlcNAcα1-4Galβ1-4GlcNAcβ1-3(Fucα1-2Galβ1-4GlcNAcβ1-6)Galβ1-3(Fucα1-2Galβ1-4GlcNAcβ1-6)GalNAcol | nd | 0.00 | 0.0 |
| 1974-2 | Hex4HexNAc5deHex2 | Fucα1-2Galβ1-4GlcNAcβ1-3(Fucα1-2Galβ1-4GlcNAcβ1-6)Galβ1-3(GlcNAcα1-4Galβ1-4GlcNAcβ1-6)GalNAcol | nd | 0.00 | 0.0 |
| 1990 | Hex5HexNAc5deHex1 | Fucα1-2Galβ1-4GlcNAcβ1-3Galβ1-4GlcNAcβ1-3Galβ1-4GlcNAcβ1-3Galβ1-3GalNAcol | nd | 0.00 | 0.0 |
| 1996 | NeuAc1Hex4HexNAc4deHex1Sul1 | | nd | 0.00 | 0.0 |
| 2031-1 | Hex4HexNAc6deHex1 | GlcNAcα1-4Galβ1-4GlcNAcβ1-3(GlcNAcα1-4Galβ1-4GlcNAcβ1-6)Galβ1-3(Fucα1-2Galβ1-4GlcNAcβ1-6)GalNAcol | nd | 0.00 | 0.0 |
| 2031-2 | Hex4HexNAc6deHex1 | Fucα1-2Galβ1-4GlcNAcβ1-3(GlcNAcα1-4Galβ1-4GlcNAcβ1-6)Galβ1-3(GlcNAcα1-4Galβ1-4GlcNAcβ1-6)GalNAcol | nd | 0.00 | 0.0 |
| 2088 | Hex4HexNAc7 | GlcNAcα1-4Galβ1-4GlcNAcβ1-3(GlcNAcα1-4Galβ1-4GlcNAcβ1-6)Galβ1-3(GlcNAcα1-4Galβ1-4GlcNAcβ1-6)GalNAcol | 22.72 | 753.83 | 0.2 |
| 2095 | Hex6HexNAc4deHex2 | | nd | 0.00 | 0.0 |
| 2119 | NeuAc1Hex4HexNAc5deHex1 | | nd | 0.00 | 0.0 |
| 2282 | Hex5HexNAc5deHex3 | | nd | 0.00 | 0.0 |
| 2380 | Hex4HexNAc7deHex2 | Fucα1-2(GalNAcα1-3)Galβ1-4GlcNAcβ1-3[Fucα1-2(GalNAcα1-3)Galβ1-4GlcNAcβ1-6]Galβ1-3(GlcNAcα1-4Galβ1-4GlcNAcβ1-6)GalNAcol | nd | 0.00 | 0.0 |
| 2526 | Hex4HexNAc7deHex3 | Fucα1-2(GalNAcα1-3)Galβ1-4GlcNAcβ1-3[Fucα1-2(GalNAcα1-3)Galβ1-4GlcNAcβ1-6]Galβ1-3[Fucα1- | nd | 0.00 | 0.0 |

TABLE 2-continued

List of oligosaccharide species present on glycopeptides and free glycans species (obtained via LC-MS/MS):

| Name[1] Composition[2] | Putative structures [3] | RT | Intensity | Percentage |
|---|---|---|---|---|
|  | 2(GalNAcα1-3)Galβ1-4GlcNAcβ1-6]GalNAcol |  |  |  |

Amino acid content: 7.2%
Protein content: 11.7%

TABLE 3

PREP-10 Principal Monosaccharides

| Parameter | Typical (w/w) | Method |
|---|---|---|
| Fucose | 2.6% | HPAEC PAD |
| GalNH2 | 1.7% | HPAEC PAD |
| GlcNH2 | 5.4% | HPAEC PAD |
| Galactose | 4.8% | HPAEC PAD |
| Glucose | 0.9% | HPAEC PAD |
| Mannose | TBC | HPAEC PAD |
| Sialic acid | TBC | HPAEC PAD |

TABLE 4

PREP-10 Properties

| Parameter | Min. | Max. | Method |
|---|---|---|---|
| Moisture |  | 5.5 g/100 g | Karl Fischer |
| Ash |  |  | ISO 936: 1998 |
| pH (2% solution) | 7.0 | 7.5 | Internal |
| Residual protein |  | 8.0 g/100 g | BCA assay |
| Na |  | 50 m g/100 g | BS EN 16943: 2017 (ICP-OES) |
| K | 600 mg/100 g | 1 100 mg/100 g | BS EN 16943: 2017 (ICP-OES) |
| Cl |  | 50 mg/100 g | BS EN 16943: 2017 (ICP-OES) |
| Ca |  | 100 mg/100 g | BS EN 16943: 2017 (ICP-OES) |
| P | 100 mg/100 g | 250 mg/100 g | BS EN 16943: 2017 (ICP-OES) |
| Mg |  | 100 mg/100 g | BS EN 16943: 2017 (ICP-OES) |
| Mn |  | 0.2 mg/kg | BS EN 16943: 2017 (ICP-OES) |
| Fe |  | 50 mg/kg | BS EN 16943: 2017 (ICP-OES) |
| Cu |  | 2.5 mg/kg | BS EN 16943: 2017 (ICP-OES) |

ICP-OES—Inductively coupled plasma-optical emission spectrometry

Example 3—In Vitro Bacterial Growth

In vitro studies are driven by the need for predictive information to provide sufficient microbiology testing data. A recent study has confirmed the concordance between effects of in vitro and in vivo studies for the election of probiotics (Vinderola et al., 2017), drugs (Maier et al., 2018) confirming the clinical relevance.

Selection of bacterial strains: Members of the genera Bifidobacterium and Lactobacillus are of the most abundant genera present in the healthy infant gut and represent a significant portion of the microbiota throughout a healthy adult life, playing an important role in gut homeostasis and health. The growth of infant-derived Bifidobacterium, in the presence of HMOs has also been shown to promote the adhesive properties of these strains. The genera Bifidobacterium and Lactobacillus has been shown to play an important role in the barrier effect, the stimulation of immune system, being associated with a range of beneficial health effects (Callaghan & Sinderen, 2016).

One of the bacteria that influence human metabolism and is found in infant and adult intestinal track (0.5-5% of the total bacteria) is Akkermansia muciniphila. Akkermansia muciniphila is a Gram-negative, anaerobic, non-spore-forming bacterium, from the family Verrucomicrobiaceae, which is the most abundant mucus degrading bacterium in the healthy human intestine. The host and Akkermansia has a symbiotic interaction in which the bacterium degrades the mucus layer which stimulates new mucus production and the production of new mucus stimulates growth of Akkermansia. This process ensures that abundant amounts of Akkermansia maintain the integrity and shape of the mucus layer (Derrien et al., 2011). Recent evidence demonstrates that gut concentration of Akkermansia muciniphila is inversely associated with obesity, diabetes, cardiometabolic diseases and low-grade inflammation. Therefore, this bacterium is considered a potential candidate for improving the conditions of subjects suffering or at risk of suffering from those disorders (Cani et al., 2017).

Members of the genus Bacteroides are the predominant organisms that participate in carbohydrate metabolism via expressing enzymes such as glycosyl transferases, glycoside hydrolases and polysaccharide lyases. For example, Bacteroides thetaiotaomicron is endowed with a genome that codes for over 260 hydrolases, which is far more than the number encoded by the human genome. The gut microbiota has also been shown to impart a positive impact on lipid metabolism by suppressing the inhibition of lipoprotein lipase activity in adipocytes. Furthermore, Bacteroides thetaiotaomicron has been demonstrated to augment the efficiency of lipid hydrolysis by up regulating expression of a colipase that is required by pancreatic lipase for lipid digestion (Jandhyala et al., 2015). This bacterium is also involved in the formation of the intestinal mucosal barrier in babies and maintaining gut barrier function, which benefits its host by providing sufficient absorptive ability for nutrients the microbe helps process, and prevents infection with Clostridium difficile. Decreased levels of intestinal Bacteroides spp. has been associated with C-section delivery.

In pre-term infants, bacteria that colonize the gut include Bifidobacterium and Lactobacillus and these differ depending on the type of feeding habits. In formula-fed infants, bacteria such as Enterococcus, Enterobacteria or Clostridia dominates the gut niche. However, in breast-fed infants Bifidobacterium and Lactobacillus dominates (Jandhyala et al., 2015).

Among all Enterobacteriaceae, Escherichia coli is the most widely-found facultative anaerobe in mammals. A considerable degree of phylogenetic diversity has evolved within the species Escherichia coli, with some lineages acquiring various combinations of virulence genes that enable them to adopt overtly pathogenic lifestyles. Over-growth of commensal *Escherichia coli* (non-pathogenic) is related to chronic gastrointestinal tract inflammation (Kittana et al., 2018).

Growth of the following ubiquitous gut bacterial species in compositions of the above-described invention were tested: *Bifidobacterium bifidum*, REF #20239 (DSMZ) (associated with restoration of intestinal microbiota); *B. animalis* subsp. *lactis*, REF #10140 (DSMZ) (associated with restoration of intestinal microbiota); *B. breve*, REF #20213 (DSMZ) (associated with healthier immune systems in infants); *Lactobacillus acidophilus*, REF #9126 (DSMZ) (associated with reliving IBS, Crohn's disease, and gut dysbiosis); *Lactobacillus reuteri*, REF #17509 (DSMZ) (recommended for breastfed infants with colic); *Bacteroides thetaiotaomicron*, REF #9126 (DSMZ) (reduced in C-section delivery, associated with formation of the intestinal mucosal barrier in babies); *Akkermansia mucimphila*, REF #22959 (DSMZ) (associated with weight control); and *Escherichia coli* isolated from feces (IVB) (associated with inflammation in the intestine).

The increase in the cell size and cell mass during the development of bacteria is termed growth. Growth is affected by nutritional factors including the amount of carbon, nitrogen, sulphur, phosphorous, and other trace elements provided in the growth medium.

The dynamics of the bacterial growth can be studied by plotting the cell growth (absorbance). The curve thus obtained is a sigmoid curve and is known as a standard growth curve. The increase in the cell mass of the organism is measured by using the Spectrophotometer. The Spectrophotometer measures the turbidity or optical density (OD) which is the measure of the amount of light absorbed by a bacterial suspension. The degree of turbidity in the broth culture is directly related to the number of microorganism present, either viable or dead cells, and is a convenient and rapid method of measuring cell growth rate of an organism. Increased turbidity of the broth medium indicates increase of the microbial cell mass. The amount of transmitted light through turbid broth decreases with subsequent increase in the absorbance value (Prescott et al., 2005).

To elucidate if the bacterial strains are capable of metabolizing and using the tested samples as a source of carbon, a growth curve of the specific bacterial strains were obtained. Specifically, growth in the minimal medium (without a source of carbon) supplemented with PREP-9 or PREP-10 was compared with growth in minimal medium without supplementation.

All bacterial strains were cultivated in liquid minimal medium (specific for each strain according to DMSZ) under three different conditions: Minimal medium supplemented with glucose (final concentration depends on the bacterial strain) as a positive control; Minimal medium supplemented with PREP-9 or PREP-10 added as a dried powder with a final concentration of 15 mg/mL; or Minimal medium without supplementation as a negative control.

Cultures were performed in 96-well plates in triplicate under anaerobic conditions and are incubated at 37° C. To start the culture, 5-100 fresh bacterial culture was inoculated in 2000 of medium. The bacterial growth was determined by measuring the optical densities (OD) at 600 nm in a spectrophotometer after 24 h, 48 h, 72 h and 96 h of growth starting with an OD of 0.05.

Statistical analysis (t test) was performed to show statistical differences between the growth in minimal medium in comparison with minimal medium supplemented with the tested samples. Moreover, the area under the curve of the growth was calculated to measure the efficiency of the bacterial strains in metabolizing PREP-9 or PREP-10 and significant differences were tested by two-ways ANOVA.

Results

*Bifidobacterium bifidum*: *Bifidobacterium bifidum* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 1A-1B. Maximum growth was reached after 48 h (OD PREP-9=0.43 and OD PREP-10=0.41). The AUC of the growth curves in FIG. 1A were: MM=18.13; MM+PREP-9=27.27; and MM+PREP-10=23.64. *Bifidobacterium bifidum* showed significant higher growth in minimal medium supplemented with PREP-9 and 10 than in minimal medium without supplementation after 48 h. This means the bacterium is able to metabolize PREP-9 and 10 as a source of carbon. However, the calculation of the AUC showed more efficacy for PREP-9.

Figure 2B:
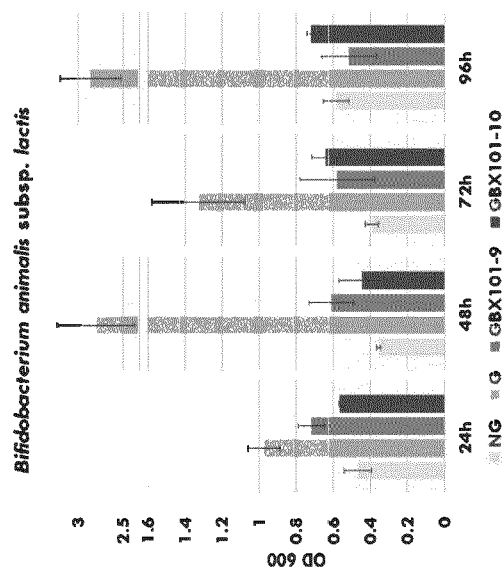

*Bifidobacterium animalis* subsp. *Lactis*: *Bifidobacterium animalis* subsp. *lactis* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 2A-2B. Maximum growth in MM supplemented with PREP-9 was after 24 h (OD=0.72) and with PREP-10 was after 96 h (OD=0.72). The AUC of the growth curves in FIG. 2A were: MM=36.76; MM+PREP-9=52.52; and MM+PREP-10=48.9. *Bifidobacterium animalis* subsp. *lactis* showed significant higher growth in minimal medium supplemented with PREP-9 after 24 h and 48 h. However, it only showed significant higher growth with PREP-10 after 72 h and 96 h, suggesting that the bacterium is capable of using both samples but it can metabolize PREP-9 faster- and thus use it up quicker. The calculation of the AUC showed more efficacy for PREP-9.

Figure 3A:
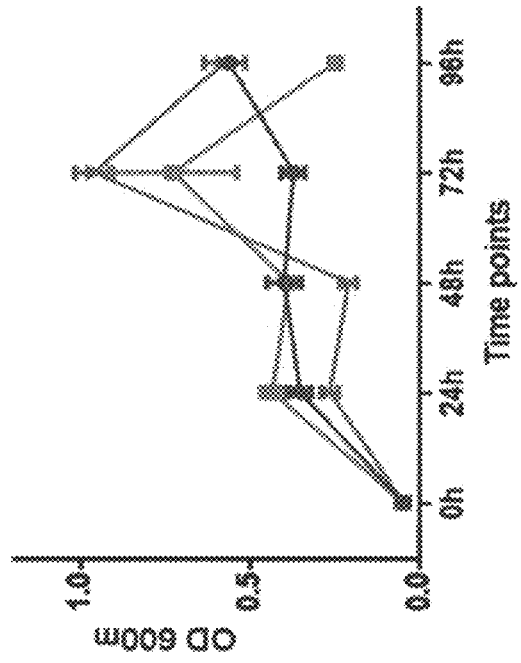
FIGS. 3A-3B show a growth curve (FIG. 3A) and bar chart representation of the OD at 600 nm (FIG. 3B) of *Bifidobacterium breve* in minimal medium (MM) in comparison with MM supplemented with PREP-9 and MM supplemented with PREP-10. Maximum growth was reached after 72 h (OD PREP-9=0.73 and OD PREP-10=0.96). MM supplemented with glucose (G) was included as a positive control. * Significant differences t test $p<0.05$.
Figure 3B:
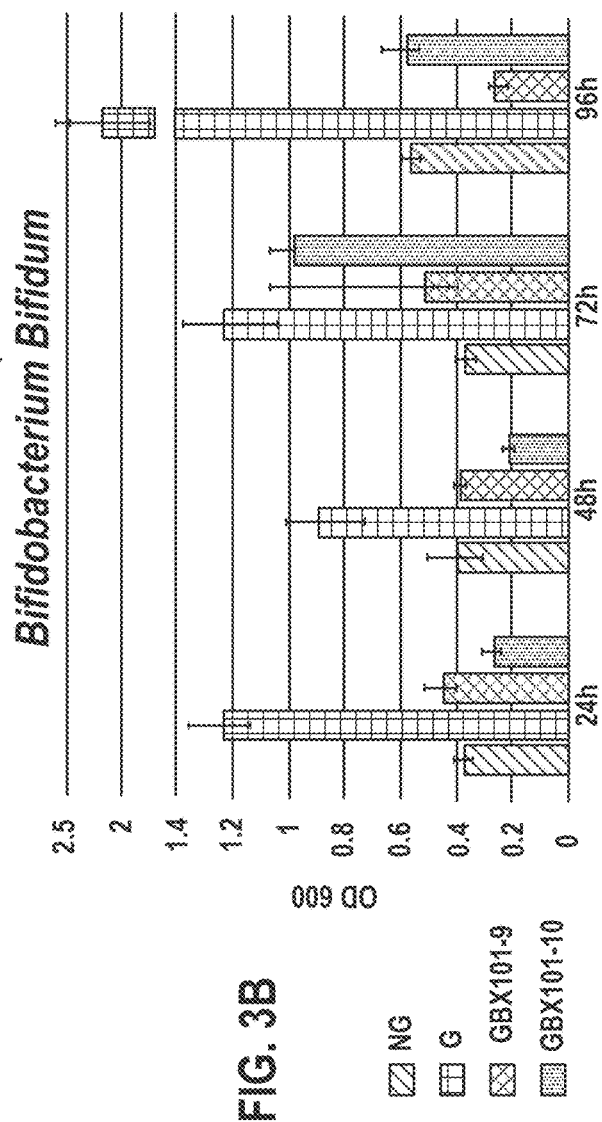

*Bifidobacterium breve*: *Bifidobacterium breve* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 3A-3B. Maximum growth in MM supplemented with PREP-9 was after 24 h (OD=0.72) and was with PREP-10 after 96 h (OD=0.72). The AUC of the growth curves in FIG. 3A were: MM=34.5; MM+PREP-9=40.89; and MM+PREP-10=42.14. *Bifidobacterium breve* showed higher growth in minimal medium supplemented with PREP-9 and 10 than in minimal medium without supplementation after 72 h (only statistically significant in PREP-10). This means the bacterium was able to metabolize PREP-9 and 10 as a source of carbon. The calculation of the AUC showed more efficacy for PREP-10.

Figure 4A:
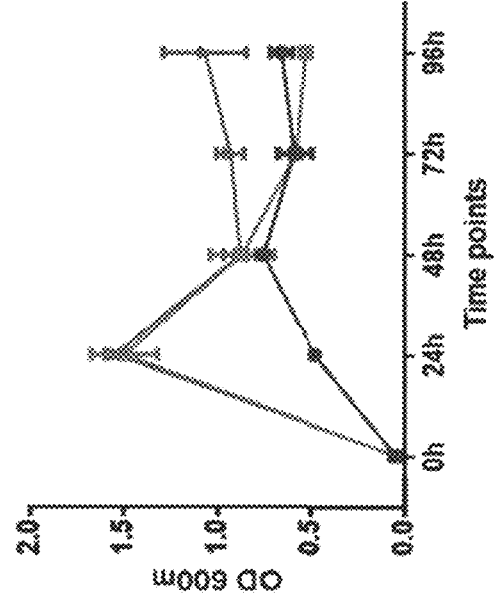
FIGS. 4A-4B show a growth curve (FIG. 4A) and bar chart representation of the OD at 600 nm (FIG. 4B) of *Lactobacillus acidophilus* in minimal medium (MM) in comparison with MM supplemented with PREP-9 and MM supplemented with PREP-10. Maximum growth was reached after 24 h (OD PREP-9=1.5 and OD PREP-10=1.54). MM supplemented with glucose (G) was included as a positive control. * Significant differences t test $p<0.05$.
Figure 4B:
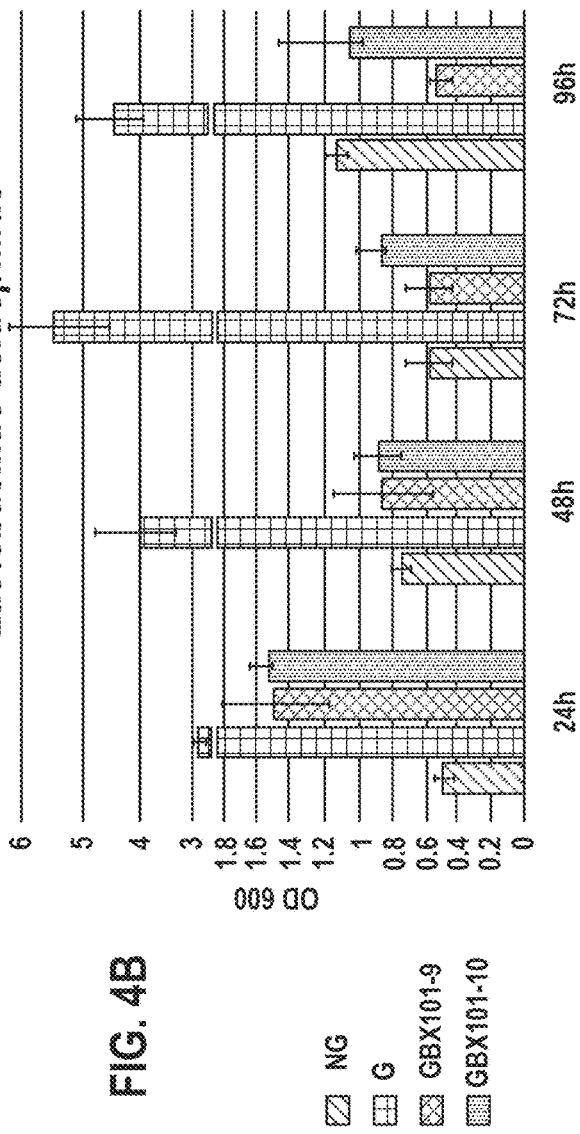

*Lactobacillus acidophilus*: *Lactobacillus acidophilus* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 4A-4B. Maximum growth was reached after 24 h (OD PREP-9=1.5 and OD PREP-10=1.54). The AUC of the growth curves in FIG. 4A were: MM=52.22; MM+PREP- 9=77.56; and MM+PREP-10=93.8. *Lactobacillus acidophilus* showed significant higher growth in minimal medium supplemented with PREP-9 and 10 than in minimal medium without supplementation after 24 h. This means the bacterium is able to metabolize PREP-9 and 10 as a source of carbon. The samples promoted similar growth in the bacterium. The calculation of the AUC showed more efficacy for PREP-10.

Figure 5A:
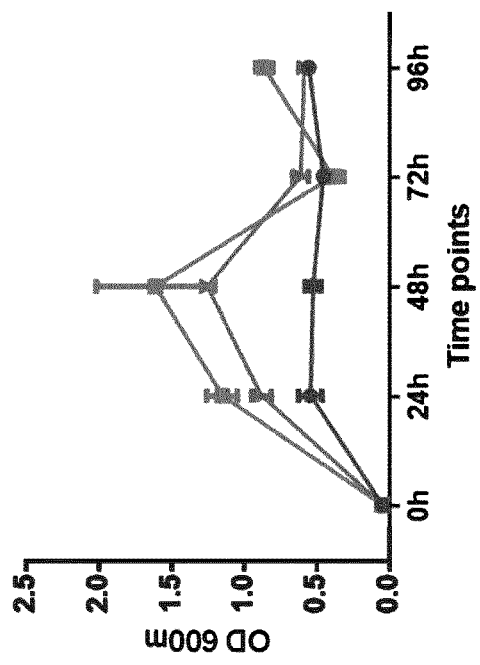
FIGS. 5A-5B show a growth curve (FIG. 5A) and bar chart representation of the OD at 600 nm (FIG. 5B) of *Lactobacillus reuteri* in minimal medium (MM) in comparison with MM supplemented with PREP-9 and MM supplemented with PREP-10. Maximum growth was reached after 48 h (OD PREP-9=1.61 and OD PREP-10=1.26). MM supplemented with glucose (G) was included as a positive control. * Significant differences t test $p<0.05$.
Figure 5B:
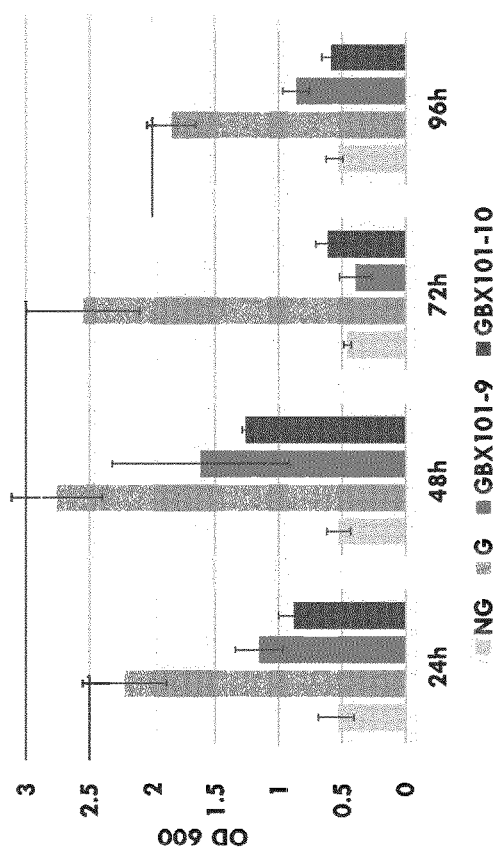

*Lactobacillus reuteri*: *Lactobacillus reuteri* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 5A-5B. Maximum growth was reached after 48 h (OD PREP-9=1.61 and OD PREP-10=1.26). The AUC of the growth curves in FIG. 5A were: MM=44.02; MM+PREP-9=86.79; and MM+PREP-10=73.74. *Lactobacillus reuteri* showed higher growth in minimal medium supplemented with PREP-9 and 10 than in minimal medium without supplementation after 48 h. This means the bacterium is able to metabolize PREP-9 and 10 as a source of carbon. The calculation of the AUC showed more efficacy for PREP-9.

Figure 6A:
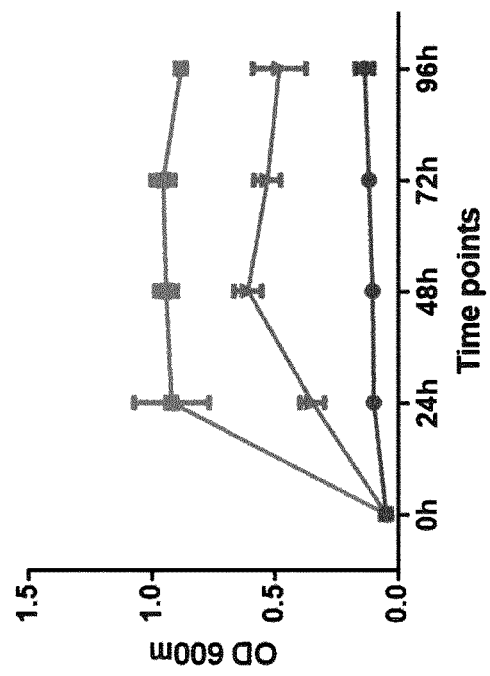
FIGS. 6A-6B show a growth curve (FIG. 6A) and bar chart representation of the OD at 600 nm (FIG. 6B) of *Akkermansia muciniphila* in minimal medium (MM) in comparison with MM supplemented with PREP-9 and MM supplemented with PREP-10. Higher maximum growth in MM supplemented with PREP-9 after 72 h (OD=0.96) than the maximum growth with PREP-10 after 48 h (OD=0.61). MM supplemented with glucose (G) was included as a positive control. * Significant differences t test $p<0.05$.
Figure 6B:
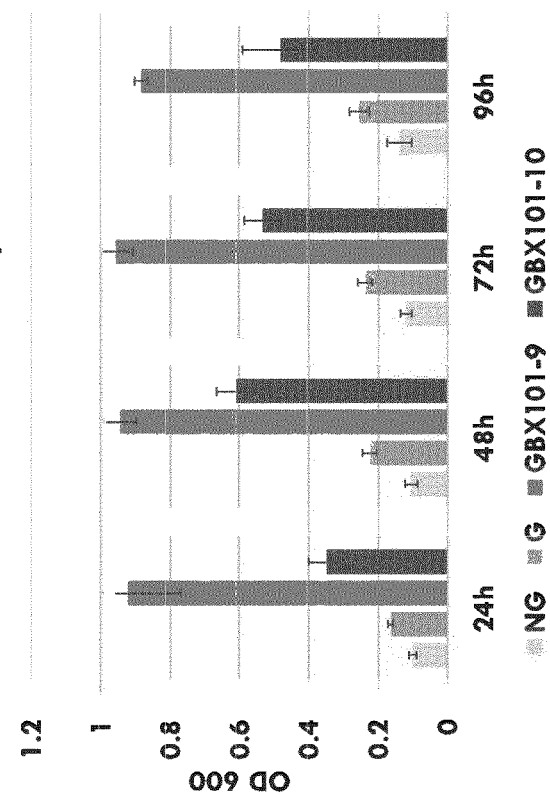

*Akkermansia muciniphila*: *Akkermansia muciniphila* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 6A-6B. Maximum growth in MM supplemented with PREP-9 was after 72 h (OD=0.96), while the maximum growth with PREP-10 was after 48 h (OD=0.61). The AUC of the growth curves in FIG. 6A were: MM=10.07; MM+PREP-9=78.98; and MM+PREP-10=42.20. *Akkermansia muciniphila* showed higher growth in minimal medium supplemented with PREP-9 and 10 than in minimal medium without supplementation after every time point. The calculation of the AUC showed more efficacy for PREP-9.

Figure 7A:
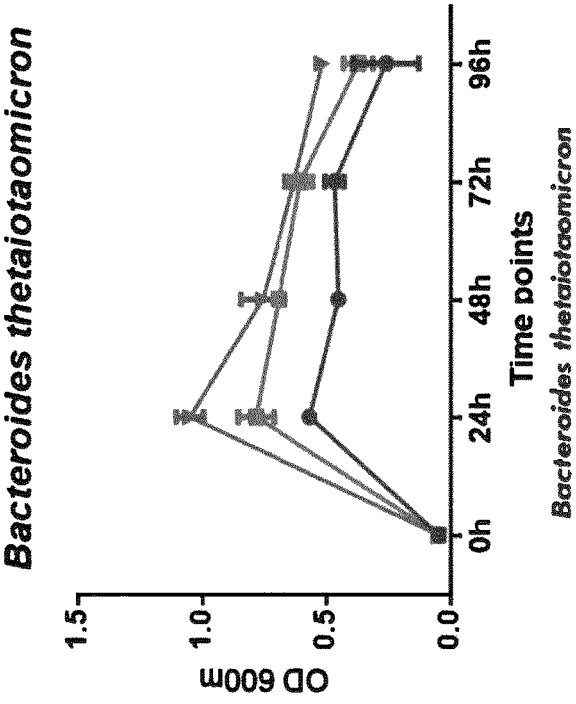
FIGS. 7A-7B show a growth curve (FIG. 7A) and bar chart representation of the OD at 600 nm (FIG. 7B) of *Bacteroides* thetaiotaomicron in minimal medium (MM) in comparison with MM supplemented with PREP-9 and MM supplemented with PREP-10. Maximum growth was reached after 24 h (OD PREP-9=1.5 and OD PREP-10=1.54) MM supplemented with glucose (G) was included as a positive control. * Significant differences t test $p<0.05$.
Figure 7B:
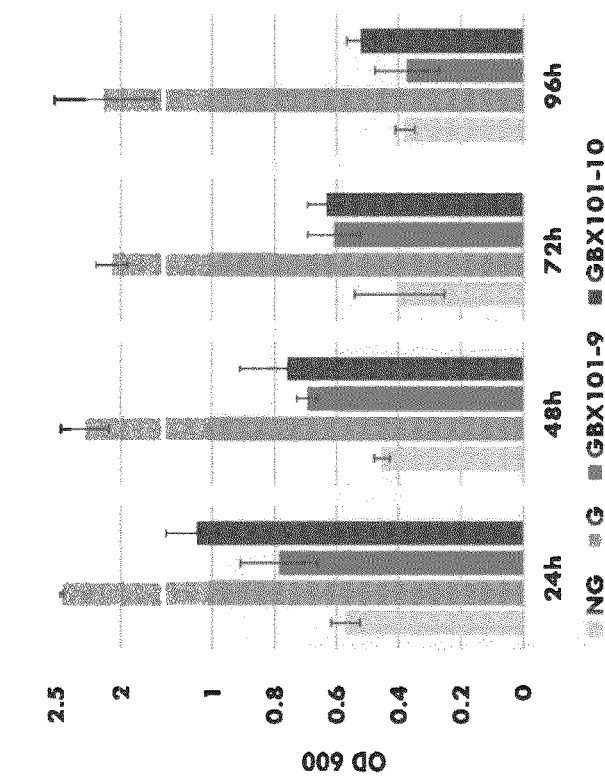

*Bacteroides thetaiotaomicron*: *Bacteroides thetaiotaomicron* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 7A-7B. *Bacteroides* thetaiotaomicron showed significant higher growth in minimal medium supplemented with PREP-9 after 48 h, and it showed significant higher growth with PREP-10 after 24 h, meaning that the bacterium is capable of using both samples but it can metabolize PREP-10 faster. The calculation of the AUC showed more efficacy of PREP-10.

Figure 8A:
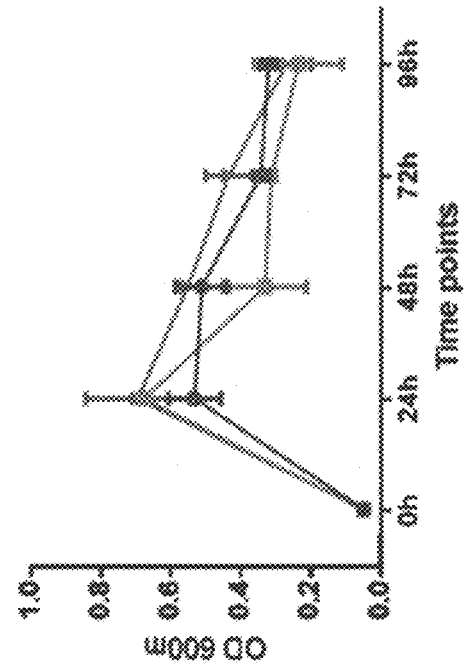
FIGS. 8A-8B show a growth curve (FIG. 8A) and bar chart representation of the OD at 600 nm (FIG. 8B) of *Escherichia coli* in minimal medium (MM) in comparison with MM supplemented with PREP-9 and MM supplemented with PREP-10. MM supplemented with glucose (G) was included as a positive control. * Significant differences t test $p<0.05$.
Figure 8B:
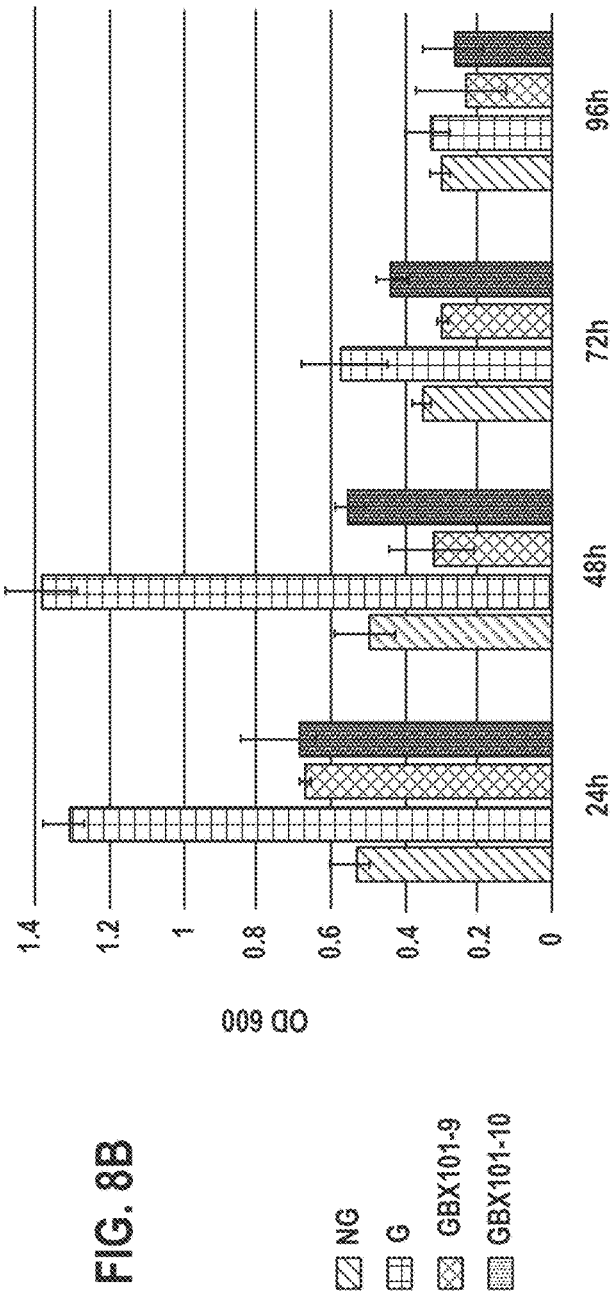

*Escherichia coli*: *Escherichia coli* was inoculated in minimal medium (MM), MM supplemented with PREP-9 at 15 mg/ml, MM supplemented with PREP-10 at 15 mg/ml, and MM with glucose and growth was assessed by measuring the optical densities (OD) at 600 nm in a spectrophotometer after 24 h, 48 h, 72 h and 96 h of growth starting with an OD of 0.05. The results are shown in FIGS. 8A-8B. *Escherichia coli* did not show significant difference in growth in minimal medium versus growth in minimal medium supplement with PREP-9 or 10.

TABLE 5

Table 5. Values of the area under the curve (AUC) and the p-values of the two-way ANOVA for comparison of efficacy.

| Species | NG (AUC) | PREP-10 (AUC) | p-value (NG vs. PREP-10) |
|---|---|---|---|
| Bifidobacterium bifidum | 18.13 | 23.64 | 0.1024 |
| Bifidobacterium animalis | 36.76 | 48.90 | 0.0031* |
| Bifidobacterium breve | 34.50 | 42.14 | 0.1983 |
| Lactobacillus acidophilus | 52.22 | 93.8 | <0.0001* |
| Lactobacillus reuteri | 44.02 | 73.74 | 0.0056* |
| Akkermansia muciniphila | 10.07 | 42.20 | <0.0001* |
| Bacteroides thetaiotaomicron | 39.52 | 65.46 | <0.0001* |
| Escherichia coli | 37.77 | 44.22 | 0.1605 |

*p - values < 0.05 = significant differences

This study has demonstrated that PREP-9 and PREP-10 can significantly enhance the growth of representative bacteria from the gut microbiota in vitro. This means that these bacteria can use PREP-9 and PREP-10 as a source of carbon. Such findings suggest that these samples promote the growth in the gastrointestinal tract of these bacteria. HMOs are resistant to gastrointestinal digestion in host infants, and thus the majority of HMOs reach the colon, where they may serve as prebiotics to shape a healthy gut ecosystem by stimulating the growth of beneficial microorganisms and by acting as receptor analogues to inhibit the binding of various pathogens and toxins to epithelial cells (Asakuma et al., 2011).

Example 4—Further Microbial Testing of Prep-9

Figure 23:
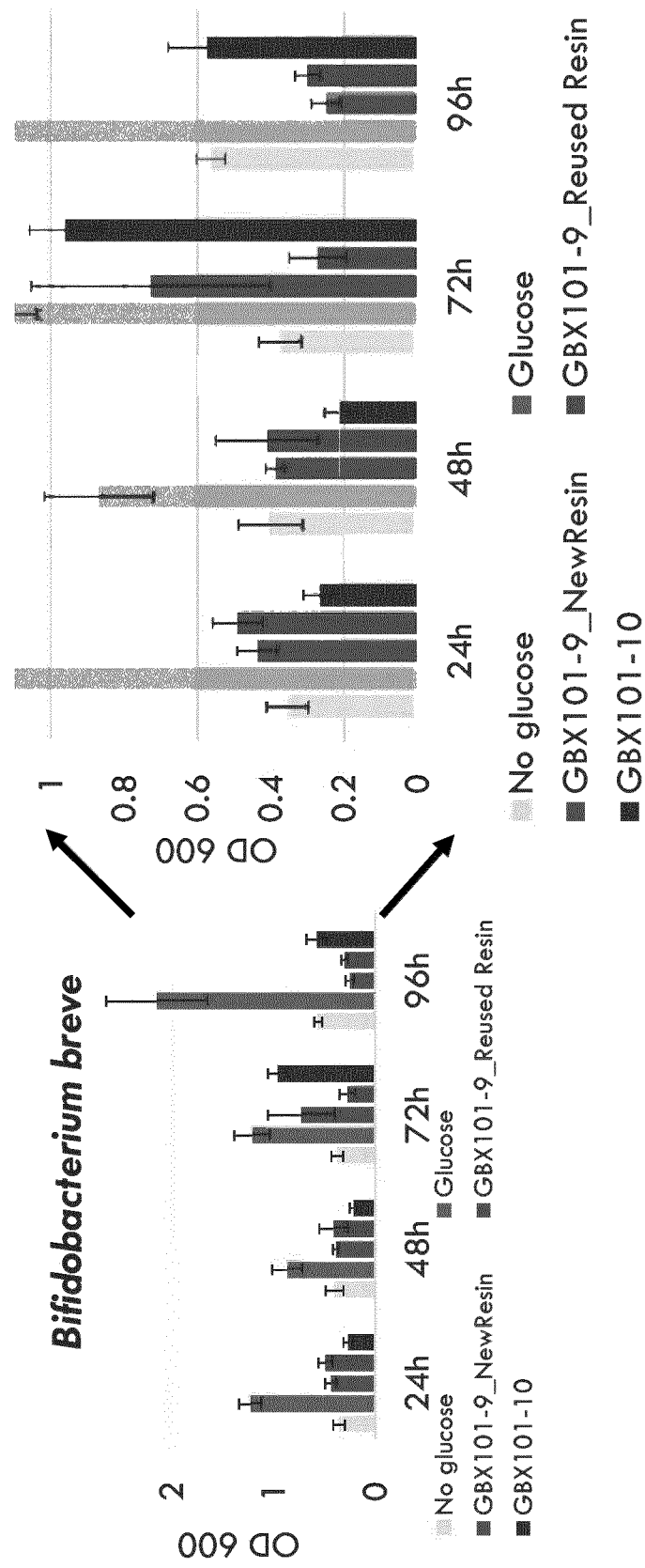
FIG. 23 shows a graph (left side) of growth of *Bifidobacterium breve* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10. The graph in the right side is an enlargement of the left side graph to show detail.

Bacterial growth in the presence of a composition of a claimed invention in liquid minimal media, GBX101-9 (i.e., PREP-9 of Example 1) (15 mg/ml), was compared to bacteria growth in liquid minimal media (no glucose) and liquid minimal media with glucose (glucose). Each sample was added to 200 µl medium and inoculated with 5 µl of *Bifidobacterium bifidum*, *Bifidobacterium animalis*, *Bifidobacterium breve*, *Lactobacillus acidophilus*, *Akkermansia muciniphila*, or *Bacteroides* thetaiotaomicron (FIG. 23). Each sample was prepared in triplicate. The bacterial growth was determined by measuring the optical densities (OD) at 600 nm in a spectrophotometer after 24 h, 48 h, and optionally 72 h of growth starting with an OD of 0.05.

Figure 9:
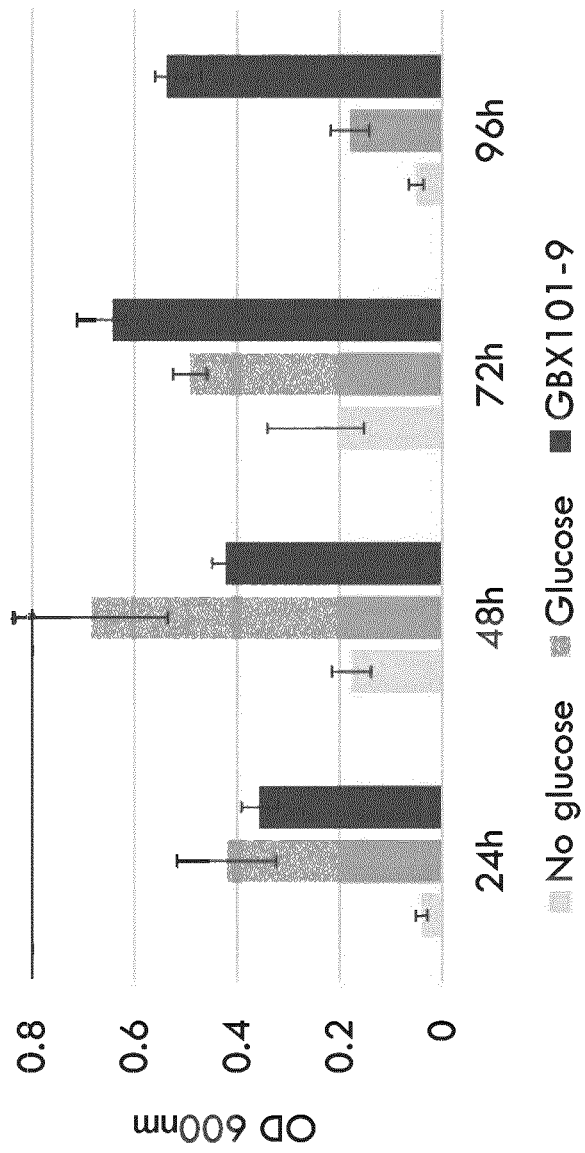
FIG. 9 shows a graph of growth of *Bifidobacterium bifidum* at selected time points in minimal medium (no glucose), minimal medium supplemented with glucose (glucose), and minimal medium supplemented with GBX101-9.

FIG. 9 illustrates that supplementing minimal media with GBX101-9 results in growth of *Bifidobacterium bifidum*, as measured by OD, superior to growth of *Bifidobacterium bifidum* in no glucose at 24, 48, 72, and 96 hours.

Figure 10:
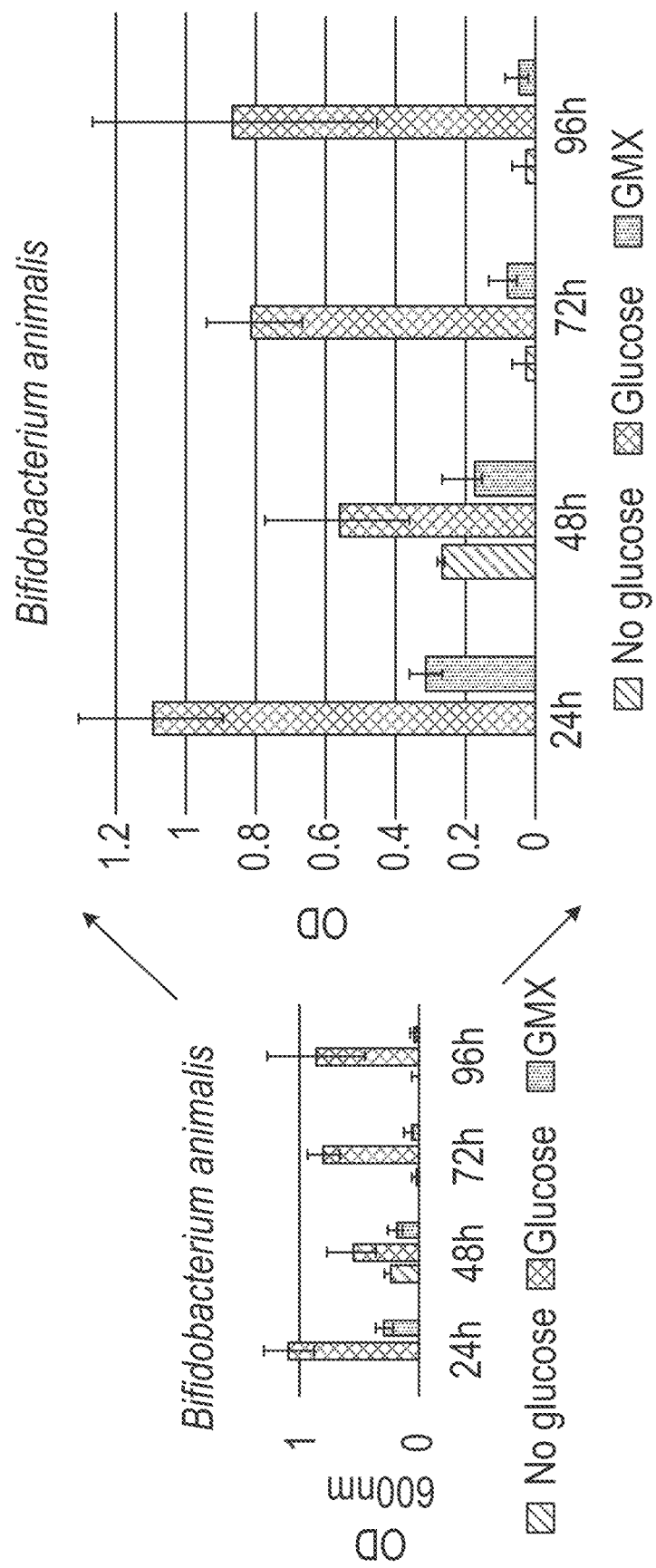
FIG. 10 shows a graph (left side) of growth of *Bifidobacterium animalis* at selected time points in minimal medium (no glucose), minimal medium supplemented with glucose (glucose), and minimal medium supplemented with GBX101-9 (GMX). The graph in the right side is an enlargement of the left side graph to show detail.

FIG. 10 illustrates that supplementing minimal media with GBX101-9 results in growth of *Bifidobacterium animalis*, as measured by OD, about the same as growth in minimal media.

Figure 11:
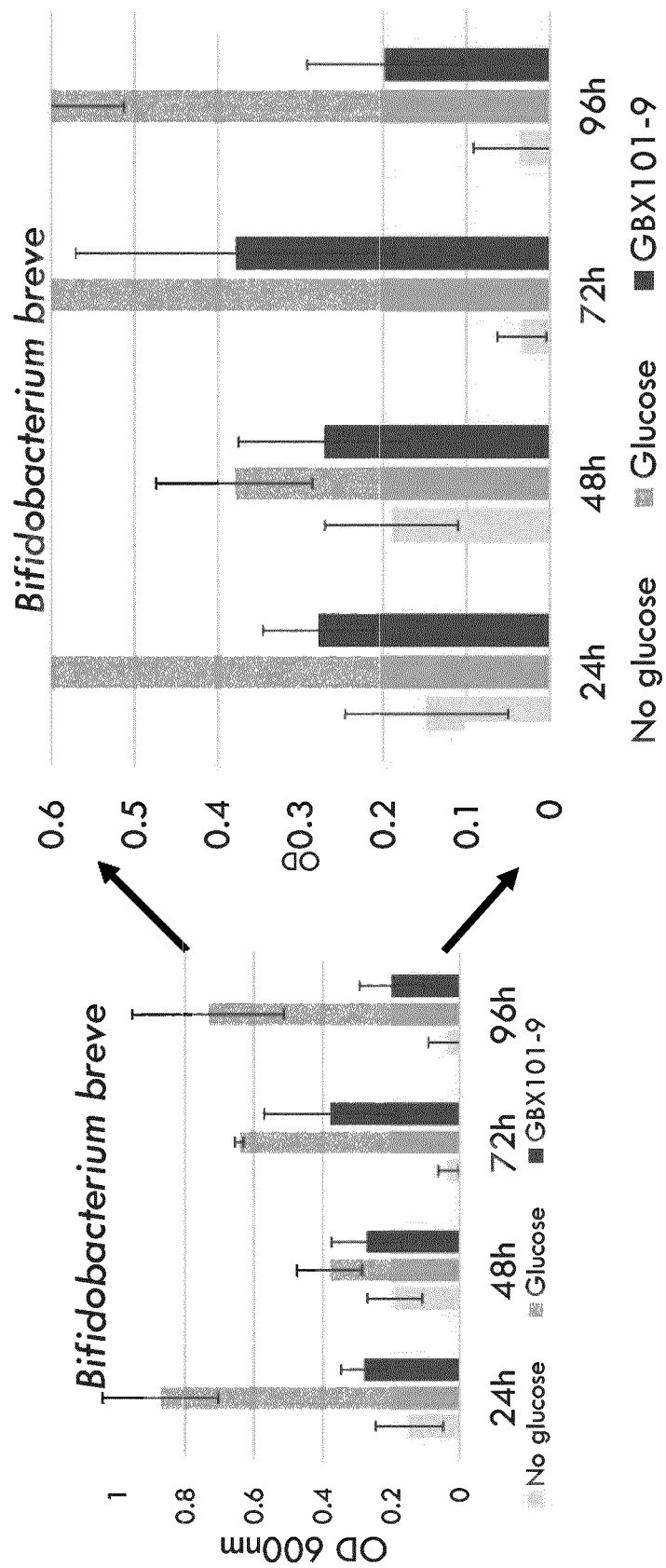
FIG. 11 shows a graph (left side) of growth of *Bifidobacterium breve* at selected time points in minimal medium (no glucose), minimal medium supplemented with glucose (glucose), and minimal medium supplemented with GBX101-9. The graph in the right side is an enlargement of the left side graph to show detail.

FIG. 11 illustrates that supplementing minimal media with GBX101-9 results in growth of *Bifidobacterium breve*, as measured by OD, superior to growth of *Bifidobacterium breve* in no glucose at 72 and 96 hrs.

Figure 12:
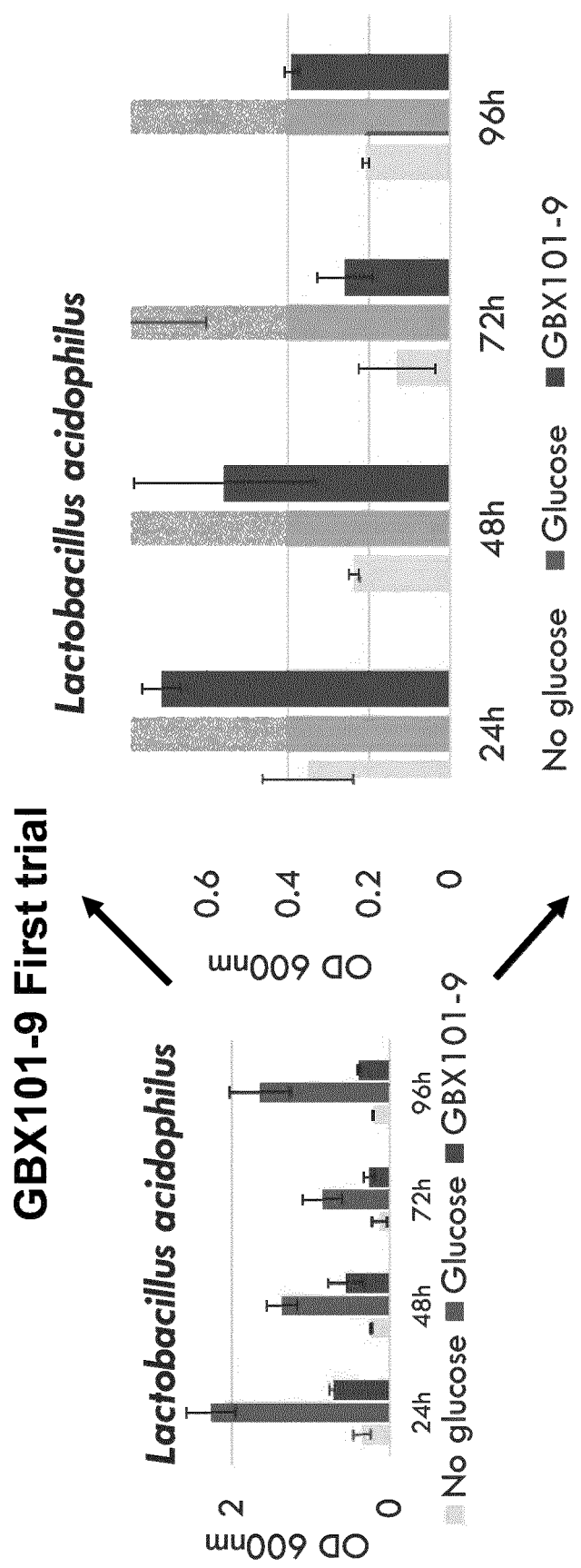
FIG. 12 shows a graph (left side) of growth of *Lactobacillus acidophilus* at selected time points in minimal medium (no glucose), minimal medium supplemented with glucose (glucose), and minimal medium supplemented with GBX101-9. The graph in the right side is an enlargement of the left side graph to show detail.

FIG. 12 illustrates that supplementing minimal media with GBX101-9 results in growth of *Lactobacillus acidophilus*, as measured by OD, superior to growth of *Lactobacillus acidophilus* in no glucose at 24, 48 and 96 hours.

Figure 13:
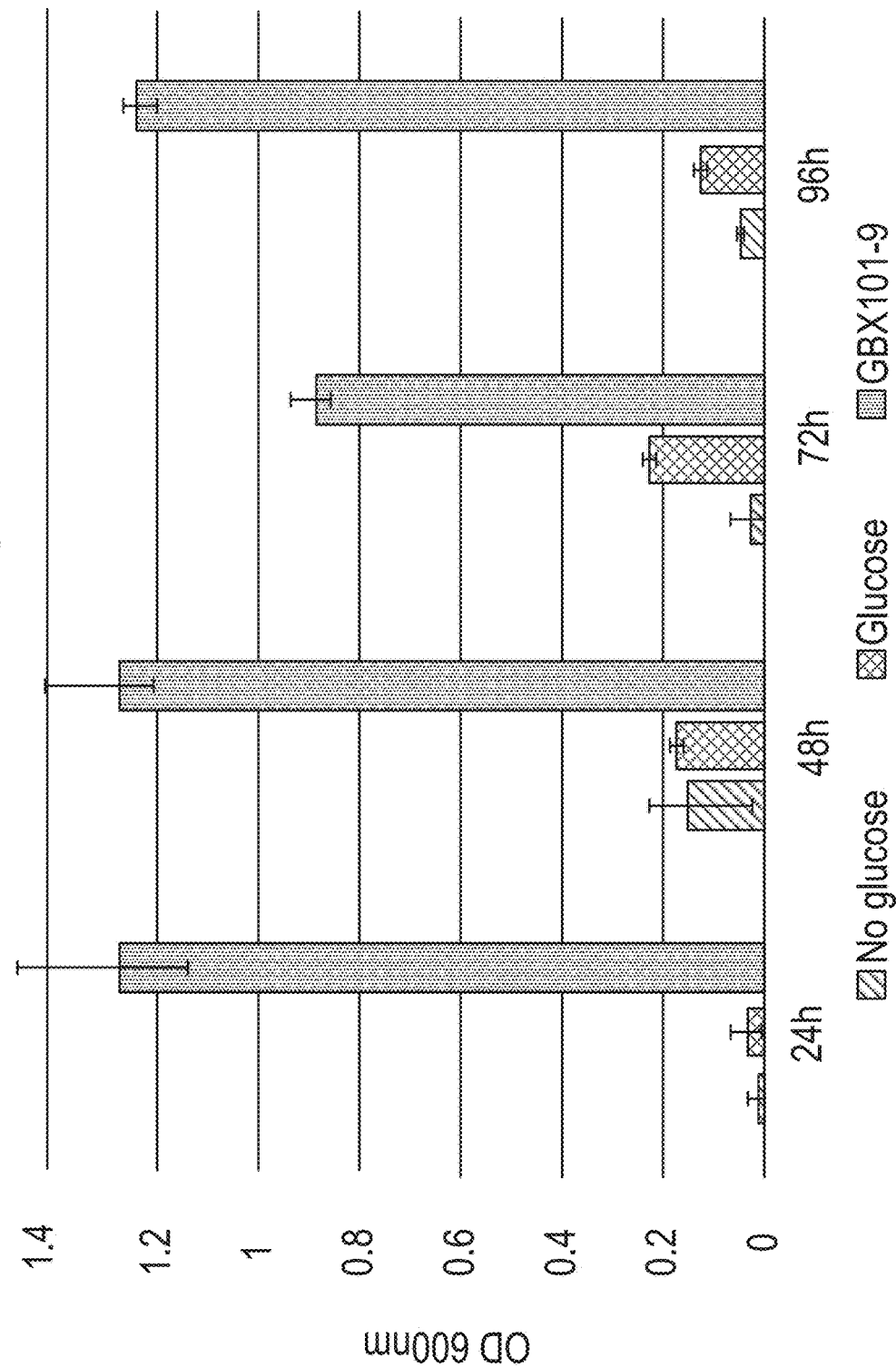
FIG. 13 shows a graph of growth of *Akkermansia muciniphila* at selected time points in minimal medium (no glucose), minimal medium supplemented with glucose (glucose), and minimal medium supplemented with GBX101-9.

FIG. 13 illustrates that supplementing minimal media with GBX101-9 results in growth of *Akkermansia muciniphila*, as measured by OD, superior to growth of *Akkermansia muciniphila* in no glucose and glucose at 24, 48, 72, and 96 hours.

Figure 14:
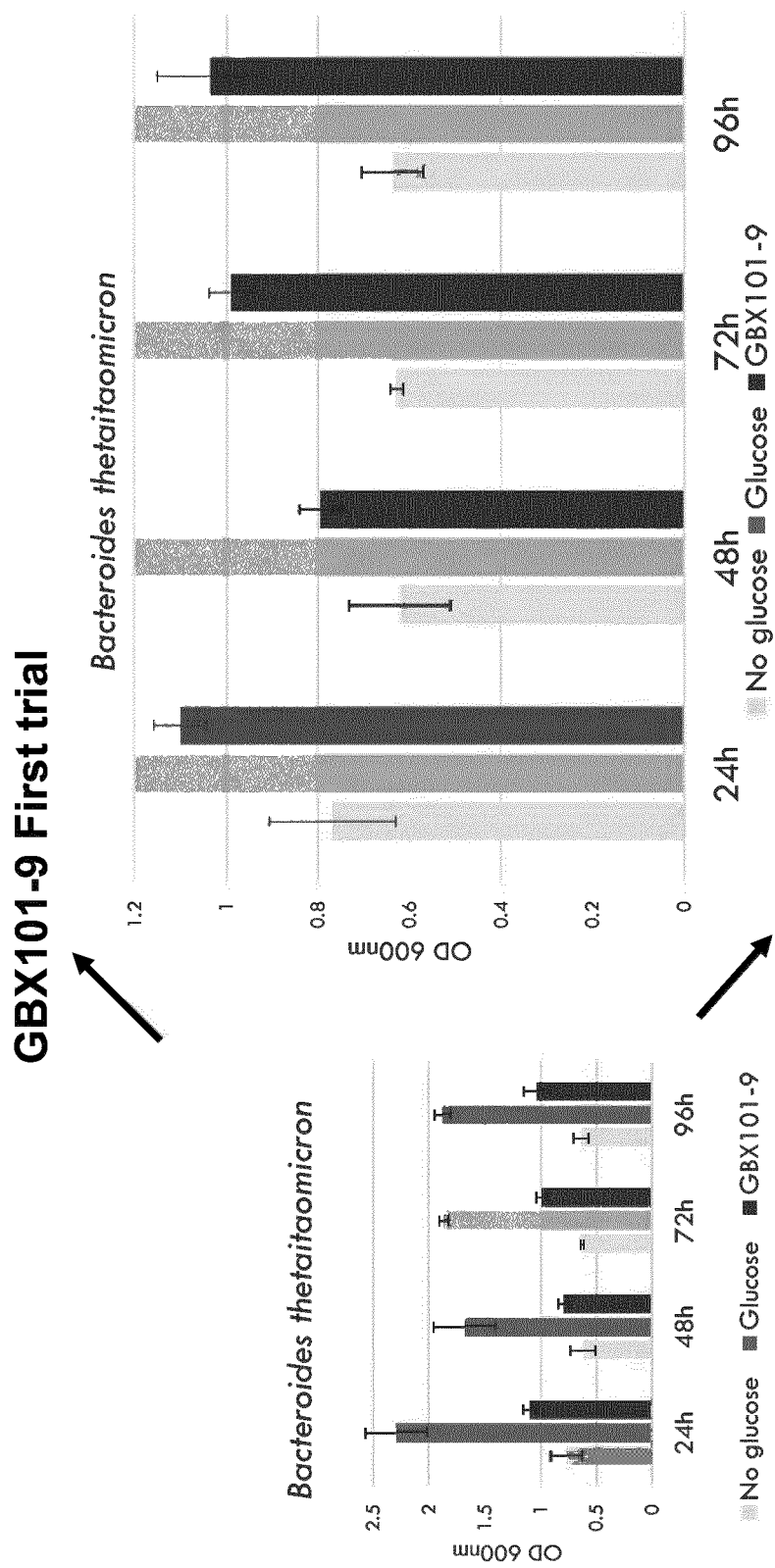
FIG. 14 shows a graph (left side) of growth of *Bacteroides thetaitaomicron* at selected time points in minimal medium (no glucose), minimal medium supplemented with glucose (glucose), and minimal medium supplemented with GBX101-9. The graph in the right side is an enlargement of the left side graph to show detail.

FIG. 14 illustrates that supplementing minimal media with GBX101-9 results in growth of *Bacteroides thetaitaomicron*, as measured by OD, superior to growth of *Bacteroides thetaitaomicron* in no glucose at 24, 48, 72, and 96 hours.

Example 5—Further Microbial Testing of Prep-10

Bacterial growth in the presence of a composition of a claimed invention in liquid minimal media, GBX101-10 (i.e., PREP-10 of Example 2) (15 mg/ml), was compared to bacteria growth in liquid minimal media (no glucose) and liquid minimal media with glucose (glucose). Each sample was added to 200 µl medium and inoculated with 5 µl of *Bifidobacterium bifidum*, *Bifidobacterium animalis*, *Bifidobacterium breve*, *Lactobacillus acidophilus*, *Akkermansia muciniphila*, or *Bacteroides* thetaiotaomicron (FIG. 23). Each sample was prepared in triplicate. The bacterial growth was determined by measuring the optical densities (OD) at 600 nm in a spectrophotometer after 24 h, 48 h, and optionally 72 h of growth starting with an OD of 0.05.

Figure 15:
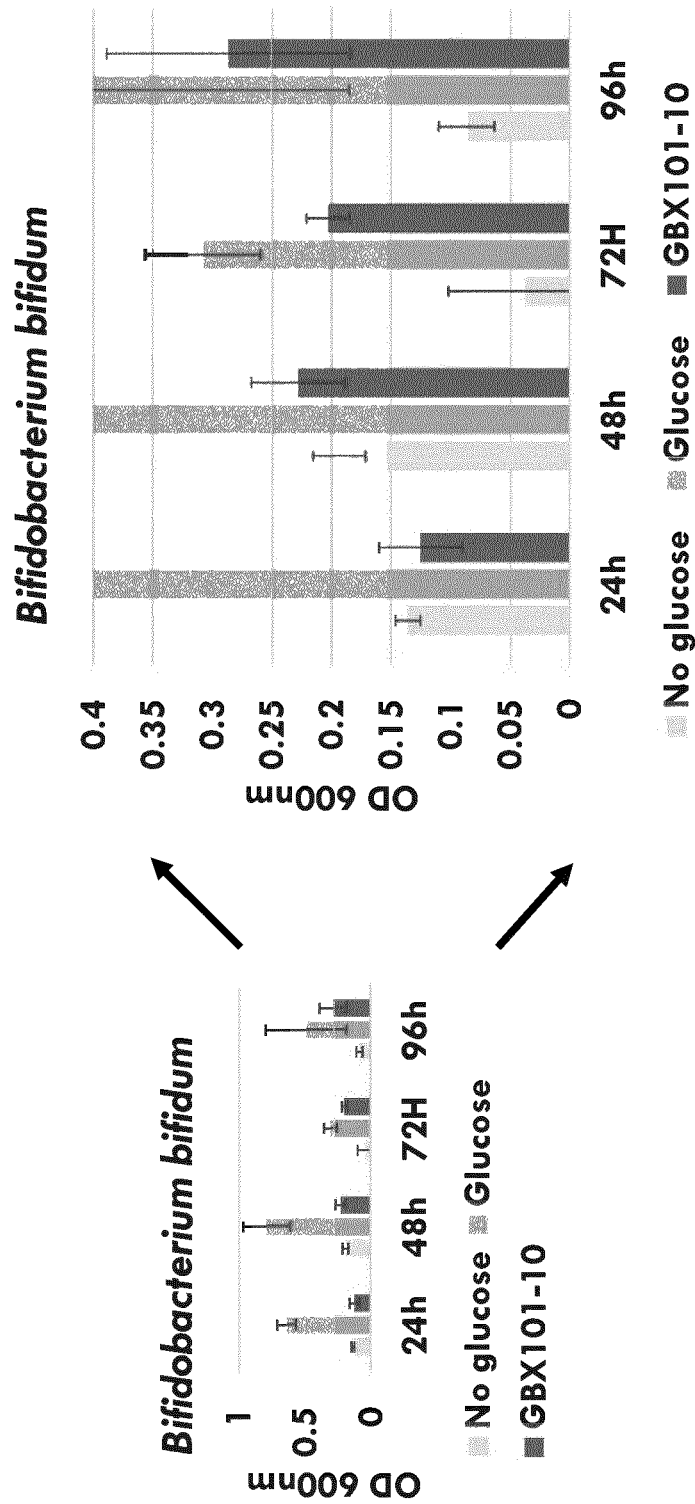
FIG. 15 shows a graph (left side) of growth of *Bifidobacterium bifidum* at selected time points in minimal medium (no glucose), minimal medium supplemented with glucose (glucose), and minimal medium supplemented with GBX101-10. The graph in the right side is an enlargement of the left side graph to show detail.

FIG. 15 illustrates that supplementing minimal media with GBX101-10 results in growth of *Bifidobacterium bifidum*, as measured by OD, superior to growth of *Bifidobacterium bifidum* in no glucose at 72 and 96 hours.

Figure 16:
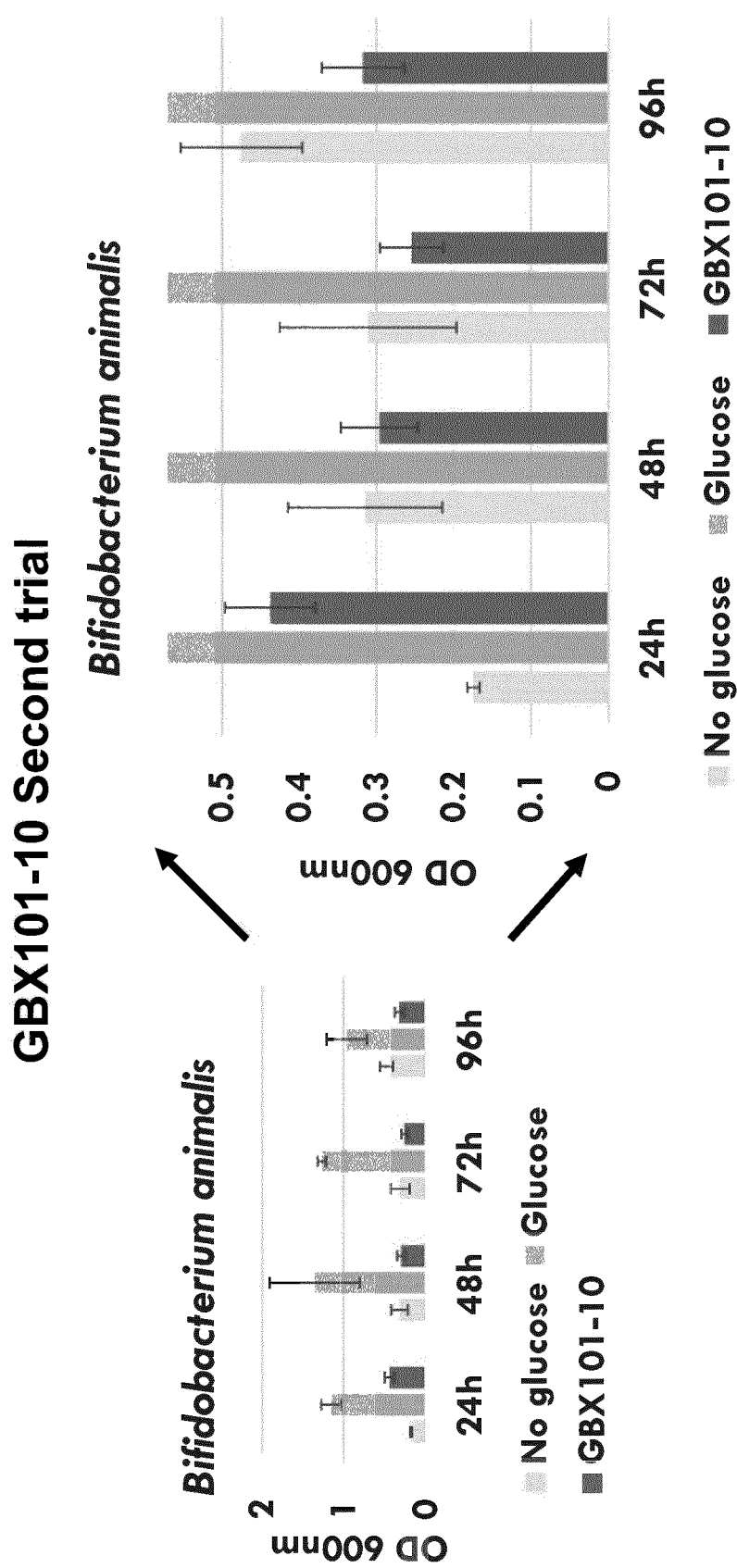
FIG. 16 shows a graph (left side) of growth of *Bifidobacterium animalis* at selected time points in minimal medium (no glucose), minimal medium supplemented with glucose (glucose), and minimal medium supplemented with GBX101-10. The graph in the right side is an enlargement of the left side graph to show detail.

FIG. 16 illustrates that supplementing minimal media with GBX101-10 results in growth of *Bifidobacterium animalis*, as measured by OD, superior to growth of *Bifidobacterium animalis* in no glucose at 24 and 96 hrs.

Figure 17:
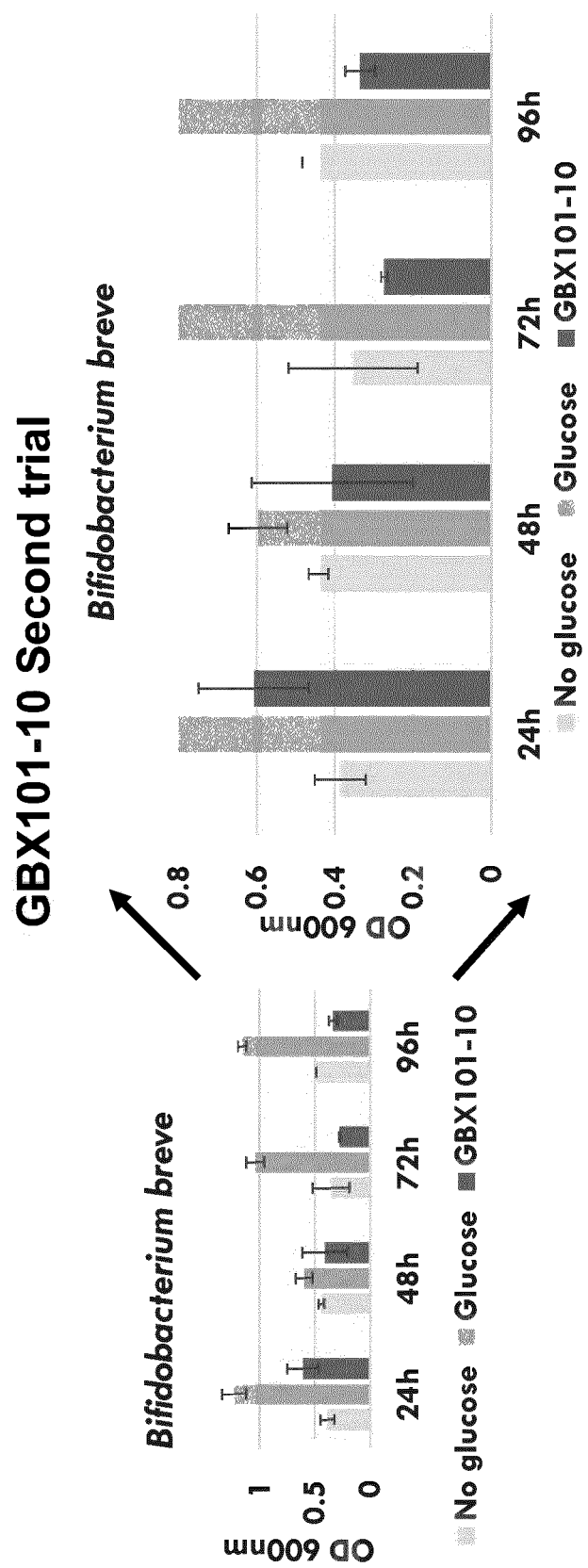
FIG. 17 shows a graph (left side) of growth of *Bifidobacterium breve* at selected time points in minimal medium (no glucose), minimal medium supplemented with glucose (glucose), and minimal medium supplemented with GBX101-10. The graph in the right side is an enlargement of the left side graph to show detail.

FIG. 17 illustrates that supplementing minimal media with GBX101-10 results in growth of *Bifidobacterium breve*, as measured by OD, about equivalent to growth of *Bifidobacterium breve* in no glucose.

Figure 18:
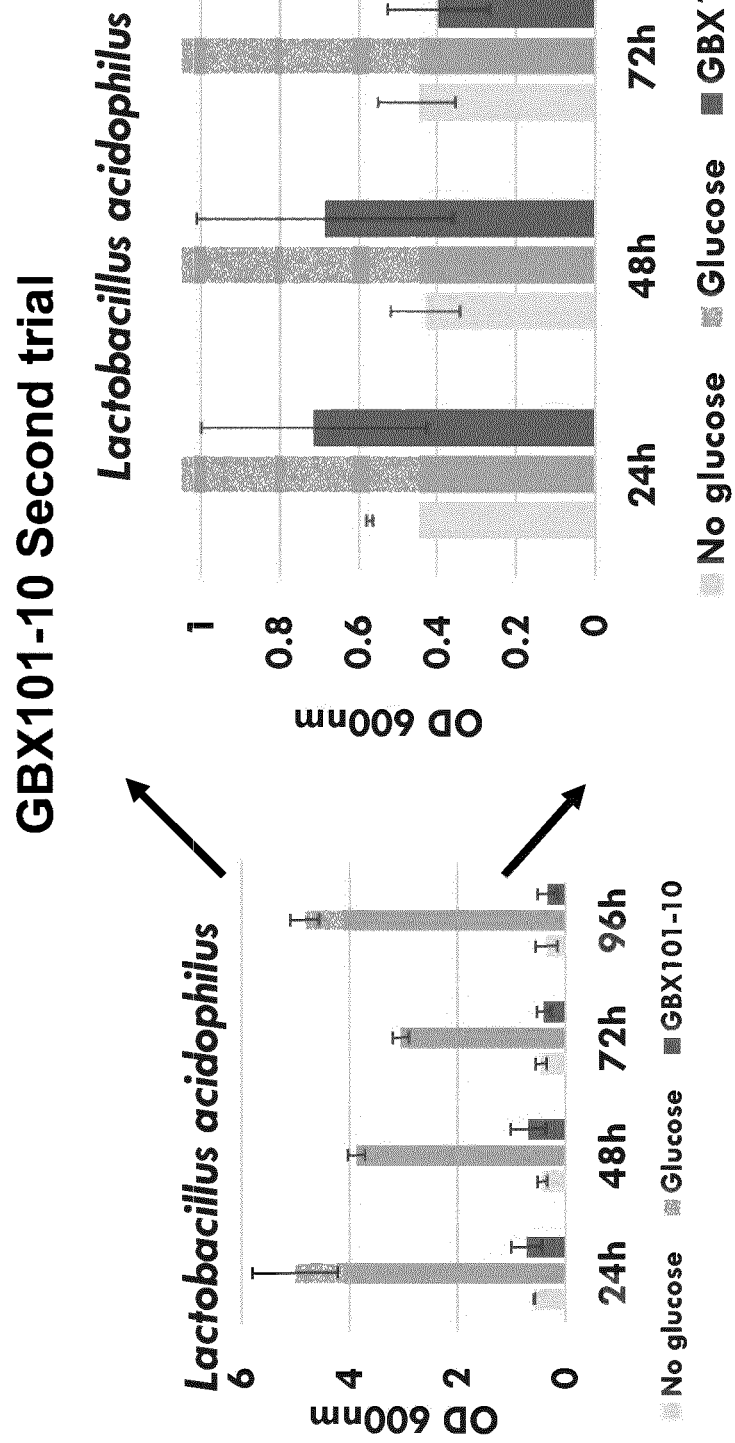
FIG. 18 shows a graph (left side) of growth of *Lactobacillus acidophilus* at selected time points in minimal medium (no glucose), minimal medium supplemented with glucose (glucose), and minimal medium supplemented with GBX101-10. The graph in the right side is an enlargement of the left side graph to show detail.

FIG. 18 illustrates that supplementing minimal media with GBX101-10 results in growth of *Lactobacillus acidophilus*, as measured by OD, superior to growth of *Lactobacillus acidophilus* in no glucose at 24, 48 and 96 hours.

Figure 19:
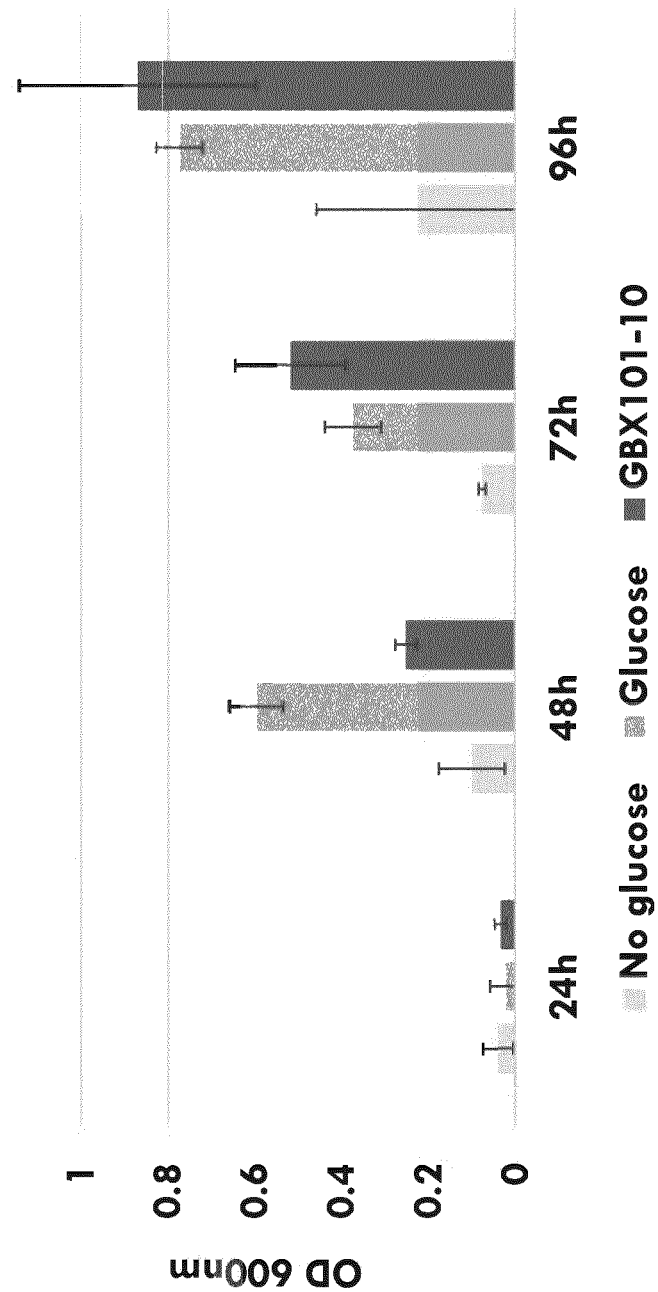
FIG. 19 shows a graph of growth of *Akkermansia muciniphila* at selected time points in minimal medium (no glucose), minimal medium supplemented with glucose (glucose), and minimal medium supplemented with GBX101-10.

FIG. 19 illustrates that supplementing minimal media with GBX101-10 results in growth of *Akkermansia muciniphila*, as measured by OD, superior to growth of *Akkermansia muciniphila* in no glucose at 48, 72, and 96 hours.

Figure 20:
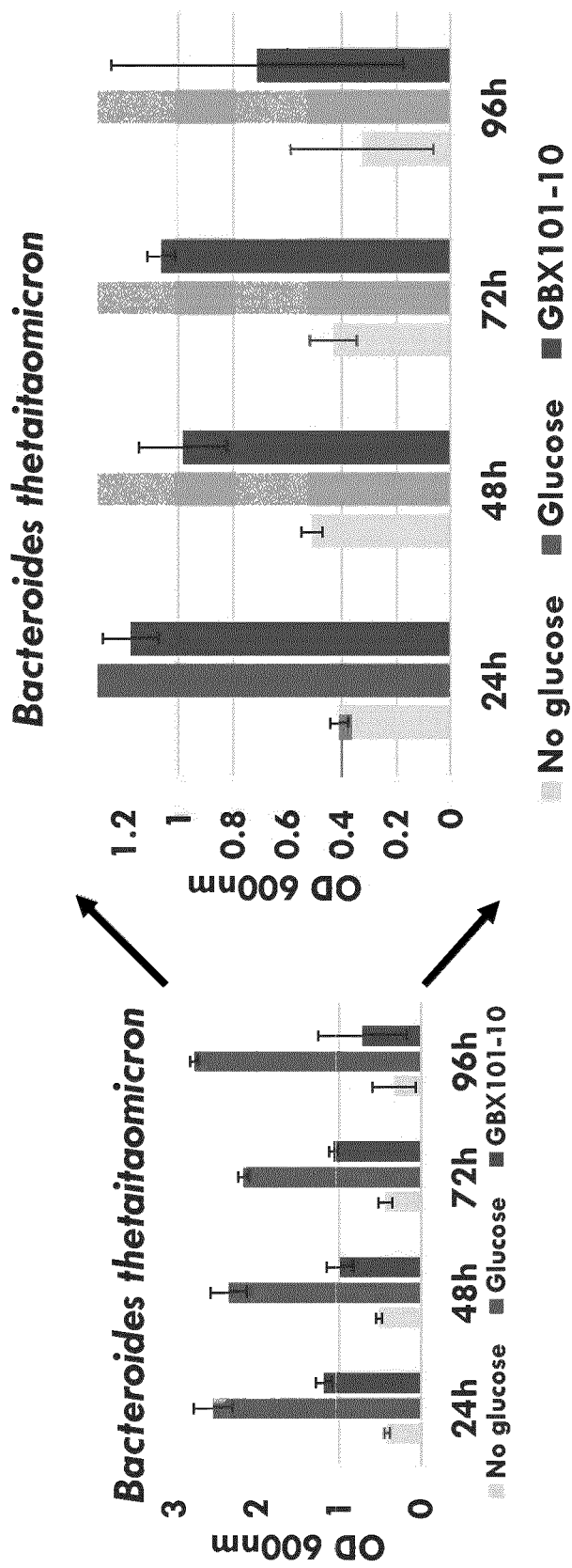
FIG. 20 shows a graph of growth of *Bacteroides thetaiotaomicron* at selected time points in minimal medium (no glucose), minimal medium supplemented with glucose (glucose), and minimal medium supplemented with GBX101-10.

FIG. 20 illustrates that supplementing minimal media with GBX101-10 results in growth of *Bacteroides thetaitaomicron*, as measured by OD, superior to growth of *Bacteroides thetaitaomicron* in no glucose at 24, 72, and 96 hours.

Example 6—Further Microbial Testing of Prep-9 and Prep-10

Bacterial growth in the presence of a composition of a claimed invention in liquid minimal media, GBX-101-9 (GBX101-9_NewResin), GBX101-9 purified with reused resin after a GBX101-9 purification (GBX101-9_Reused Resin), GBX101-10 was compared to bacteria growth in liquid minimal media (no glucose) and liquid minimal media with glucose (glucose). All GBX101 samples were 15 mg/ml. Each sample was added to 200 µl medium and inoculated with 5 µl of *Bifidobacterium bifidum*, *Bifidobacterium animalis*, *Bifidobacterium breve*, *Lactobacillus acidophilus*, *Akkermansia muciniphila*, or *Bacteroides* thetaiotaomicron (FIG. 23). Each sample was prepared in triplicate. The bacterial growth was determined by measuring the optical densities (OD) at 600 nm in a spectrophotometer after 24 h, 48 h, and optionally 72 h of growth starting with an OD of 0.05.

Figure 21:
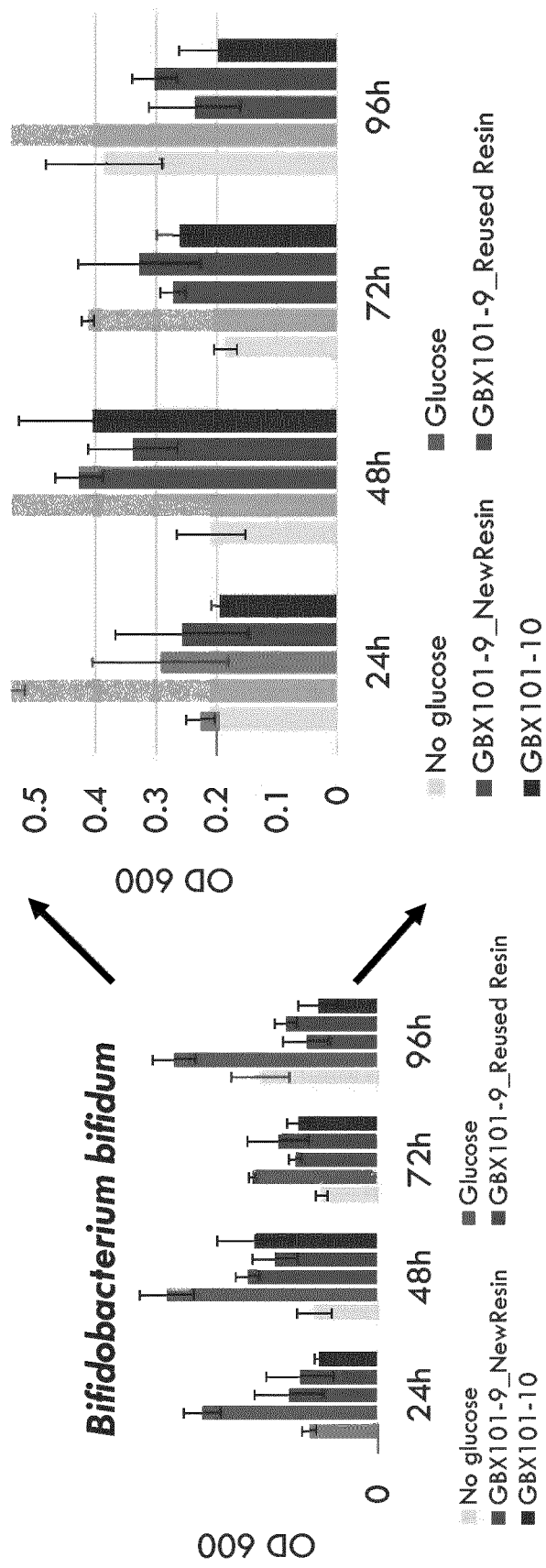
FIG. 21 shows a graph (left side) of growth of *Bifidobacterium bifidum* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10. The graph in the right side is an enlargement of the left side graph to show detail.

FIG. 21 illustrates that supplementing minimal media with GBX101 consistently results in growth of *Bifidobacterium bifidum*, as measured by OD, superior to growth of *Bifidobacterium bifidum* in no glucose at 48 and 72 hours.

Figure 22:
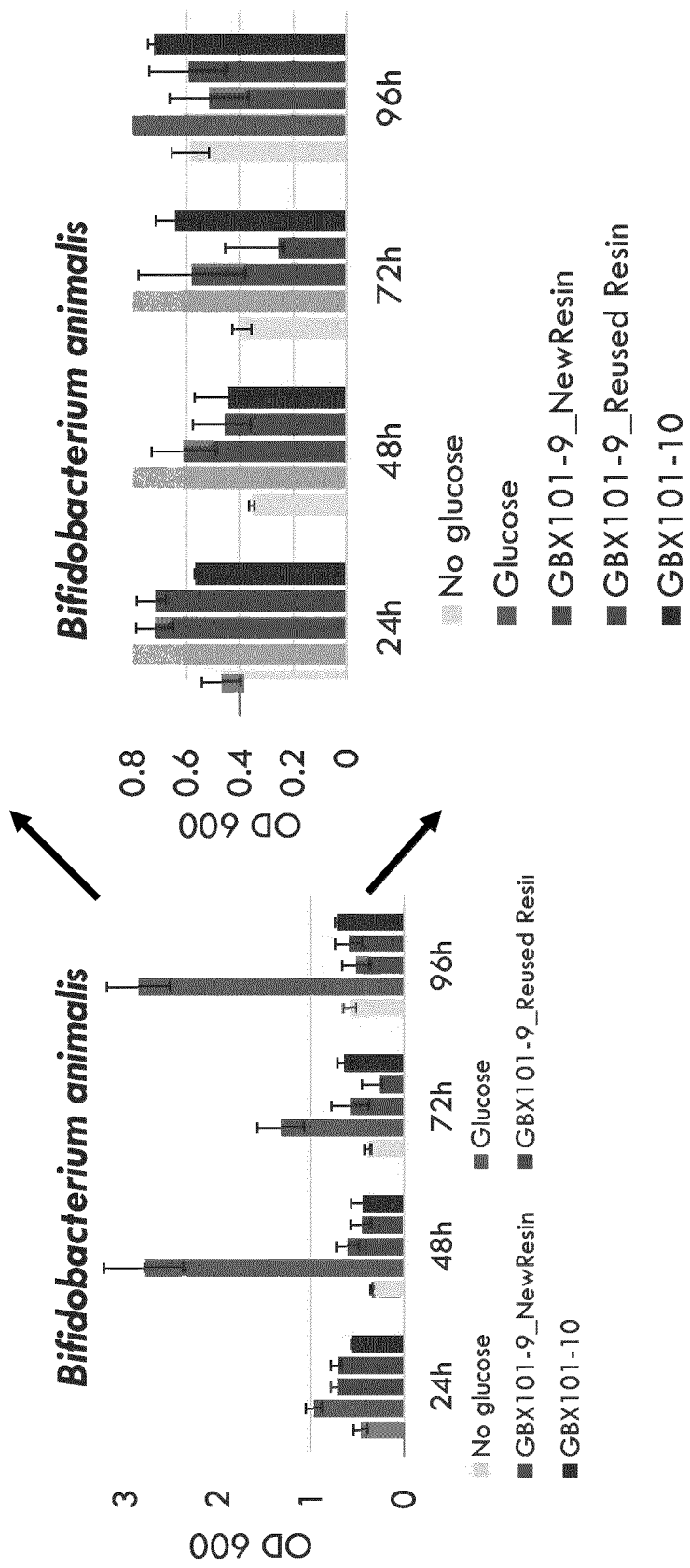
FIG. 22 shows a graph (left side) of growth of *Bifidobacterium animalis* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10. The graph in the right side is an enlargement of the left side graph to show detail.

FIG. 22 illustrates that supplementing minimal media with GBX101 in growth of *Bifidobacterium animalis*, as measured by OD, superior to growth of *Bifidobacterium animalis* in no glucose at 24 hrs.

FIG. 23 illustrates that supplementing minimal media with GBX101 results in growth of *Bifidobacterium breve*, as measured by OD, about equivalent to growth of *Bifidobacterium breve* in no glucose.

Figure 24:
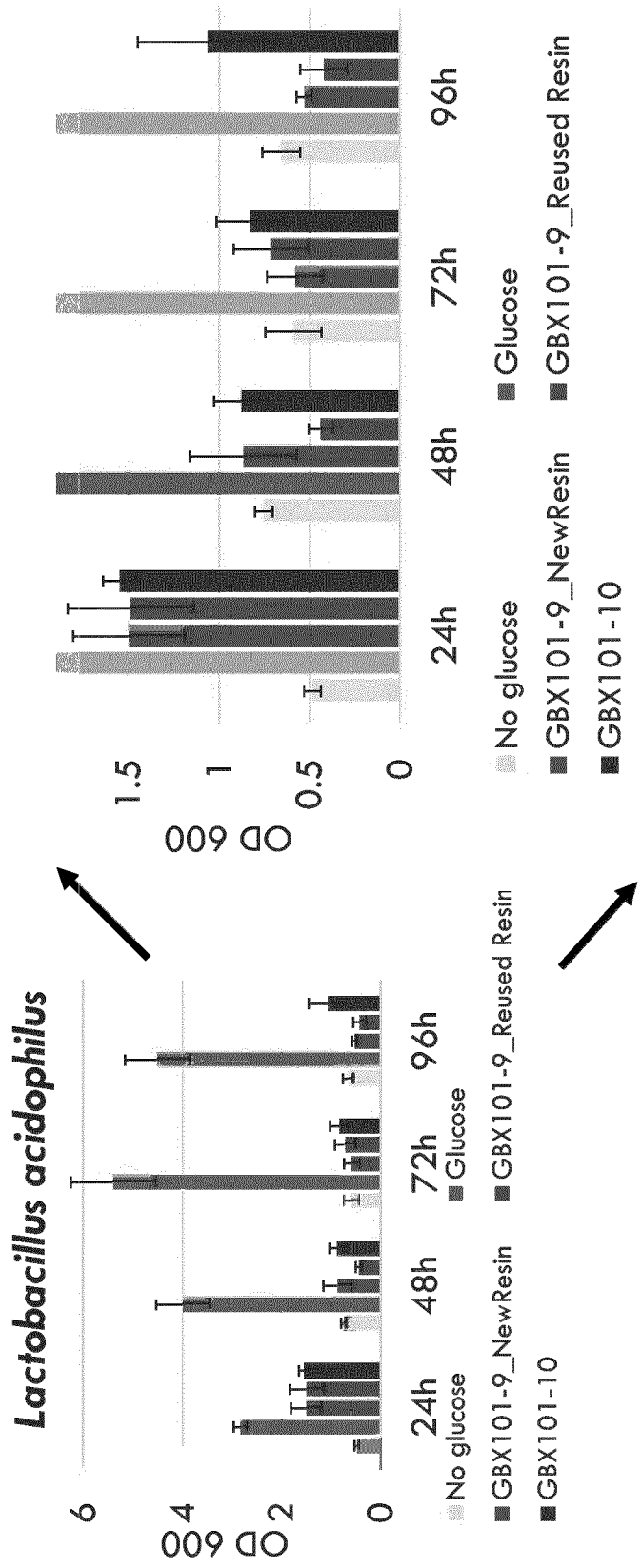
FIG. 24 shows a graph (left side) of growth of *Lactobacillus acidophilus* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10. The graph in the right side is an enlargement of the left side graph to show detail.

FIG. 24 illustrates that supplementing minimal media with GBX101 results in growth of *Lactobacillus acidophilus*, as measured by OD, superior to growth of *Lactobacillus acidophilus* in no glucose at 24 hours.

Figure 25:
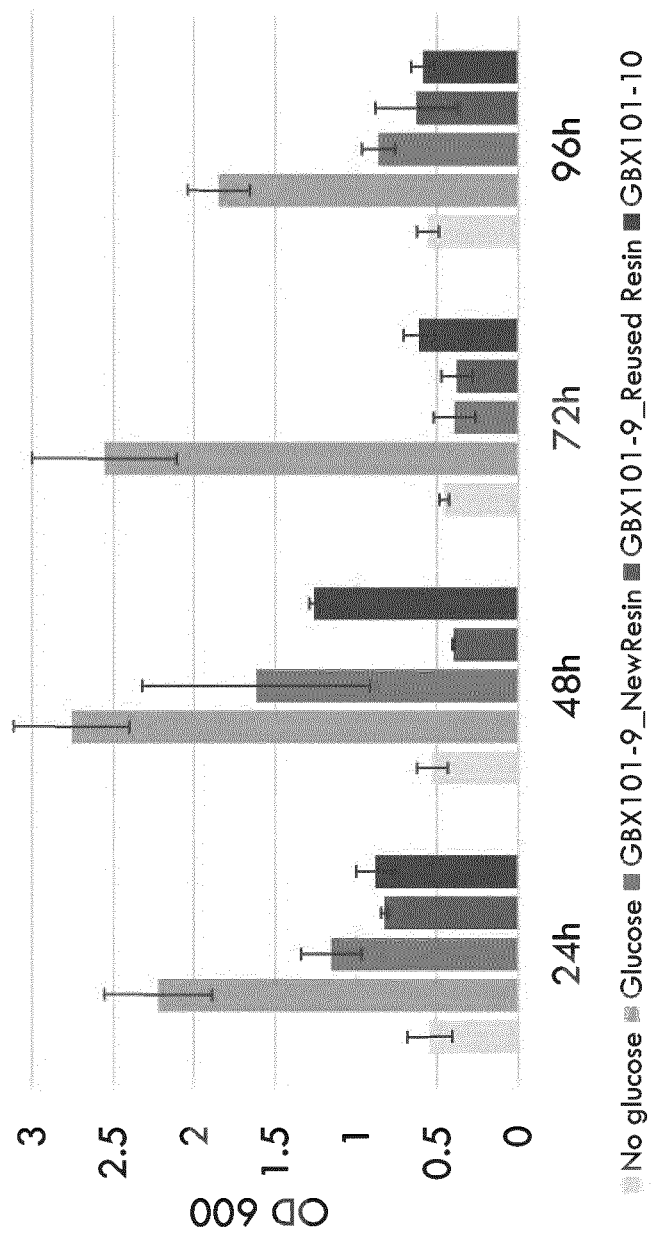
FIG. 25 shows a graph of growth of *Lactobacillus acidophilus* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10.

FIG. 25 illustrates that supplementing minimal media with GBX101 results in growth of *Lactobacillus reuteri*, as measured by OD, about the same as growth of *Lactobacillus reuteri* in no glucose.

Figure 26:
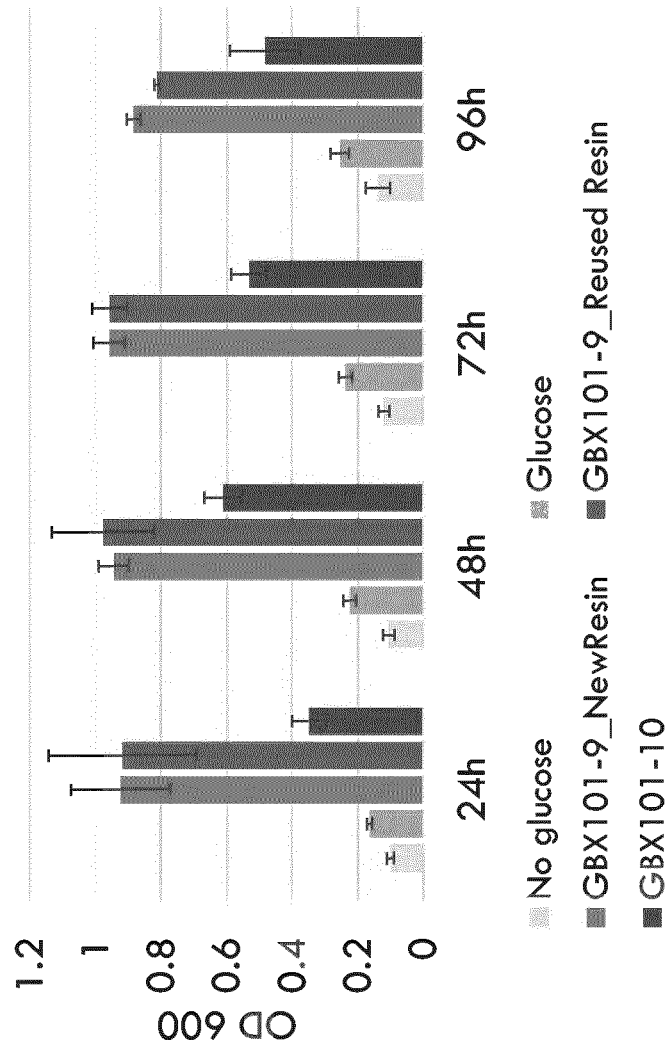
FIG. 26 shows a graph of growth of *Akkermansia muciniphila* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10.

FIG. 26 illustrates that supplementing minimal media with GBX101 results in growth of *Akkermansia muciniphila*, as measured by OD, superior to growth of *Akkermansia muciniphila* in no glucose or glucose at 24, 48, 72, and 96 hours.

Figure 27:
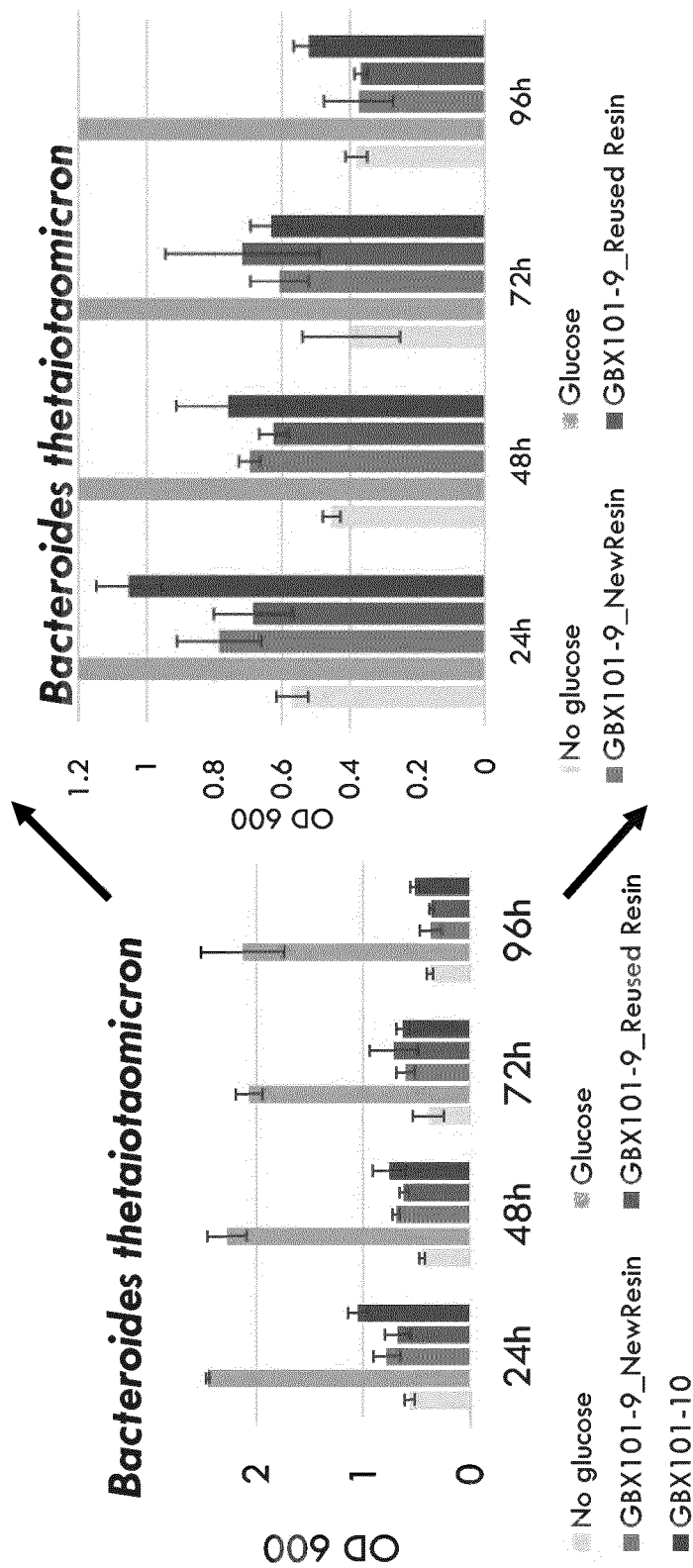
FIG. 27 shows a graph (left side) of growth of *Bacteroides thetaiotaomicron* at selected time points in minimal medium (no glucose), minimal medium supplemented with glucose (glucose), minimal medium supplemented with GBX101-9 purified with fresh resin (GBX101-9_NewResin), minimal medium supplemented with GBX101-9 purified with reused resin (GBX101-9_Reused Resin), and minimal medium supplemented with GBX101-10. The graph in the right side is an enlargement of the left side graph to show detail.

FIG. 27 illustrates that supplementing minimal media with GBX101 results in growth of *Bacteroides thetaitaomicron*, as measured by OD, superior to growth of *Bacteroides thetaitaomicron* in no glucose at 48 hours.

Example 7—Sample Mucin Powder

Mucin powder is a oligosaccharide rich isolate from porcine mucosal tissue. The mucosal tissue of pig stomach is separated from the outer lining in dedicated EU-approved slaughterhouses before being subject to acid digestion and physical separation techniques to yield mucin powder.

TABLE 6

Mucin powder characteristics

| Parameter | Min. | Max. | Method |
|---|---|---|---|
| Moisture | 0.0% | 6.0% | Karl Fischer |
| N | 7.0% | 11.0% | ISO 16634-2: 2016 |
| Ash | | 4.0% | ISO 936: 1998 |
| pH (2% solution) | 3.0 | 5.0 | Internal |
| Viscosity (2% solution) | 3.0 C. | 8.0 C. | BS EN ISO 7973: 2015 |
| Na | | 50 mg/100 g | BS EN 16943: 2017 (ICP-OES) |
| K | 600 mg/100 g | 1 100 mg/100 g | BS EN 16943: 2017 (ICP-OES) |
| Cl | | 50 mg/100 g | BS EN 16943: 2017 (ICP-OES) |
| Ca | | 100 mg/100 g | BS EN 16943: 2017 (ICP-OES) |
| P | 100 mg/100 g | 250 mg/100 g | BS EN 16943: 2017 (ICP-OES) |
| Mg | | 100 mg/100 g | BS EN 16943: 2017 (ICP-OES) |
| Mn | | 0.2 mg/kg | BS EN 16943: 2017 (ICP-OES) |

TABLE 6-continued

Mucin powder characteristics

| Parameter | Min. | Max. | Method |
|---|---|---|---|
| Fe |  | 50 mg/kg | BS EN 16943: 2017 (ICP-OES) |
| Cu |  | 2.5 mg/kg | BS EN 16943: 2017 (ICP-OES) |

ICP-OES—Inductively Coupled Plasma-Optical Emission Spectrometry

Materials and Methods

Analysis of oligosaccharide content of PREP-9 and PREP-10-O-glycans were released from glycopeptides in PREP-9 and PREP-10 by (3-elimination in 50 mM NaOH and 0.5M NaBH$_4$. If necessary, pH was adjusted to above 12, which is required for a successful release reaction. The samples were incubated in 50° C., with the lids loosely tightened. On day 2, the samples were slowly neutralized with concentrated acetic acid (HAc). Aliquots (20 ul) of the samples were desalted using cation exchange resin (AG50W×8) packed onto a ZipTip C18 tip. After drying the samples in a SpeedVac, 50 ul 1% Acetic Acid (HAc) in methanol was added five times to remove residual borate by evaporation.

Released glycans were resuspended in water and analyzed by liquid chromatograph-electrospray ionization tandem mass spectrometry (LC-ESI/MS). The oligosaccharides were separated on a column (10 cm×250 µm) packed in-house with 3 µm porous graphite particles (Hypercarb, Thermo-Hypersil, Runcorn, UK). The oligosaccharides were injected on to the column and eluted with an acetonitrile gradient (Buffer A, 10 mM ammonium bicarbonate; Buffer B, 10 mM ammonium bicarbonate in 80% acetonitrile); Buffer C: 0.1% HAc. The gradient (0-45% Buffer B) was eluted for 30 min, followed by 8 min with 100% Buffer B, followed by 10 min with 0.1% HAc, and equilibrated with Buffer A in the next 15 min. A 40 cm×50 µm i.d. fused silica capillary was used as transfer line to the ion source.

The samples were analyzed in negative ion mode on a LTQ linear ion trap mass spectrometer (Thermo Electron, San José, Calif.), with an IonMax standard ESI source equipped with a stainless steel needle kept at −3.5 kV. Compressed air was used as nebulizer gas. The heated capillary was kept at 270° C., and the capillary voltage was ~50 kV. Full scan (m/z 380-2000, two microscan, maximum 100 ms, target value of 30,000) was performed, followed by data-dependent MS$^2$ scans (two microscans, maximum 100 ms, target value of 10,000) with normalized collision energy of 35%, isolation window of 2.5 units, activation q=0.25 and activation time 30 ms. The threshold for MS$^2$ was set to 300 counts. Data acquisition and processing were conducted with Xcalibur software (Version 2.0.7).

Determination of Principal Sugars in PREP-9 and PREP-10—HPAEC-PAD (High-performance anion exchange chromatography with derivatization-free, pulsed amperometric detection) can be performed on PREP-9 and PREP-10 to determine the principal sugars in the oligosaccharide component.

Specifically, PREP-9 and PREP-10 were freeze dried to remove water and treated with TFA 2N at 5 g/L at 100° C. during 4 hours under agitation to obtain free monosaccharides. The samples were then neutralized (NaOH 19N), diluted with distilled water and filtered through an 0.2 µm filter. The resulting samples were brought to a concentration of 100 mg/L to 500 mg/L of monosaccharides and loaded on a CarboPac PA-1 (Dionex) 4×250 mm analytical column to perform HPAEC-PAD with the following parameters.

System: ICS 2500 (Dionex) with pump, electrochemical detector, thermal compartment and autosampler.

Temperature of column: 17° C.

Rate of elution: 1 mL/min

Volume of sample: 20 µl

Detection: Electrochemical detection PAD with reference electrode mode Ag/C1.

Data Acquisition Software: Chromeleon (Dionex).

Elution Gradient: NaOH from 0.18 mM to 200 mM; Sodium Acetate from 0 to 500 mM. A mixture of external standards of monosaccharides (Fuc, GalNH$_2$, GlcNH$_2$, Gal, Glc at 6 mg/L and 12 mg/L) can be analyzed in parallel to identify and quantify each monosaccharide in the tested sample.

Based on the results of the HPAEC-PAD analysis, the principle composition and content of monosaccharides in the PREP-9 and PREP-10 were determined.

Free Amino Acids analysis of PREP-9 and PREP-10—PREP-9 and PREP-10 were dissolved in water to obtain 200 mg/ml solution. 254, of prepared solution was extracted with 2754, of pre-cooled Acetonitrile (ACN):H$_2$O (5:1, v/v) solvent containing internal standards. This solvent and sample mixture was vortexed and incubated for 1 hour at −20° C., followed by 15 min centrifugation (at 13,000 rpm at 4° C.) to facilitate protein precipitation. The resulting supernatants were collected and analyzed using Hydrophilic Interaction Liquid Chromatography coupled to High Resolution Mass Spectrometry (HILIC-HRMS) in positive ionization mode on a Q Exactive™ Hybrid Quadrupole-Orbitrap interfaced with Thermo Accela 1250 UPLC pump and CTC PAL Analytics autosampler. Amino acids were separated using a BEH Amide, 1.7 µm, 100 mm×2.1 mm I.D. column (Waters, Massachusetts, US). The mobile phase was composed of A=10 mM ammonium formate and 0.1% FA in water and B=0.1% FA in ACN. The instrument was set to acquire over the m/z range 60-900 at 70'000 FWHM resolution.

Amino acids and derivatives were quantified by using a standard calibration curves and isotopic labeled internal standards. Data was processed using TraceFinder Clinical Research (version 4.1, Thermo Fischer Scientific).

Protein Analysis of PREP-9 and PREP-10

A protein content analysis of the PREP-9 and PREP-10 were performed. PREP-9 and PREP-10 were dissolved in 20 mM Tris-HCl (pH 7.5), 4M guanidine hydrochloride, 150 mM NaCl, 1 mM Na$_2$EDTA, 1 mM EGTA, 1% Triton, 2.5 mM sodium pyrophosphate, 1 mM beta-glycerophosphate, 1 mM Na3VO4, 1 µg/ml leupeptin in order to obtain a 100 mg/ml solution using brief probe-sonication (5 pulses×5 sec). A BCA Protein Assay Kit (Thermo Scientific, Massachusetts, US) was used to measure (A562 nm) total protein concentration (Hidex, Turku, Finland).

Example 8—Production of GBX102

Figure 28:
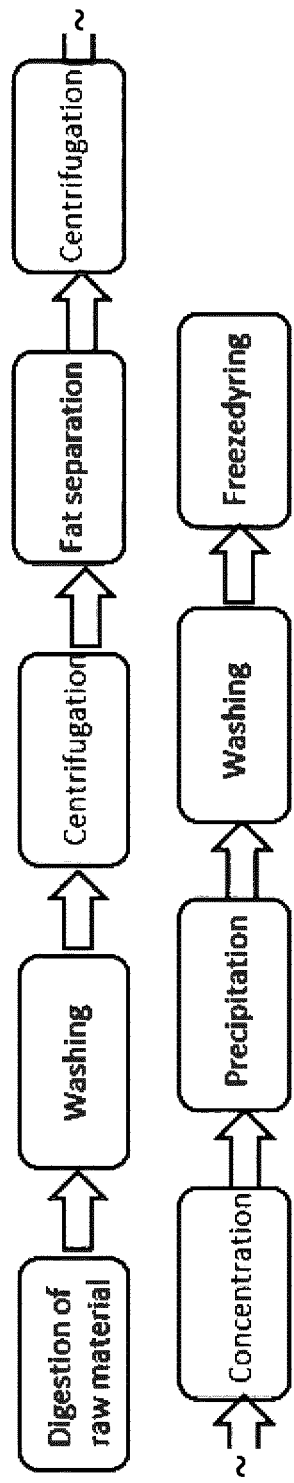
FIG. 28 is a diagram of a process used to obtain a composition of the claimed invention from the outer mucus layer of pig stomach (i.e., pig slime, pig stomach slime, slime).
Figure 29:
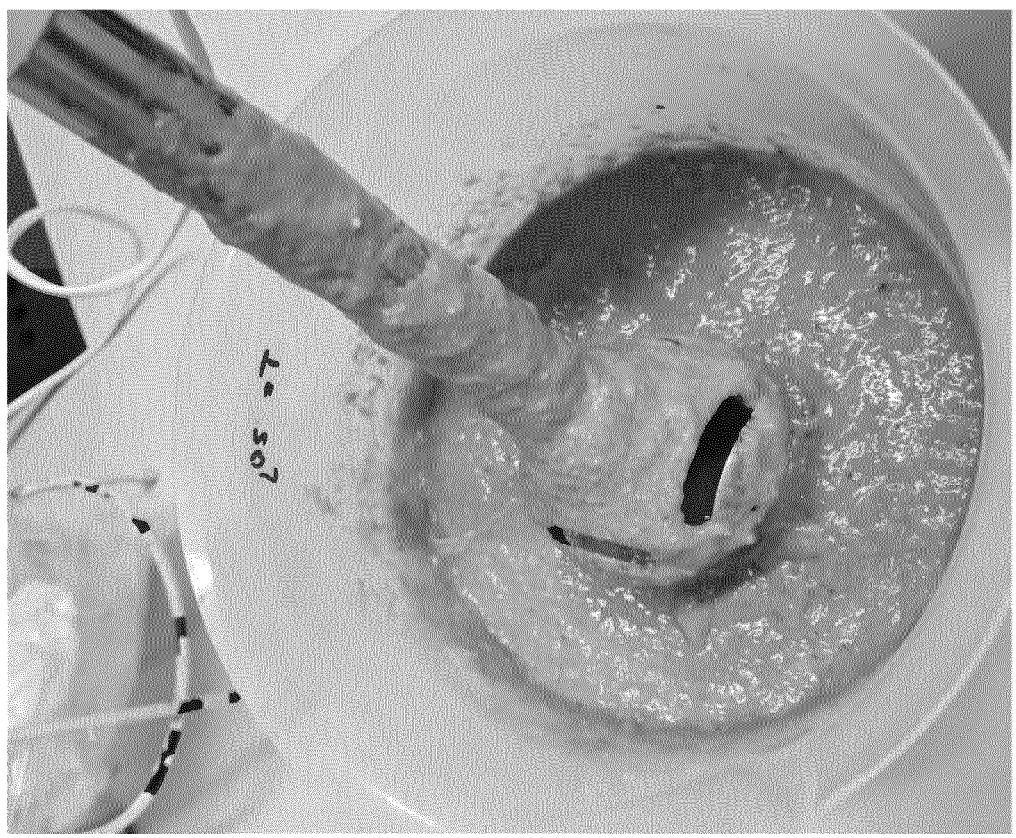
FIG. 29 shows pig slime after homogenization with an electric homogenizer for 1-2 minutes.

A sample of slime from pig stomachs was obtained. This sample contained slime, fat and meaty substances. The sample was split into two replicates and each processed according to the process set forth in FIG. 28. 600 g of sample was homogenized with a hand blender for 1-2 min. FIG. 29 shows the sample after homogenization.

The resulting homogenate was hydrolyzed by addition of 600 g of H$_2$O and pH adjustment to 3.0-3.5 with 2M HCl.

Figure 30:
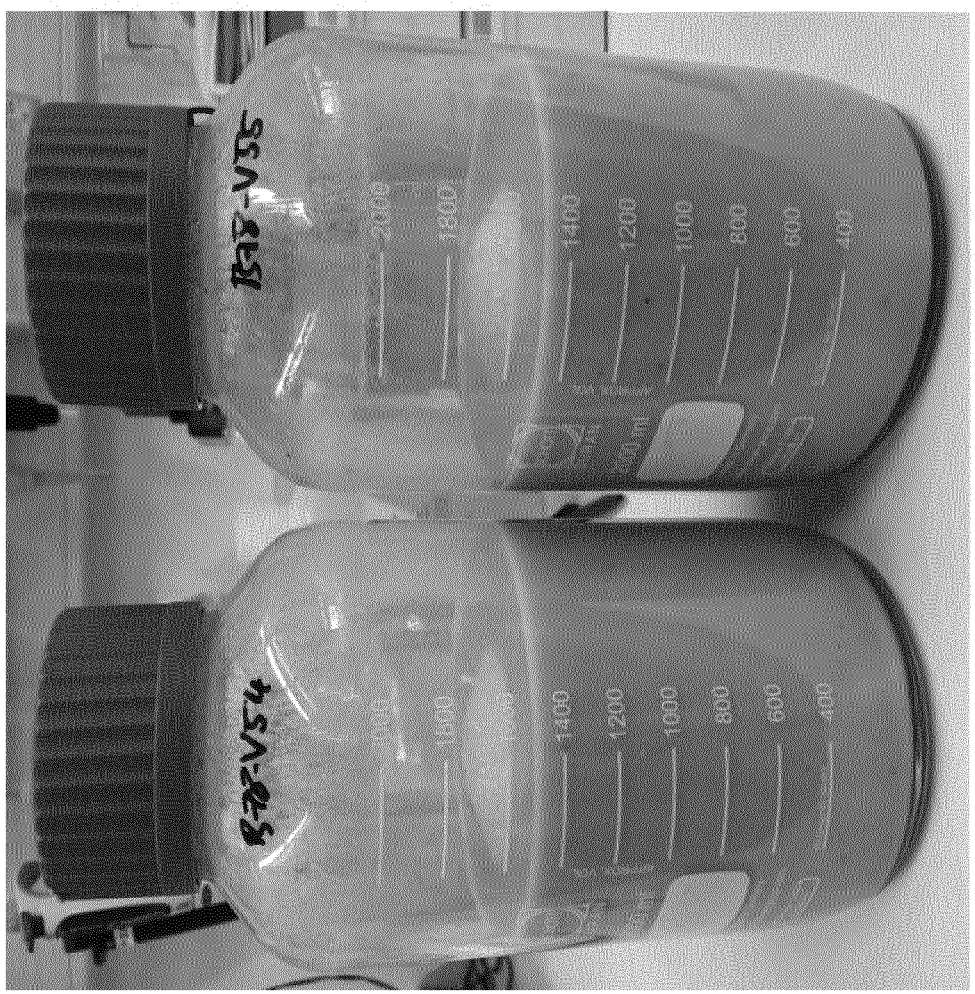
FIG. 30 shows homogenized pig slime after hydrolysis with acid.
Figure 31:
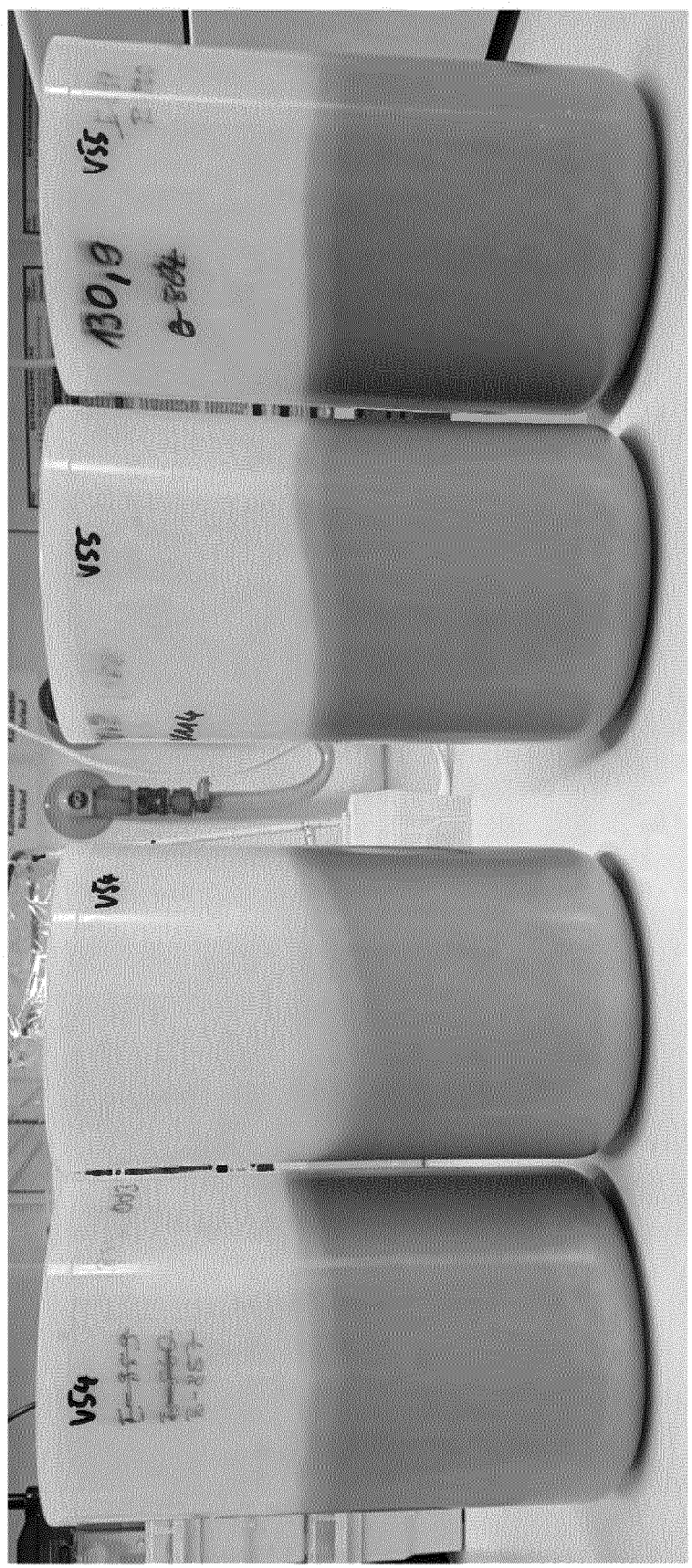
FIG. 31 shows hydrolyzed slime after centrifugation separated into fat (top), aqueous (middle), and sediment phases.
Figure 35:
FIG. 35 shows equal amounts of the fat (left vial), aqueous (middle vial), and solid (right vial) after centrifugation.

The resulting suspension was incubated for 3 h at 45° C. on a shaker. At the end of the incubation time 400 g of HCl solution at pH 3.0-3.5 was added. The resulting solution for each replicate is shown in FIG. 30. The solution from acid hydrolysis was centrifuged at 3500 rpm and 4° C., and the different phases (fat, aqueous and sediment) were isolated. The resulting solutions separated into different phases for each replicate are shown in FIG. 31 and FIG. 35.

Figure 33:
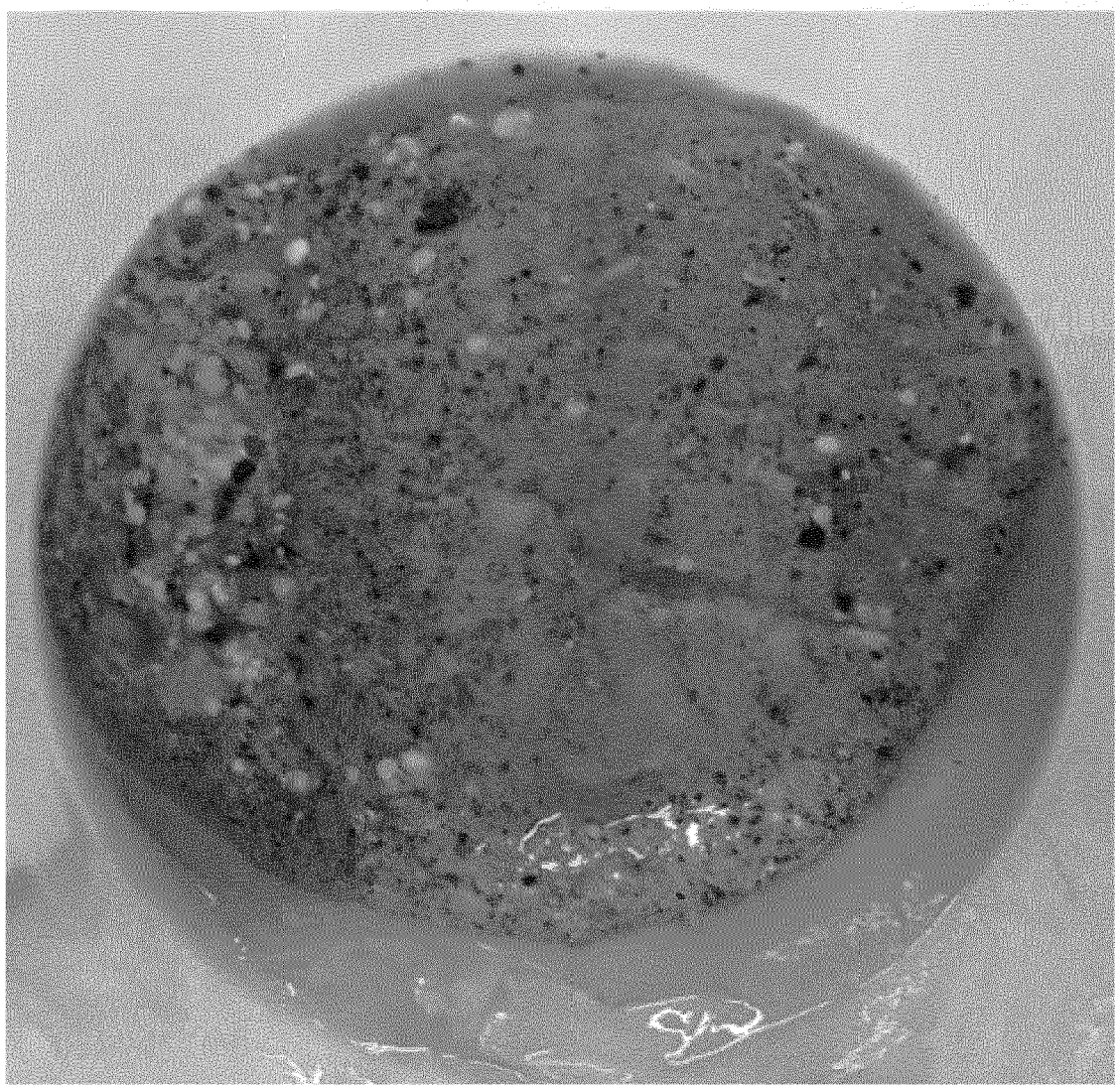
FIG. 33 shows the sediment phase after isolation from the aqueous and sediment phases.

The fat phase (FIG. 32 for each replicate) and solid phase (FIG. 33) were separated from the aqueous phase, and the aqueous phase was further processed by filtration through a cloth filter. FIG. 34 shows solids removed by cloth filtration (left panel) and the resulting filtrate. The filtered aqueous phase was then mixed with a 5% (V/W) of heptane and the resulting solution was stirred overnight at room temperature to defat the solution. FIG. 36, left panel, shows the aqueous phase with heptane added without stirring. FIG. 36, right panel, shows the aqueous phase for each replicate with heptane and with stirring.

After defatting, the organic phase (heptane containing phase) and the aqueous phase were separated using a separation funnel (FIG. 37, left panel). The separated aqueous phase and organic phase for one of the replicates are shown in FIG. 37, right panel. The defatted and separated aqueous phase was then centrifuged to remove remaining fat (FIG. 38, left panel) and filtered through a cloth filter. FIG. 38, right panel, shows the fat layer removed after filtration.

The filtered aqueous phase was then vacuum concentrated in the rotary evaporator at 60° C. until ⅓ of the initial volume was reached. Then the concentrated aqueous phase was incubated at 4° C. overnight. FIG. 39, left panel, shows a filtered aqueous phase prior to concentration (left bottle) and after concentration (right bottle). FIG. 39, right panel, shows the aqueous phase for each replicate after overnight incubation at 4° C.

The efficiency of using acetone or ethanol as precipitation solvent was initially studied. Two precipitation pre-tests were performed, using ethanol or acetone at a ratio of 80% (V/V). Precipitation efficiency was monitored by PAS determination in the concentrate and supernatant.

TABLE 7

Precipitation efficiency obtained from each solvent pre-test.

| Pre-test | Solvent used | Concentration | Precipitation Efficiency |
|---|---|---|---|
| 1 | Ethanol | 80% (v/v) | 93.9% |
| 2 | Acetone | 80% (v/v) | 84.3% |

Due to the better efficiency and the lower toxicity of ethanol, it was selected to perform the precipitation steps in the process.

Figure 40:
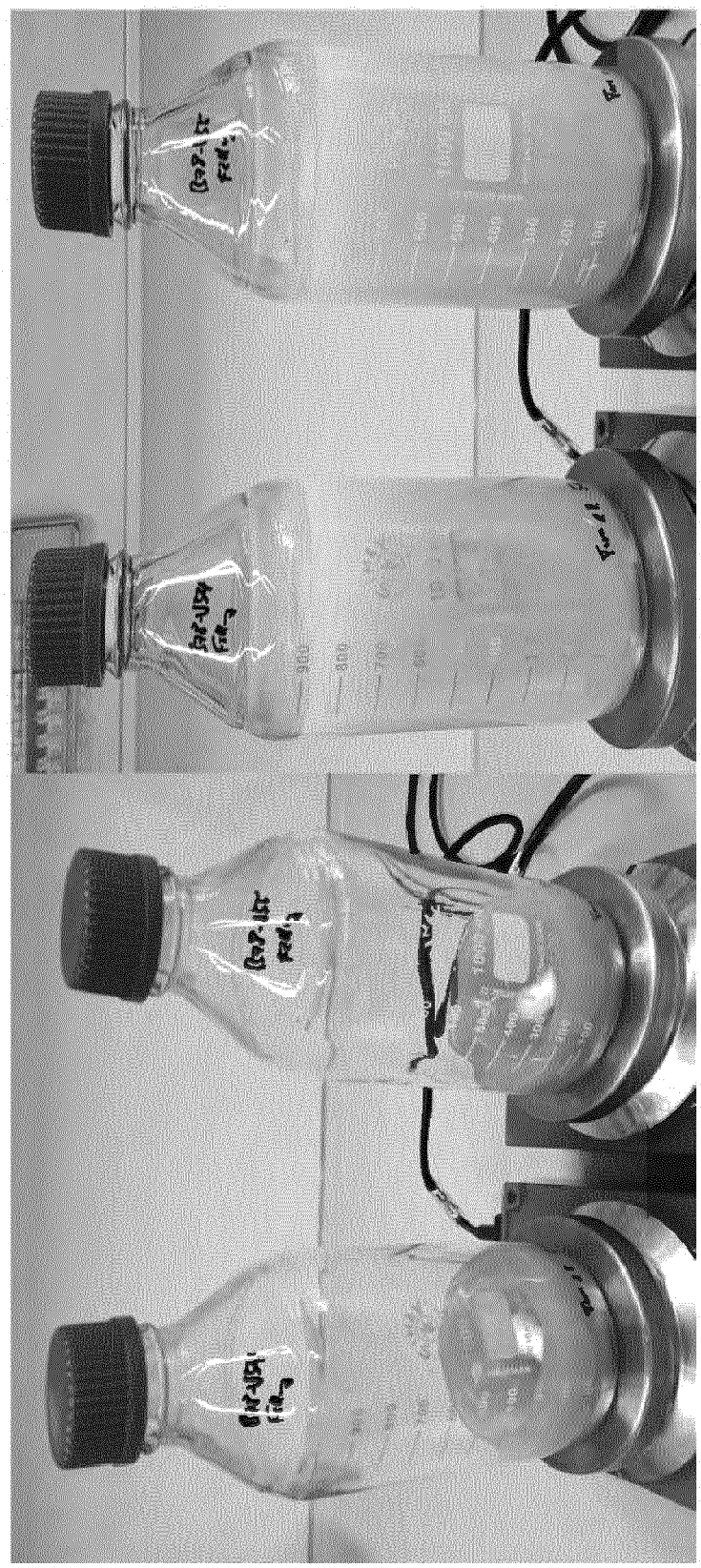
FIG. 40 shows concentrated aqueous phase after overnight incubation at 4° C. (left panel) and after addition of ethanol (right panel).
Figure 41:
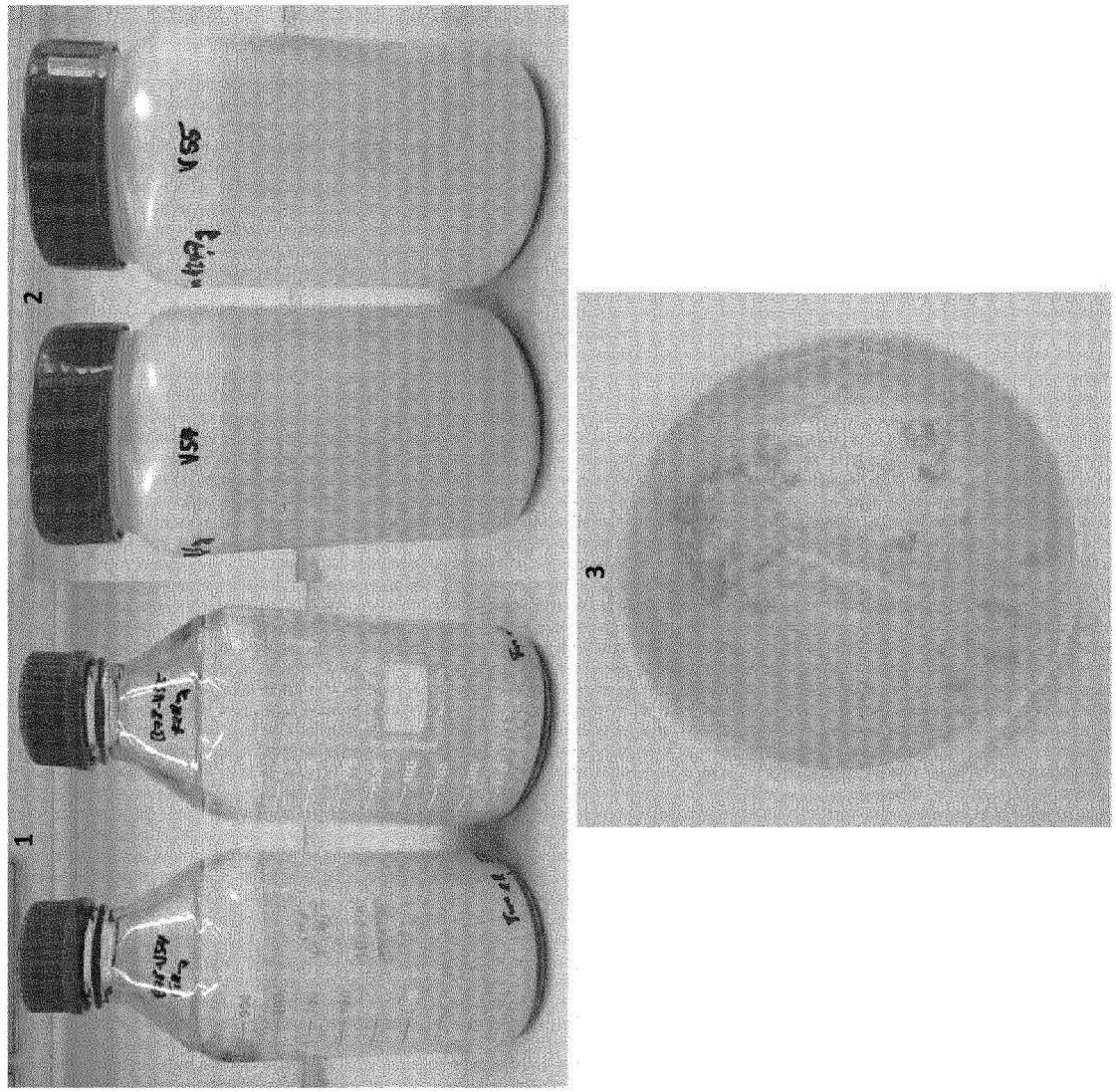
FIG. 41 shows ethanol precipitate. Top left panel shows precipitate in bottle. Top right panel shows a pellet of precipitate after centrifugation. Bottom panel shows isolated precipitate.

Once the solvent was chosen, precipitation of the concentrated water phase was performed using ethanol at a ratio of 80% (v/v) under stirring at 4° C. FIG. 40, two bottles on the left, shows concentrated aqueous phase without added ethanol for each replicate. FIG. 40, two bottles on the right, show ethanol added to each replicate. Precipitants from the aqueous phase were then isolated by centrifugation at 3500 rpm for 20 minutes at 4° C. FIG. 41, top left two bottles show sediment precipitated in bottles. FIG. 41, top right two bottles show aqueous phase after centrifugation with precipitant pelleted in the bottom. FIG. 41, bottom panel, shows the precipitated substances with the aqueous supernatant removed.

Figure 42:
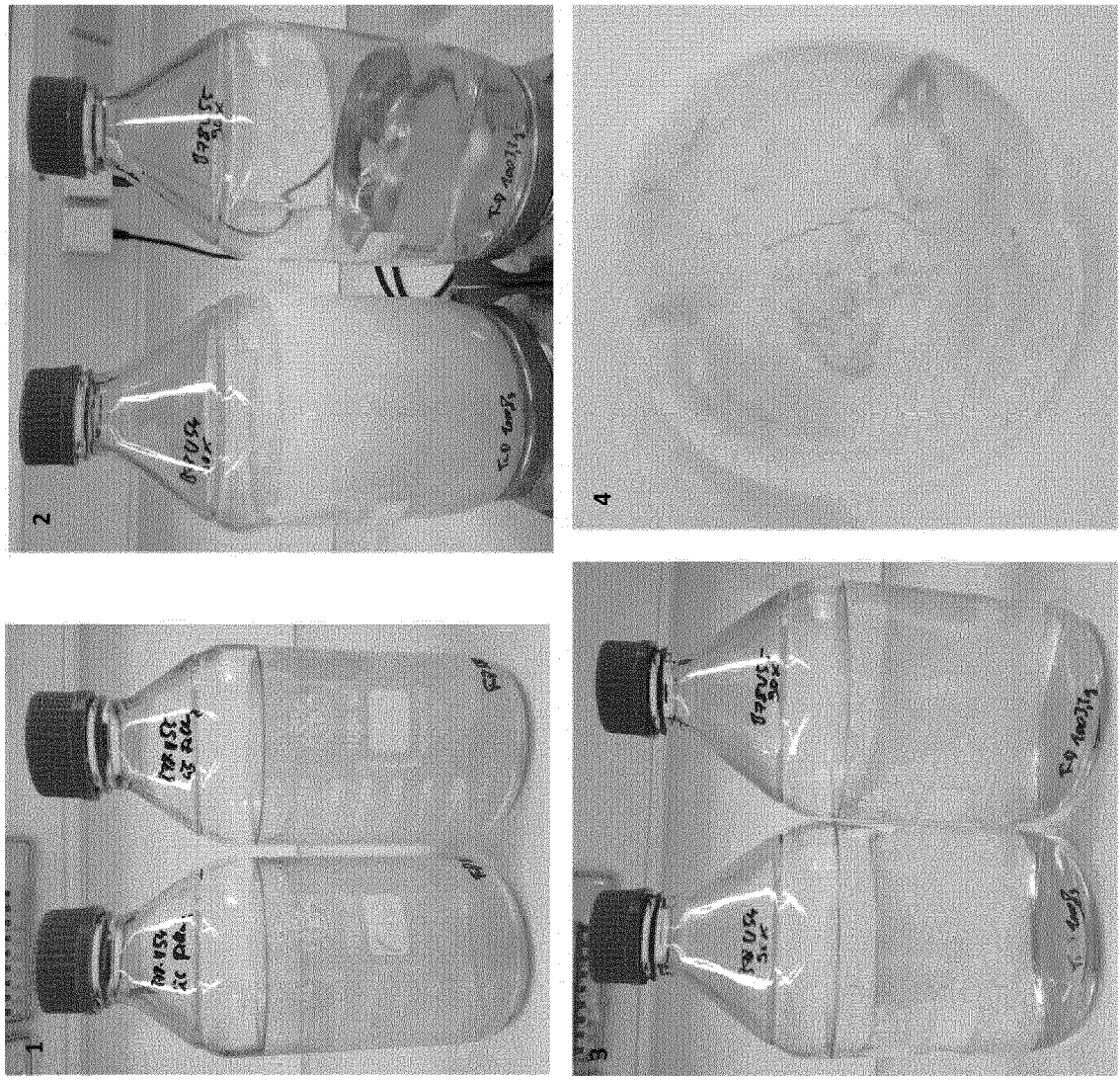
FIG. 42 shows a second ethanol precipitation of the supernatant after removal of precipitated glycoproteins. The second precipitation was performed at a higher ethanol concentration to remove any non-precipitated glycoproteins. Top left panel shows supernatant prior to second precipitation. Top right panel shows supernatant in 90% ethanol (left bottle). Bottom left panel shows supernatant after second precipitation and centrifugation. Bottom right panel shows precipitate after second ethanol precipitation and isolation.

The removed supernatant was turbid and yellowish in color (FIG. 42, top left panel. Thus, another round of precipitation at 90% ethanol (v/v) was performed (FIG. 42, top left panel) followed by centrifugation and separation of the supernatant aqueous phase and the precipitated materials. FIG. 42, bottom left panel, shows that the resulting supernatant is nearly colorless and clear while FIG. 42, bottom right panel, shows recovered precipitate. Based on these results, it was concluded that 90% ethanol is the optimum solvent condition for the precipitation.

The recovered precipitates were dewatered via two different washing protocols. In the first protocol, 100% ethanol was added with stirring to the precipitate at room temperature. The mixture was centrifuged to allow a better separation of the solid from the supernatant. As supernatant showed some precipitates in suspension, it was decantated overnight and the new precipitate was collected and blended with the first one. See FIG. 43—Left top panel shows precipitate in 100% ethanol, top right panel shows precipitate after recovery via centrifugation and decantation, bottom panel shows cloudy supernatant collected after centrifugation but prior to decantation.

Figure 44:
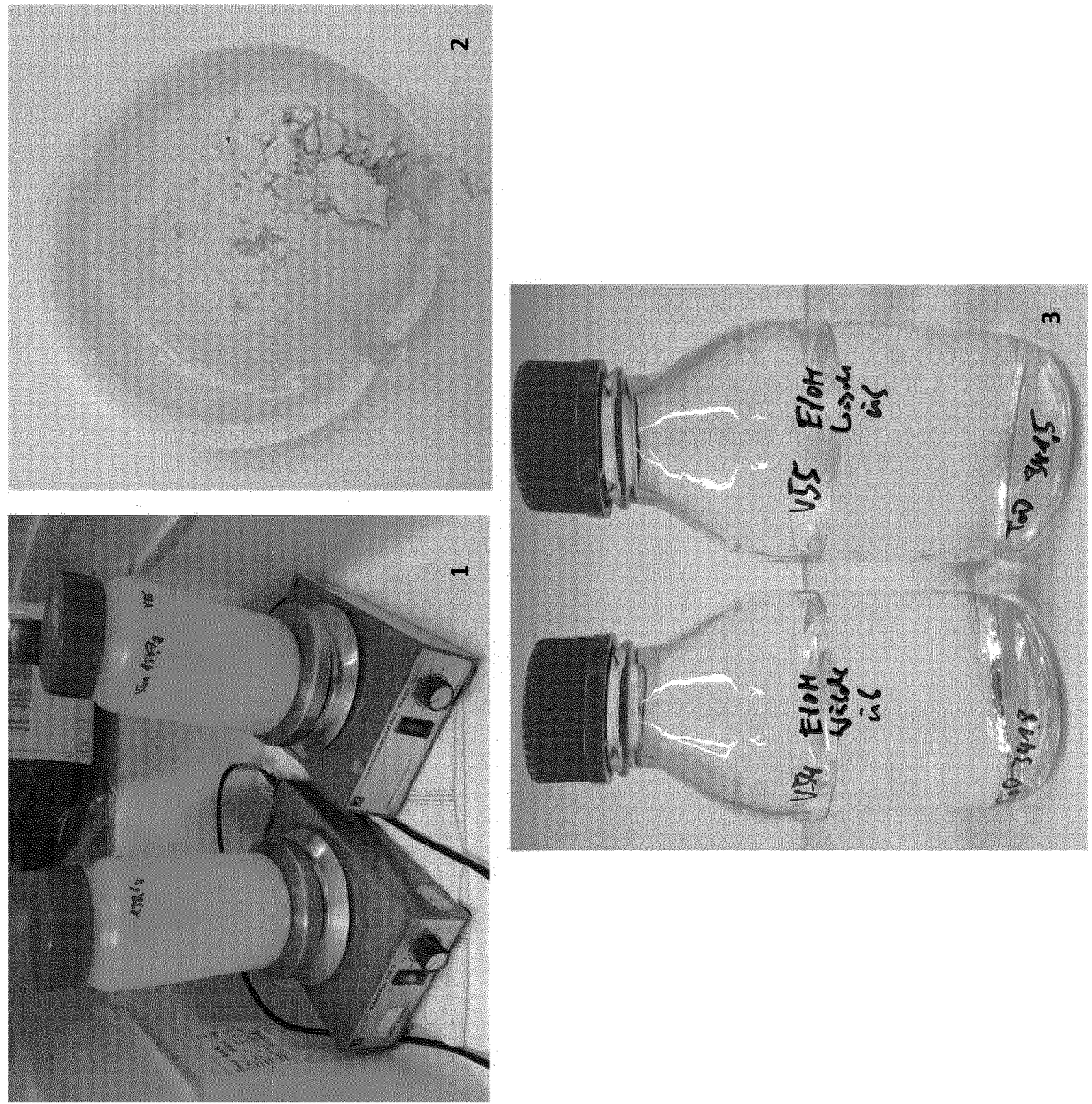
FIG. 44 shows mixing of the precipitation with 80% ethanol and stirred overnight at 4° C. (top left panel); pellet from the second step (top right panel); and transparent supernatant from the second step (bottom panel).

In the second alternate dewatering protocol, 80% ethanol solution was added with stirring at 4° C. overnight. Due to the long stirring time, a finer precipitate was obtained. The solid was isolated by centrifugation to allow a better separation from the supernatant. The supernatant was transparent. See FIG. 44—Top left panel shows precipitate in 80% ethanol with stirring, top right panel shows recovered precipitate after centrifugation and removal of supernatant, bottom panel shows recovered supernatant.

The precipitate was dissolved in ultrapure water, frozen and freeze dried. The freeze-dried sample was then milled. See FIG. 45—Top left panel shows precipitate in ultrapure water, top right panel shows dissolved sample including some insoluble particles, bottom panel shows dissolved sample with insoluble particles removed into a Petri dish. See also FIG. 46—Top left panel showing insoluble particles, top right panel showing dried sample, bottom panel shows the final milled product sometimes referred to herein as GBX102.

The terms of yield the results are the following (Table 8):

| | B78-V54 (1$^{ST}$ REPLICATE) | B78-V55 (2$^{ND}$ REPLICATE) | MEAN |
|---|---|---|---|
| DRY PRODUCT PER 600 G MUCUS AFTER SAMPLING LOSSES (G) | 3.2 | 3.3 | 3.3 |
| DRY PRODUCT PER 600 G MUCUS CORRECTED (G) | 6.5 | 6.6 | 6.6 |
| DRY PRODUCT PER KG MUCUS CORRECTED (G) | 10.9 | 11.0 | 11.0 |
| GLYCAN CONTENT IN THE DRY PRODUCT-PAS TEST (%) | 80.6 | 76.7 | 78.7 |
| GLYCAN PER KG MUCUS-TEST(G) | 8.79 | 8.44 | 8.6 |
| GLYCAN YIELD-PAS TEST (%) | 0.88 | 0.84 | 0.86 |

Example 9 Bacterial Growth in GBX102 Supplemented Media

Bacterial growth in the presence of a composition of a claimed invention in liquid minimal media, GBX102 (15 mg/ml), was compared to bacteria growth in liquid minimal media (no glucose) and liquid minimal media with glucose (glucose). GBX102 in the form of a dried powder was obtained by the process of Example 8. Each sample was added to 200 μl medium and inoculated with 5 μl of Lactobacillus acidophilus (FIG. 47), Lactobacillus reuteri (FIG. 48), Akkermansia muciniphila (FIG. 49), or Bacteroides thetaiotaomicron (FIG. 50). Each sample was prepared in triplicate. The bacterial growth was determined by measuring the optical densities (OD) at 600 nm in a spectrophotometer after 24 h, 48 h, and optionally 72 h of growth starting with an OD of 0.05.

Figure 47:
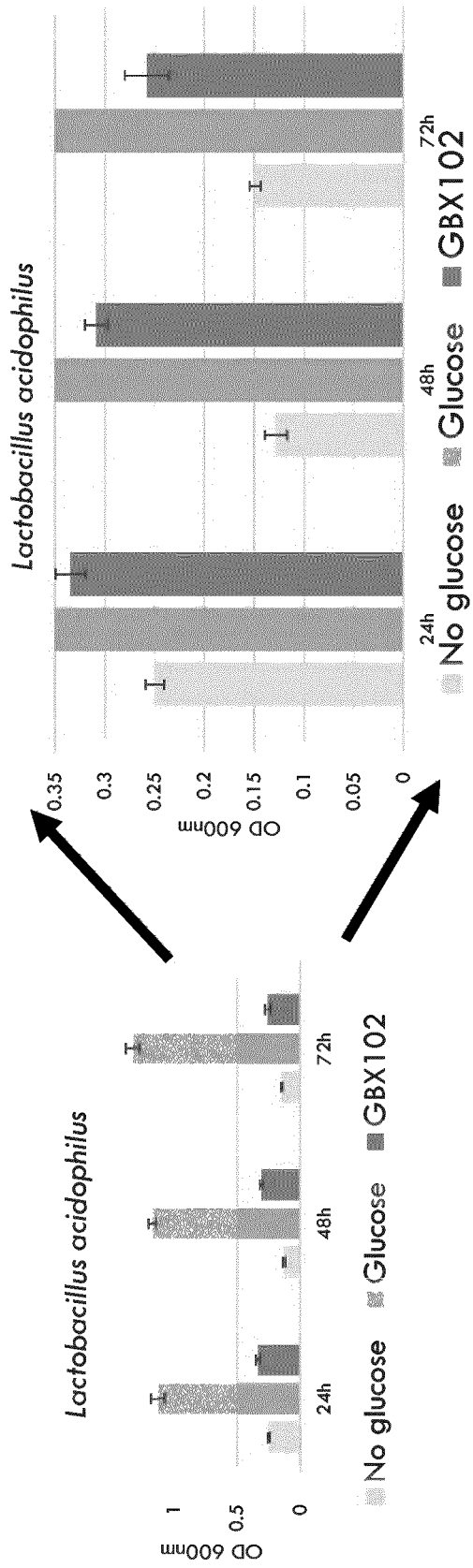
FIG. 47 shows a graph (left side) and an enlarged region of the same graph (right side) to show detail for *Lactobacillus acidophilus* growth in minimal media (no glucose), minimal media with glucose, and with GBX102.

FIG. 47 illustrates that supplementing minimal media with GBX102 results in growth of Lactobacillus acidophilus, as measured by OD, superior to growth of Lactobacillus acidophilus in no glucose at 24, 48, and 72 hours. It is believed that glucose is not an ideal energy source for gut microbiota, as glucose tends to inhibit the growth of certain beneficial bacteria in the microbiota, such as Akkermansia muciniphila.

Figure 48:
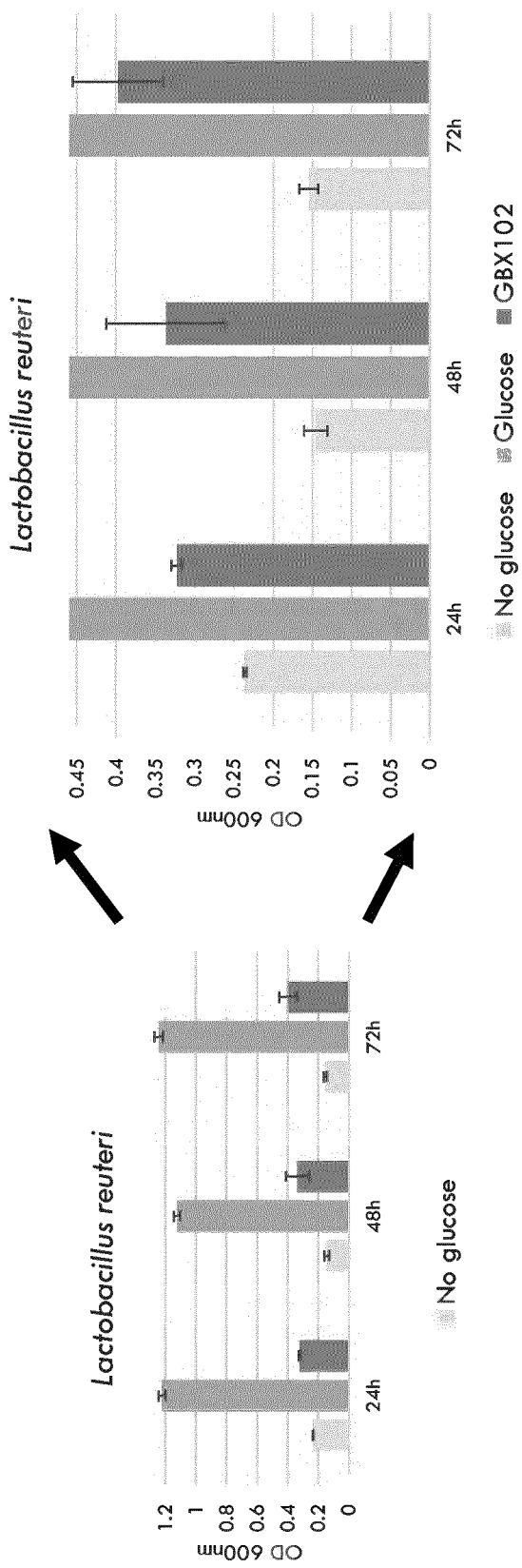
FIG. 48 shows a graph (left side) and an enlarged region of the same graph (right side) to show detail for *Lactobacillus reuteri* growth in minimal media (no glucose), minimal media with glucose, and with GBX102.

FIG. 48 illustrates that supplementing minimal media with GBX102 results in growth of Lactobacillus reuteri, as measured by OD, superior to growth of Lactobacillus reuteri in no glucose at 24, 48, and 72 hours.

Figure 49:
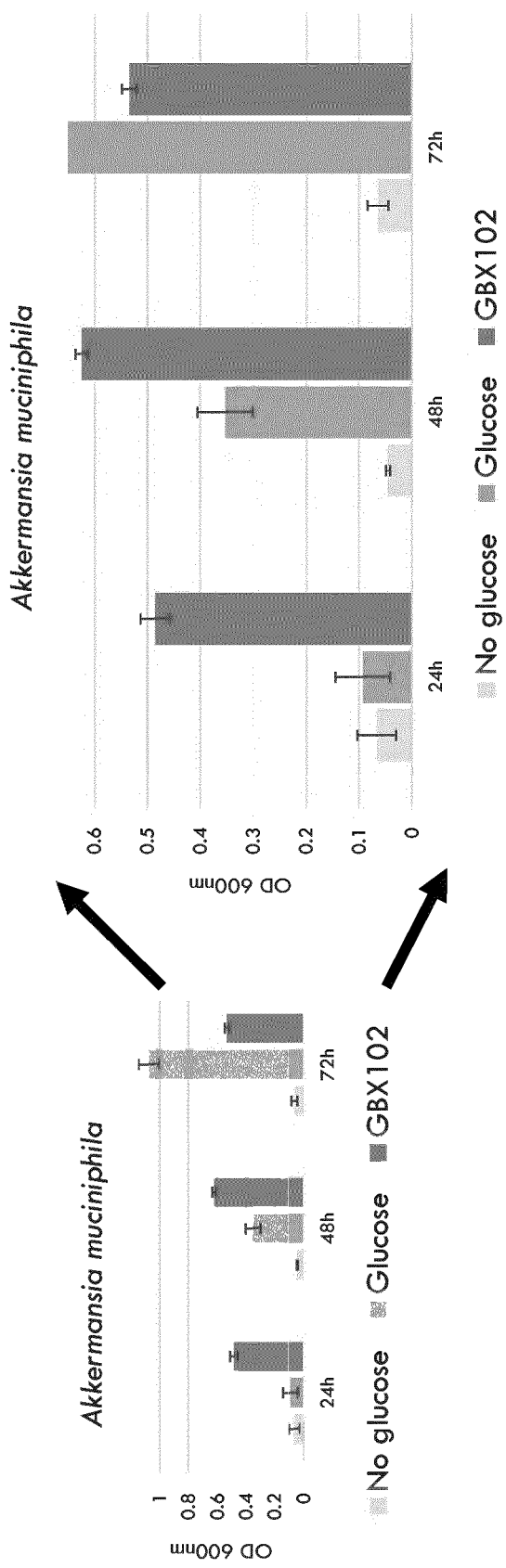
FIG. 49 shows a graph (left side) and an enlarged region of the same graph (right side) to show detail for *Akkermansia muciniphila* growth in minimal media (no glucose), minimal media with glucose, and with GBX102.
Figure 50:
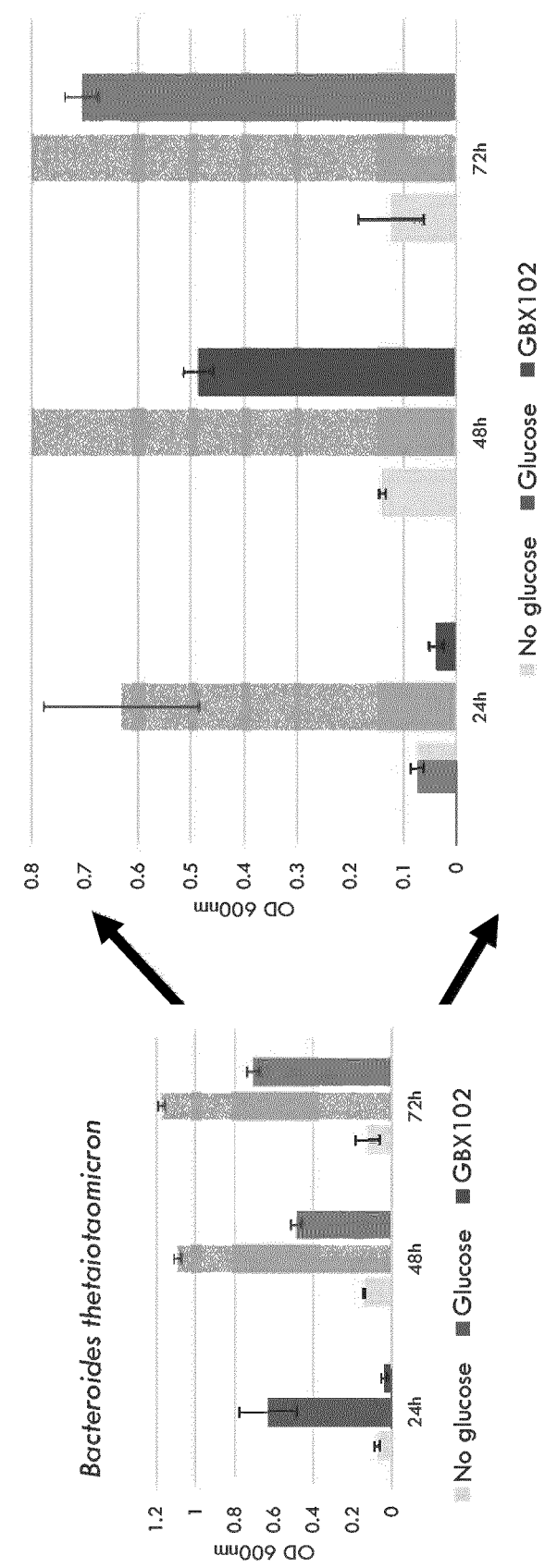
FIG. 50 shows a graph (left side) and an enlarged region of the same graph (right side) to show detail for *Bacteroides thetaiotaomicron* growth in minimal media (no glucose), minimal media with glucose, and with GBX102.

FIG. 49 illustrates that supplementing minimal media with GBX102 results in growth of Akkermansia muciniphila, as measured by OD, superior to growth of Akkermansia muciniphila in no glucose at 48 and 72 hrs. Significantly, GBX102 supplementation in minimal media also resulted in higher Akkermansia muciniphila growth than glucose supplementation at 48 hrs.

FIG. 50 illustrates that supplementing minimal media with GBX102 results in growth of Bacteroides thetaiotaomicron, as measured by OD, superior to growth of Bacteroides thetaiotaomicron in no glucose at 48 and 96 hours.

The results shown in FIGS. 47-50 show that compositions of the claimed invention sustain higher growth rates for some beneficial bacteria at different time points that minimal media. Thus, these results suggest that beneficial bacteria are capable of utilizing glycans attached to peptides or proteins, especially after other energy sources are exhausted.

Bacterial growth in the presence of glucose and GBX102 at different concentrations (starting with 15 mg/ml as 100% and diluting 50% (i.e., 7.5 mg/ml), 20%, 10% and 5%) was compared to bacteria growth in liquid minimal media (no glucose) and liquid minimal media with glucose (glucose). GBX102 in the form of a dried powder was obtained by the process of Example 8. Each sample was added to 200 μl medium and inoculated with 5 μl of Bifidobacterium breve (FIG. 51), Lactobacillus acidophilus (FIG. 52), Lactobacillus reuteri (FIG. 53), Akkermansia muciniphila (FIG. 54), Bacteroides thetaiotaomicron (FIG. 55), or Bifidobacterium infantis (FIG. 56). Each sample was prepared in triplicate. The bacterial growth was determined by measuring the optical densities (OD) at 600 nm in a spectrophotometer after 24 h and 48 h of growth starting with an OD of 0.05.

Figure 51:
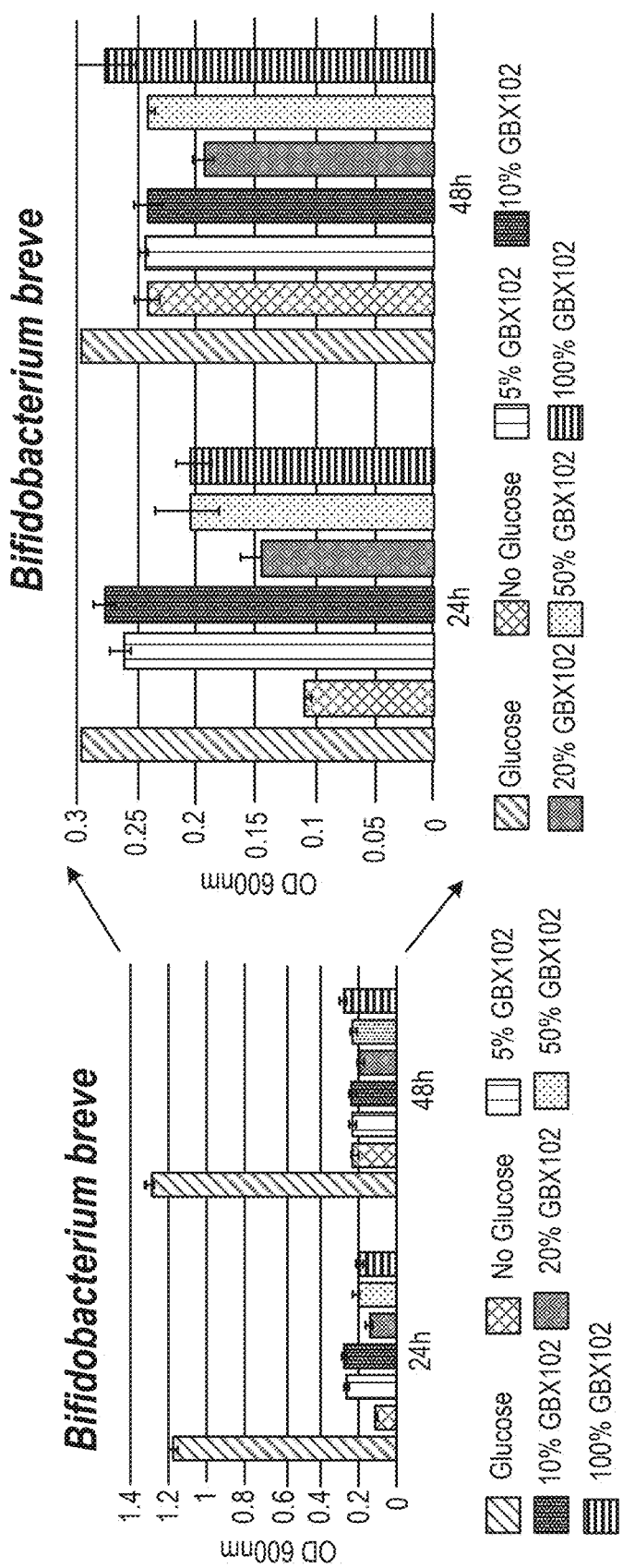
FIG. 51 shows a graph (left side) and an enlarged region of the same graph (right side) to show detail for *Bifidobacterium breve* growth in minimal media (no glucose), minimal media with glucose, and with GBX102 at various concentrations and time points. Percentage value concentrations shown are in reference to 15 mg/ml. Thus, 100% equals 15 mg/ml, 50% equals 7.5 mg/ml, etc.

FIG. 51 illustrates that supplementing minimal media with GBX102 results in growth of Bifidobacterium breve, as measured by OD, superior to growth of Bifidobacterium breve in no glucose at 24 and 48 hr.

Figure 52:
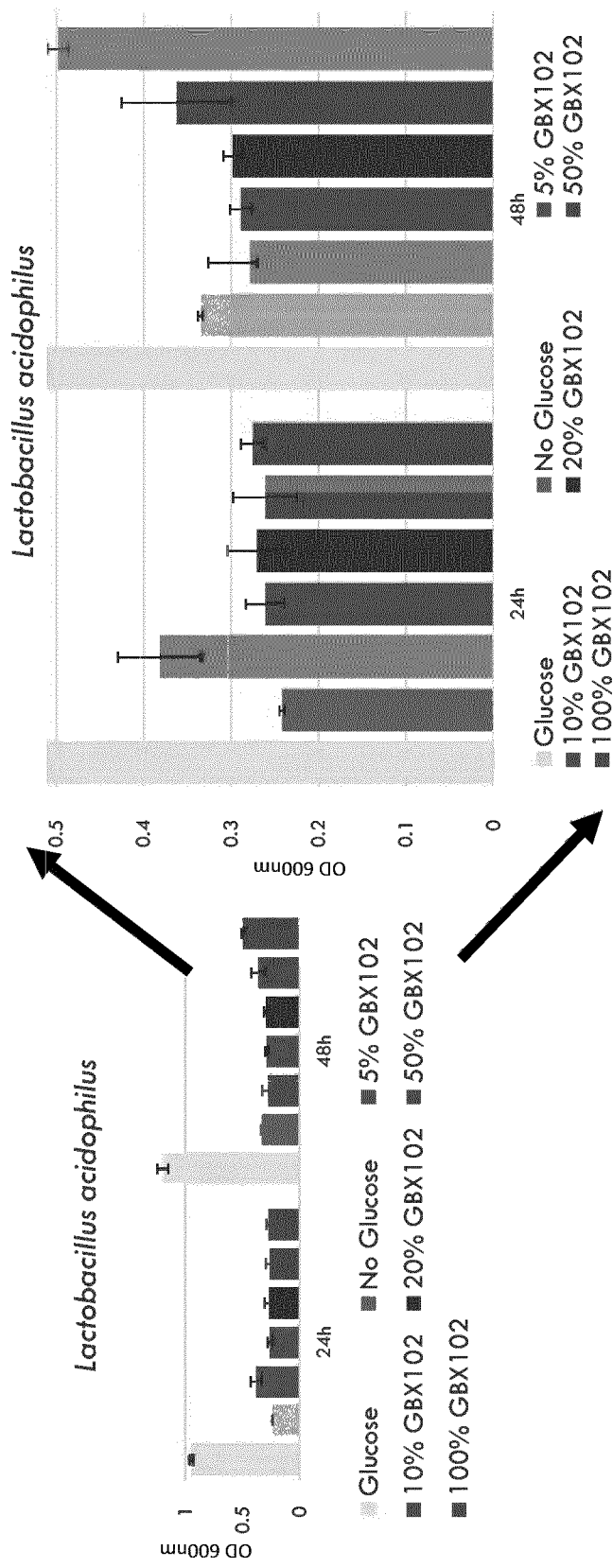
FIG. 52 shows a graph (left side) and an enlarged region of the same graph (right side) to show detail for *Lactobacillus acidophilus* growth in minimal media (no glucose), minimal media with glucose, and with GBX102 at various concentrations and time points. Percentage value concentrations shown are in reference to 15 mg/ml. Thus, 100% equals 15 mg/ml, 50% equals 7.5 mg/ml, etc.

FIG. 52 illustrates that supplementing minimal media with GBX102 results in growth of Lactobacillus acidophilus, as measured by OD, superior to growth of Lactobacillus acidophilus in no glucose at 24 and 48 hours.

Figure 53:
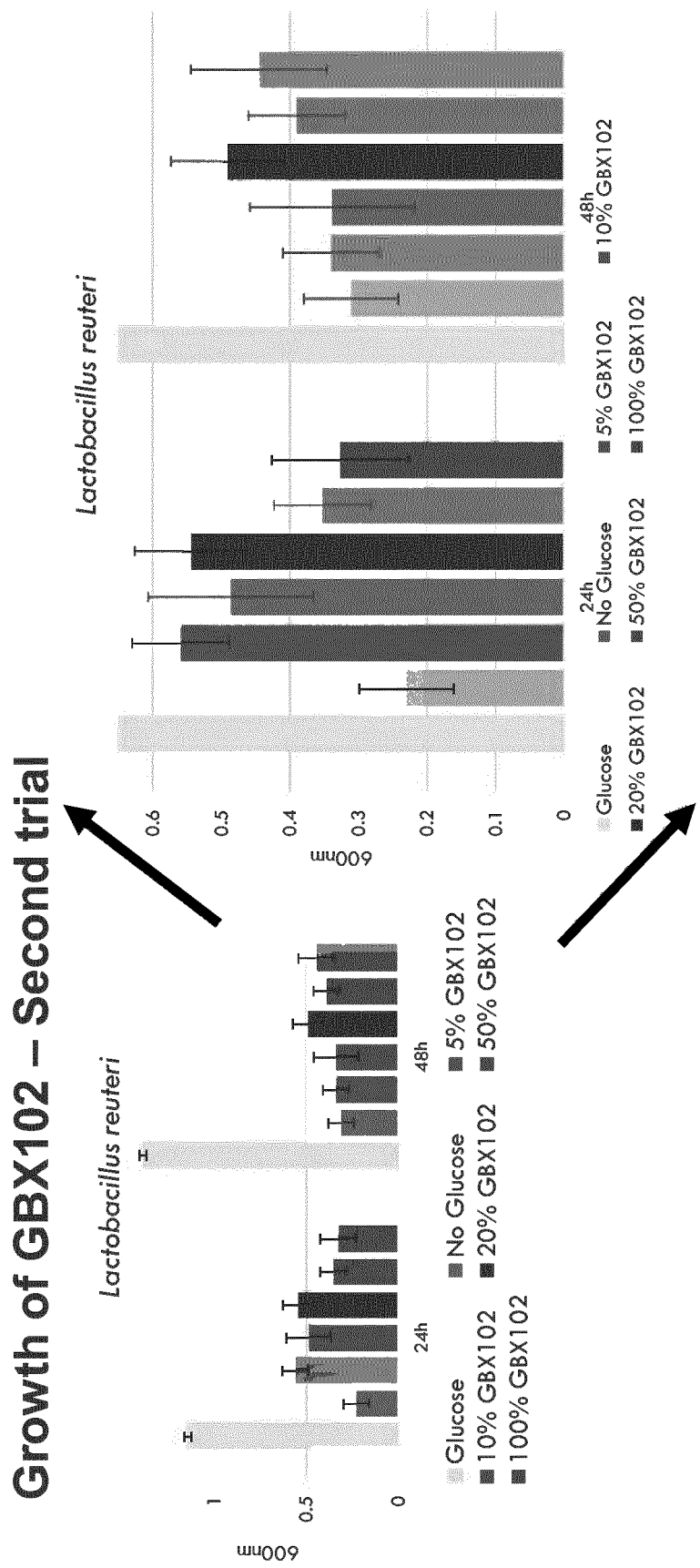
FIG. 53 shows a graph (left side) and an enlarged region of the same graph (right side) to show detail for *Lactobacillus reuteri* growth in minimal media (no glucose), minimal media with glucose, and with GBX102 at various concentrations and time points. Percentage value concentrations shown are in reference to 15 mg/ml. Thus, 100% equals 15 mg/ml, 50% equals 7.5 mg/ml, etc.

FIG. 53 illustrates that supplementing minimal media with some concentrations of GBX102 results in growth of Lactobacillus reuteri, as measured by OD, superior to growth of Lactobacillus reuteri in no glucose at 24 and 48 hrs.

Figure 54:
FIG. 54 shows a graph for *Akkermansia muciniphila* growth in minimal media (no glucose), minimal media with glucose, and with GBX102 at various concentrations and time points. Percentage value concentrations shown are in reference to 15 mg/ml. Thus, 100% equals 15 mg/ml, 50% equals 7.5 mg/ml, etc.

FIG. 54 illustrates that supplementing minimal media with GBX102 results in growth of Akkermansia muciniphila, as measured by OD, superior to growth of Akkermansia muciniphila in no glucose at 24 and 48 hours. Significantly, Akkermansia muciniphila growth was dependent on GBX102 concentration.

Figure 55:
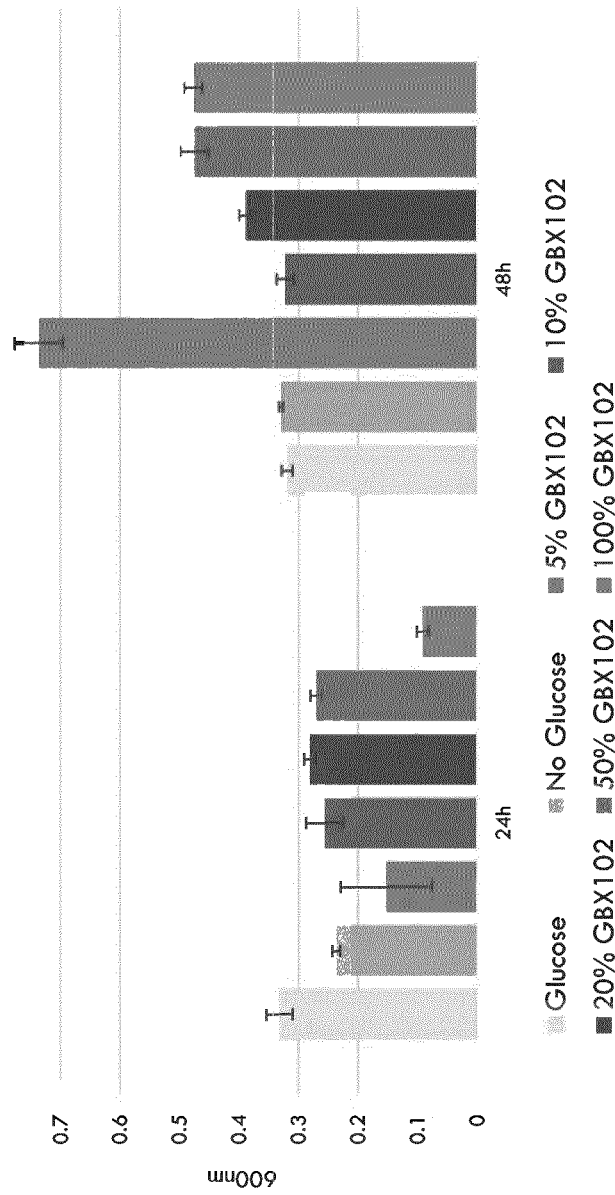
FIG. 55 shows a graph for *Bacteroides* thetaiotaomicron growth in minimal media (no glucose), minimal media with glucose, and with GBX102 at various concentrations and time points. Percentage value concentrations shown are in reference to 15 mg/ml. Thus, 100% equals 15 mg/ml, 50% equals 7.5 mg/ml, etc.
Figure 56:
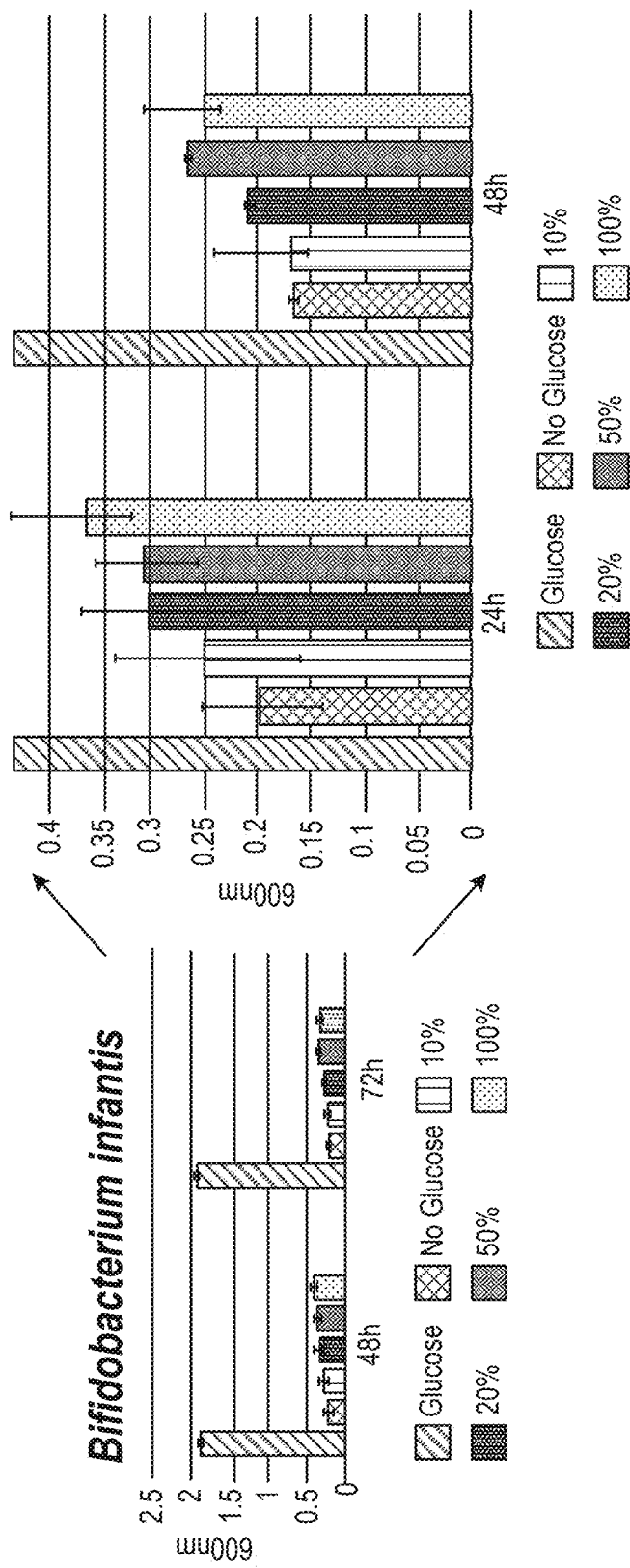
FIG. 56 shows a graph (left side) and an enlarged region of the same graph (right side) to show detail for *Bifidobacterium infantis* growth in minimal media (no glucose), minimal media with glucose, and with GBX102 at various concentrations and time points. Percentage value concentrations shown are in reference to 15 mg/ml. Thus, 100% equals 15 mg/ml, 50% equals 7.5 mg/ml, etc.

FIG. 55 illustrates that supplementing minimal media with some concentrations of GBX102 results in growth of Bacteroides thetaiotaomicron, as measured by OD, superior to growth of Bacteroides thetaiotaomicron in no glucose at 48 hours.

FIG. 56 illustrates that supplementing minimal media with some concentrations of GBX102 results in growth of Bifidobacterium infantis, as measured by OD, superior to growth of Bifidobacterium infantis in no glucose at 48 and 72 hours.

The results shown in FIGS. 51-56 show that compositions of the claimed invention can sustain higher growth rates for some beneficial bacteria at different time points that minimal media. Thus, these results suggest that beneficial bacteria are capable of utilizing glycans attached to peptides or proteins, especially after other energy sources are exhausted. In particular, the results shown in FIGS. 54 and 56 show that at some time points, growth of Akkermansia muciniphila and Bifidobacterium infantis was dependent upon GBX102 dosage. Further, the results herein show that pig stomach mucus is a surprising source for obtaining compositions with very high glycoprotein content with minimal processing, thus providing a source of high quality mucins at low cost.

The invention claimed is:

1. A composition comprising glycopeptides obtained from gastrointestinal tract mucins, wherein:
   a) the composition is obtained without subjecting the mucins or a partially purified fraction thereof to conditions or reagents that release oligosaccharides from glycoproteins or glycopeptides;
   b) the total oligosaccharide content of the composition is >15% (w/w);
   c) the free glycan content of the composition is <1% (w/w);
   d) the total glycoprotein content of the composition is 6% or less (w/w); and
   e) the composition comprises glycopeptide-bound oligosaccharides having each of the following general formulae:
   i. $Hex_1HexNAc_1Fuc_1$;
   ii. $Hex_1HexNAc_2$;
   iii. $Hex_1HexNAc_2Fuc_1$;
   iv. $Hex_1HexNAc_2Fuc_1Sul_1$;
   V. $Hex_1HexNAc_3$;
   vi. $Hex_2HexNAc_2$;
   vii. $Hex_2HexNAc_2Fuc_1$
   viii. $Hex_2HexNAc_2Fuc_2$;
   ix. $Hex_2HexNAc_2Fuc_2Sul_1$;
   x. $Hex_2HexNAc_3$;
   xi. $Hex_2HexNAc_3Fuc_1$;
   xii. $Hex_2HexNAc_4$;
   xiii. $Hex_2HexNAc_4Fuc_1$; and
   xiv. $NeuAc_1Hex_1HexNAc_2$.

2. The composition according to claim 1, wherein the composition has a water solubility of about 100 g/L at 25° C.

3. The composition according to claim 1, wherein the composition has a total free amino acid content of 15% or less (w/w).

4. The composition according to claim 1, wherein the composition has a protein content of 6% or less (w/w).

5. The composition according to claim 1, wherein the composition does not substantially contain particles having a diameter greater than 7 μm.

6. The composition according to claim 1, wherein the composition comprises glycopeptide-bound oligosaccharides having at least 7 of the structures shown in a. to aa.:
a) Fucα1-2(GalNAcα1-3)Galβ1-3GalNAc;
b) Fucα1-2(GalNAcα1-3)Galβ1-4GlcNAcβ1-3Galβ1-3GalNAc;
c) Fucα1-2Galβ1-3(6S-GlcNAcβ1-6)GalNAc;
d) Fucα1-2Galβ1-3(Fucα1-2Galβ1-4GlcNAcβ1-6)GalNAc;
e) Fucα1-2Galβ1-3(GalNAcβ1-4GlcNAcβ1-6)GalNAc;
f) Fucα1-2Galβ1-3(Galβ1-4GlcNAcβ1-6)GalNAc;
g) Fucα1-2Galβ1-3(GlcNAcα1-4Galβ1-4GlcNAcβ1-6)GalNAc;
h) Fucα1-2Galβ1-3(GlcNAcβ1-6)GalNAc;
i) Fucα1-2Galβ1-3(Fucα1-2Galβ1-4 (6S) GlcNAcβ1-6)GalNAc;
j) Fucα1-2Galβ1-3GalNAc;
k) Fucα1-2Galβ1-4GlcNAcβ1-3Galβ1-3GalNAc;
l) GalNAcα1-3(Fucα1-2)Galβ1-3 (GlcNAcα1-4Galβ1-4GlcNAcβ1-6)GalNAc;
m) GalNAcα1-3(Fucα1-2)Galβ1-3 (SGlcNAcβ1-6)GalNAc;
n) GalNAcα1-3(Fucα1-2)Galβ1-4(6S) GlcNAcβ1-3Galβ1-3GalNAc;
o) Galβ1-3(6SGlcNAcβ1-6)GalNAc;
p) Galβ1-3(Fucα1-2Galβ1-4GlcNAcβ1-6)GalNAc;
q) Galβ1-3(GlcNAcα1-4Galβ1-4GlcNAcb1-6)GalNAc;
r) Galβ1-4GlcNAch1-3Galβ1-3 (NeuAcα2-6)GalNAc;
s) Galβ1-4GlcNAcβ1-3Galβ1-3GalNAc;
t) GlcNAcα1-4Galβ1-3(NeuAcα2-6)GalNAc;
u) GlcNAcα1-4Galβ1-3(Fucα1-2Galβ1-4GlcNAcβ1-6)GalNAc;
v) GlcNAcα1-4Galβ1-3(GalNAcβ1-4GlcNAcβ1-6)GalNAc;
w) GlcNAcα1-4Galβ1-3(GlcNAcα1-4Galβ1-4GlcNAcβ1-6)GalNAc;
x) GlcNAcα1-4Galβ1-3 (GlcNAcβ1-6)GalNAc;
y) GlcNAcα1-4Galβ1-3 [GalNAcα1-3(Fucα1-2)Galβ1-4GlcNAcβ1-6]GalNAc;
z) GlcNAcα1-4Galβ1-3Gal (Galβ1-4GlcNAcβ1-6)GalNAc; and
aa) GlcNAcα1-4Galβ1-3GalNAc.

7. The composition of claim 1, wherein the gastrointestinal tract mucins are porcine gastrointestinal tract mucins.

8. The composition of claim 1, wherein the composition is obtained by
a) suspending mucin powder in a volume of ethanol;
b) mixing the suspension with a volume of water that is 10-20× the volume of ethanol;
c) contacting the suspension with an anion exchange resin under conditions that allow the resin to bind organic and ionic species;
d) removing the resin and subjecting the suspension to centrifugation to separate any remaining insoluble material;
e) contacting the supernatant from the centrifugation with diatomaceous earth for at least 5 minutes; and
f) filtering the mixture to remove particles larger than 7 μm.

9. A pharmaceutical composition comprising at least one composition according to claim 1 and a pharmaceutically acceptable carrier, diluent or excipient.

10. A method of treating an unbalance of the microbiota and/or disorders associated with dysbiosis in a subject, comprising administering at least one composition according to claim 1 to the subject.

11. The method according to claim 10, wherein the composition does not significantly increase the growth of *Escherichia coli* as compared to growth of *Escherichia coli* in minimal essential media.

12. The method according to claim 10, wherein the composition causes a significant increase in growth, when added to minimal essential media, of one of more of *Bacteroides thetaiotaomicron, Akkermansia muciniphila, Lactobacillus reuteri, Lactobacillus acidophilus, Bifidobacterium bifidum, Bifidobacterium animalis* subsp. *lactis*, or *Bifidobacterium breve* after one or more of 24 hours, 48 hours, 72 hours or 96 hours, as compared to growth of the bacteria in minimal essential media alone.

13. The method of claim 10, wherein the disorder associated with dysbiosis is asymptomatic dysbiotic microbiota which comprises depleted *Akkermansia muciniphila* gut microbiota.

14. A composition comprising a mixture of free glycans and glycopeptides obtained from gastrointestinal tract mucins, wherein:
a) the composition is obtained without subjecting the mucins or a partially purified fraction thereof to conditions or reagents that cause complete release of oligosaccharides from glycoproteins or glycopeptides;
b) the total oligosaccharide content of the composition is >10% (w/w);
c) the ratio of glycopeptides:free glycans is between 4:1 and 1:6 (w/w);
d) the total glycoprotein content of the composition is 12% or less (w/w); and
e) the composition comprises glycopeptide-bound oligosaccharides or free glycans having each of the following general formulae:
i. $Hex_1HexNAc_1Fuc_1$;
ii. $Hex_1HexNAc_2$;
iii. $Hex_1HexNAc_2Fuc_1$;
iv. $Hex_1HexNAc_2Fuc_1Sul_1$;
V. $Hex_1HexNAc_2Sul_1$;
vi. $Hex_1HexNAc_3$;
vii. $Hex_2HexNAc_2Fuc_1$;
viii. $Hex_2HexNAc_2Fuc_2$;
ix. $Hex_2HexNAc_2Fuc_2Sul_1$;
X. $Hex_2HexNAc_3$;
xi. $Hex_2HexNAc_3Fuc_1$;
xiii. $Hex_2HexNAc_4$;
xiv. $Hex_2HexNAc_4Fuc_1$;
xv. $NeuAc_1Hex_1HexNAc_1$;
xvi. $NeuAc_1Hex_1HexNAc_1Fuc_1$; and
xvii. $NeuAc_1Hex_1HexNAc_2$.

15. The composition according to claim 14, wherein the composition
(a) has a water solubility of about 100 g/L at 25° C.;
(b) has a total free amino acid content of 8% or less (w/w);
(c) has a protein content of 12% or less (w/w); and/or
(d) does not substantially contain particles having a diameter greater than 7 μm.

16. The composition according to claim 14, wherein the composition comprises glycopeptide-bound oligosaccharides or free glycans having at least 7 of the structures shown in a. to y.:
   a) Fucα1-2 (GalNAcα1-3)Galβ1-3GalNAcol;
   b) Fucα1-2Galβ1-3 (6S-GlcNAcβ1-6)GalNAcol;
   c) Fucα1-2Galβ1-3 (Fucα1-2Galβ1-4GlcNAcβ1-6)GalNAcol;
   d) Fucα1-2Galβ1-3 (Galβ1-4GlcNAcβ1-6)GalNAcol;
   e) Fucα1-2Galβ1-3 (GlcNAcα1-4Galβ1-4GlcNAcβ1-6)GalNAcol;
   f) Fucα1-2Galβ1-3 (GlcNAcβ1-6)GalNAcol;
   g) Fucα1-2Galβ1-3 (NeuAca2-6)GalNAcol;
   h) Fucα1-2Galβ1-3 [Fucα1-2Galβ1-4 (6S) GlcNAcβ1-6]GalNAcol;
   i) Fucα1-2Galβ1-3 [GalNAcα1-3(Fucα1-2)Galβ1-4GlcNAcβ1-6]GalNAcol;
   j) Fucα1-2Galβ1-3GlcNAcol;
   k) Fucα1-2Galβ1-4GlcNAcol;
   l) GalNAcα1-3(Fucα1-2)Galβ1-3 (GlcNAcα1-4Galβ1-4GlcNAcβ1-6)GalNAcol;
   m) Galβ1-3(6SGlcNAcβ1-6)GalNAcol;
   n) Galβ1-3(Fucα1-2Galβ1-4GlcNAcβ1-6)GalNAcol;
   o) Galβ1-3(GlcNAcα1-4Galβ1-4GlcNAcb1-6)GalNAcol;
   p) GlcNAcα1-4Galβ1-3(NeuAca2-6)GalNAcol;
   q) GlcNAcα1-3Galβ1-4GlcNAcβ1-6GalNAcol;
   r) GlcNAcα1-4Galβ1-3(Fucα1-2Galβ1-4GlcNAcβ1-6)GalNAcol;
   s) GlcNAcα1-4Galβ1-3(GlcNAcα1-4Galβ1-4GlcNAcβ1-6)GalNAcol;
   t) GlcNAcα1-4Galβ1-3(GlcNAcβ1-6)GalNAcol;
   u) GlcNAcα1-4Galβ1-3[GalNAcα1-3(Fucα1-2)Galβ1-4GlcNAcβ1-6]GalNAcol;
   v) GlcNAcα1-4Galβ1-3Gal (Galβ1-4GlcNAcβ1-6)GalNAcol;
   w) GlcNAcα1-4Galβ1-3GalNAcol;
   x) GlcNAcα1-4Galβ1-4GlcNAcol; and
   y) NeuAcαα2-3 Galβ1-3GalNAcol.

17. The composition of claim 16, wherein the composition comprises
   (a) glycopeptide-bound oligosaccharides or free glycans having at least 14 of the structures shown in a. to y; or
   (b) glycopeptide-bound oligosaccharides or free glycans having at least 21 of the structures shown in a. to y.

18. The composition of claim 14, wherein the gastrointestinal tract mucins are porcine gastrointestinal tract mucins.

19. A method of manufacturing the composition of claim 1, comprising the following steps:
   a. providing gastrointestinal tract mucins;
   b. suspending mucin powder in a volume of ethanol;
   c. contacting the suspension with an anion exchange resin under conditions that allow the resin to bind organic and ionic species;
   d. removing the resin and subjecting the suspension to centrifugation to separate any remaining insoluble material;
   e. contacting the supernatant from the centrifugation with diatomaceous earth for at least 5 minutes; and
   f. filtering the mixture to remove particles larger than 7 µm.

20. A method of manufacturing the composition of claim 14, comprising the following steps:
   a. providing gastrointestinal tract mucins;
   b. suspending mucin powder in a volume of ethanol;
   c. mixing the suspension in a volume of 2% aqueous $Ca(OH)_2$ that is 10-20× the volume of ethanol and mixing the resulting suspension at a temperature of between 45-55° C. for 16-24 hours;
   d. subjecting the suspension to centrifugation to separate any remaining insoluble material;
   e. neutralizing the supernatant from the centrifugation to a pH of between 7.0 and 7.5;
   f. contacting the neutralized supernatant with diatomaceous earth for at least 5 minutes; and
   g. filtering the mixture to remove particles larger than 7 µm.

* * * * *